(12) United States Patent
Liu et al.

(10) Patent No.: US 11,546,944 B2
(45) Date of Patent: Jan. 3, 2023

(54) RANDOM ACCESS RESOURCE CONFIGURATION METHOD AND COMMUNICATIONS DEVICE

(71) Applicant: Huawei Technologies Co., Ltd., Shenzhen (CN)

(72) Inventors: Jianqin Liu, Beijing (CN); Xiang Gao, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 16/992,399

(22) Filed: Aug. 13, 2020

(65) Prior Publication Data

US 2021/0084687 A1 Mar. 18, 2021

Related U.S. Application Data

(63) Continuation of application No. PCT/CN2019/075023, filed on Feb. 14, 2019.

(30) Foreign Application Priority Data

Feb. 14, 2018 (CN) .......................... 201810152230.8

(51) Int. Cl.
*H04W 74/08* (2009.01)
*H04W 72/04* (2009.01)

(52) U.S. Cl.
CPC ... *H04W 74/0833* (2013.01); *H04W 72/0406* (2013.01); *H04W 72/0446* (2013.01)

(58) Field of Classification Search
CPC ......... H04W 74/0833; H04W 72/0406; H04W 72/0446; H04L 5/0007
See application file for complete search history.

(56) References Cited

U.S. PATENT DOCUMENTS 10,701,684 B2 * 6/2020 Yoo ........................ H04L 5/0048
11,051,262 B2 * 6/2021 Qian ..................... H04L 5/0053
(Continued)

FOREIGN PATENT DOCUMENTS

CN 104285491 A 1/2015

OTHER PUBLICATIONS

Convida Wireless, "Summary of Remaining details on PRACH formats", 3GPP TSG RAN WG1 Meeting # AH 1801, R1-1801243, Jan. 22-26, 2018, 47 Pages, Vancouver, Canada.
(Continued)

*Primary Examiner* — Raj Jain
(74) *Attorney, Agent, or Firm* — Slater Matsil, LLP

(57) ABSTRACT

A random access resource configuration method and a communications device. The method includes receiving, by a terminal device, index indication information, where the index indication information is used to indicate a first configuration index, determining, by the terminal device based on the first configuration index, first configuration information corresponding to the first configuration index, where the first configuration information is used to indicate a time domain resource for a first group of random access preamble occasions (ROs) or a time domain resource for a second group of ROs, and where the time domain resource for the first group of ROs and the time domain resource for the second group of ROs are located in a first time unit in a random access configuration period.

20 Claims, 9 Drawing Sheets

(56) References Cited

U.S. PATENT DOCUMENTS

| | | | | |
|---|---|---|---|---|
| 2020/0059878 A1* | 2/2020 | Huang | ............. | H04L 5/0091 |
| 2020/0351853 A1* | 11/2020 | Xiong | ............. | H04L 5/0023 |
| 2021/0007139 A1* | 1/2021 | Fu | ............. | H04W 72/1268 |
| 2021/0084687 A1* | 3/2021 | Liu | ............. | H04W 72/0446 |
| 2021/0337597 A1* | 10/2021 | Yoshimura | ......... | H04W 74/0833 |

OTHER PUBLICATIONS

Intel Corporation, "NR PRACH formats", 3GPP TSG RAN WG1 NR Adhoc, R1-1800301, Jan. 22-26, 2018, 17 Pages, Vancouver, Canada.

Mediatek Inc., "Remaining details on RACH procedure", 3GPP TSG RAN WG1 Meeting 91, R1-1719569, Nov. 27-Dec. 1, 2017, 9 Pages, Reno, USA.

ZTE, et al., "Remaining details of RMSI", 3GPP TSG RAN WG1 Meeting NR#3, R1-1715378, Sep. 18-21, 2017, 12 Pages, Nagoya, Japan.

"3rd Generation Partnership Project; Technical Specification Group Radio Access Network: NR; Base Station (BS) radio transmission and reception (Release 15)," 3GPP TS 38.104, V15.0.0, Technical Specification, Dec. 2017, 121 pages.

"3rd Generation Partnership Project; Technical Specification Group Radio Access Network; NR; Physical channels and modulation (Release 15)," 3GPP TS 38.211, V15.0.0, Technical Specification, Dec. 2017, 73 pages.

"3rd Generation Partnership Project; Technical Specification Group Radio Access Network; Physical layer procedures for control (Release 15)," 3GPP TS 38.213, V15.0.0, Technical Specification, Dec. 2017, 56 pages.

"3rd Generation Partnership Project; Technical Specification Group Radio Access Network NR Radio Resource Control (RRC) protocol specification (Release 15)," 3GPP TS 38.331, V15.0.0, Technical Specification, Dec. 2017, 188 pages.

ZTE et al., "Summary of PRACH Remaining details on PRACH formats," 3GPP TSG RAN WG1 Meeting 90bis, R1-1718932, Oct. 9-13, 2017, 28 pages, Prague, CZ.

ZTE et al., "PRACH Resource Configuration," 3GPP TSG RAN WG1 Meeting #91, R1-1719345, Nov. 27-Dec. 1, 2017, 22 pages, Reno, USA.

Huawei et al., "Remaining issues in RACH Procedure," 3GPP TSG RAN WG Meeting#91, R1-1719374, Nov. 27-Dec. 1, 2017, 11 pages, Reno, USA.

NTT DOCOMO, Inc.,"Remaining details on PRACH formats," 3GPP TSG RAN WG1 Meeting #91, R1-1720794, Nov. 27-Dec. 1, 2017, 14 pages. Reno, USA.

Convida Wireless, "Summary of Remaining details on PRACH formats," 3GPP TSG RAN WG1 Meeting #91, R1-1721573, Nov. 27-Dec. 1, 2017, 72 pages, Reno, USA.

ZTE et al., "Remaining details of PRACH Resource Configuration," 3GPP TSG RAN WG1 AH 1801, R1-1800083, Jan. 22-26, 2018, 15 pages, Vancouver, Canada.

Samsung, "Corrections on PRACH formats," 3GPP TSG RAN WG1 Meeting AdHoc#1, R1-1800417, Jan. 22-26, 2018, 8 pages, Vancouver, Canada.

Qualcomm Incorporated, "Remaining Details on PRACH Formats," 3GPP TSG-RAN WG1 Meeting AH 1801, R1-1300850, Jan. 22-26, 2018, 9 pages, Vancouver, Canada.

Interdigital Inc., "On Remaining Details of PRACH Preamble Formats and Designs", 3GPP TSG RAN WG1 Meeting 91, R1-1720624, Nov. 1-27, 2017, 5 Pages, Reno, USA.

Convida Wireless, "Summary of Remaining details on PRACH formats", 3GPP TSG RAN WG1 Meeting # AH 1801, R1-1801049, Jan. 22-26, 2018, 44 Pages, Vancouver, Canada.

* cited by examiner

RANDOM ACCESS RESOURCE CONFIGURATION METHOD AND COMMUNICATIONS DEVICE

CROSS-REFERENCE TO RELATED APPLICATIONS

This application is a continuation of International Application No. PCT/CN2019/075023, filed on Feb. 14, 2019, which claims priority to Chinese Patent Application No. 201810152230.8, filed on Feb. 14, 2018. The disclosures of the aforementioned applications are hereby incorporated herein by reference in its entirety.

TECHNICAL FIELD

This application relates to the communications field, and in particular, to a random access resource configuration method and a communications device.

BACKGROUND

A synchronization signal/physical broadcast channel block (SSB) is defined in a 5th generation (5G) communications system such as new radio (NR). One SSB occupies four consecutive orthogonal frequency division multiplexing (OFDM) symbols. The SSB includes a new radio-primary synchronization signal (NPSS), a new radio narrowband-secondary synchronization signal (NR-SSS), and a new radio-physical broadcast channel (NR-PBCH).

A terminal device needs to search for a cell and obtain cell system information, to access a network. For example, the terminal device may search for the foregoing SSB, to achieve downlink synchronization with a cell. Then, the terminal device needs to obtain cell system information, and establish a connection to the cell through a random access procedure, to achieve uplink synchronization. Specifically, the terminal device may send a random access preamble sequence on a resource for a random access occasion (RO) that is configured on a network device, to initiate random access.

Currently, in NR, only a physical random access channel (PRACH) configuration in a frequency band below 6 GHz in a frequency division duplex (FDD) system and a PRACH configuration of a long preamble sequence in a frequency band below 6 GHz in a time division duplex (TDD) system are specified in an existing protocol. Because there is a relatively large difference between configurations of SSBs and remaining minimum system information (RMSI) that correspond to different frequency bands or different systems, parameter designs in configurations in the frequency bands below 6 GHz cannot be directly applied to a PRACH configuration in another frequency band or another system, otherwise, there are a relatively small quantity of valid ROs in a PRACH configuration period, and random access efficiency of the terminal device is lowered.

Therefore, how to improve random access efficiency of a terminal device becomes an urgent problem to be resolved.

SUMMARY

This application provides a random access resource configuration method and a communications device. According to the method, random access efficiency of a terminal device can be improved.

According to a first aspect, a communication method is provided. The method includes: receiving, by a terminal device, index indication information, where the index indication information is used to indicate a first configuration index, and determining, by the terminal device based on the first configuration index, first configuration information corresponding to the first configuration index, where the first configuration information is used to indicate a time domain resource for at least one random access preamble occasion (RO), and the first configuration information is determined based on time domain information of a control channel resource set.

Therefore, in this embodiment of this application, the time domain resource for the RO is determined based on a time domain resource for a common signal block and/or the time domain information of the control channel resource set, thereby reducing a probability that the resource for the RO collides with a downlink resource (for example, an SSB and/or an RMSI control-resource set (CORESET)), increasing a quantity of valid ROs in a PRACH configuration period, and improving random access efficiency of the terminal device.

According to a second aspect, a communication method is provided. The method includes: generating, by a network device, index indication information, where the index indication information is used to indicate a first configuration index, and sending, by the network device, the index indication information to a terminal device, where the index indication information is used by the terminal device to determine, based on the first configuration index, first configuration information corresponding to the first configuration index, the first configuration information is used to indicate a time domain resource for at least one random access preamble occasion (RO), and the first configuration information is determined based on a time domain resource for a common signal block and/or time domain information of a control channel resource set.

Therefore, in this embodiment of this application, the time domain resource for the RO is determined based on the time domain resource for the common signal block and/or the time domain information of the control channel resource set, thereby reducing a probability that the resource for the RO collides with a downlink resource (for example, an SSB and/or an RMSI CORESET), increasing a quantity of valid ROs in a PRACH configuration period, and improving random access efficiency of the terminal device.

Optionally, with reference to the first aspect or the second aspect, in an implementation, the first configuration information includes at least one of the following information: first indication information used to indicate a first time unit in a random access configuration period, second indication information used to indicate at least one second time unit in the first time unit, third indication information used to indicate a quantity of third time units included in each of the at least one second time unit, fourth indication information used to indicate a quantity of ROs in the third time unit, and a fifth indication information used to indicate a starting time domain position of an RO in the third time unit.

Optionally, with reference to the first aspect or the second aspect, in an implementation, the random access configuration period is greater than a preset duration threshold, the time domain information of the control channel resource set includes a time domain offset of the control channel resource set, and the time domain offset of the control channel resource set indicates duration between a starting time domain position of a control channel resource set associated with the first common signal block in the common signal block detection window and a starting position of a system frame in which the control channel resource set is located, and the first indication information used to indicate the first time unit is determined based on the time domain offset of the control channel resource set.

Optionally, with reference to the first aspect or the second aspect, in an implementation, when the time domain offset of the control channel resource set is greater than or equal to a preset offset threshold, a sequence number corresponding to a position of the first time unit indicated by the first indication information in the random access configuration period is an even number, or when a time domain offset of the control channel resource set is less than the preset offset threshold, a sequence number corresponding to a position of the first time unit indicated by the first indication information in the random access configuration period is an odd number.

Therefore, in the embodiments of this application, a position of a first time unit (namely, a system frame) to which the time domain resource for the RO belongs is determined based on a value of the time domain offset of the control channel resource set, thereby avoiding a conflict with a control channel resource to the greatest extent, increasing a quantity of valid ROs, and improving random access efficiency.

Optionally, with reference to the first aspect or the second aspect, in an implementation, the second indication information used to indicate the at least one second time unit is determined based on a time domain position of the common signal block.

Optionally, with reference to the first aspect or the second aspect, in an implementation, the at least one second time unit indicated by the second indication information is located at a time domain position other than an optional time domain position of the common signal block in the first time unit.

Therefore, in the embodiments of this application, a second time unit to which the time domain resource for the RO belongs is determined based on the time domain position of the common signal block, thereby avoiding a conflict with the time domain position of the common signal block to the greatest extent, increasing a quantity of valid ROs, and improving random access efficiency.

Optionally, with reference to the first aspect or the second aspect, in an implementation, the second indication information used to indicate the at least one second time unit is determined based on an optional time domain position of the common signal block and/or an index of the first time unit.

Optionally, with reference to the first aspect or the second aspect, in an implementation, the at least one second time unit includes a first group of second time units and a second group of second time units, the first group of second time units is located at a time domain position other than an optional time domain position of the common signal block in the first half time domain part of the first time unit, the second group of second time units is located at a time domain position other than an optional time domain position of the common signal block in the second half time domain part of the first time unit, and when the index of the first time unit is an even number, the time domain resource for the at least one random access preamble occasion (RO) belongs to the first group of second time units indicated by the second indication information, or when the index of the first time unit is an odd number, the time domain resource for the at least one random access preamble occasion (RO) belongs to the second group of second time units indicated by the second indication information.

Optionally, with reference to the first aspect or the second aspect, in an implementation, the preset offset threshold is one of 2, 2.5, 5, 7, and 7.5.

Optionally, with reference to the first aspect or the second aspect, in an implementation, the time domain information of the control channel resource set includes a time domain position of the control channel resource set in the third time unit, and the fifth indication information used to indicate the starting time domain position of the RO in the third time unit is determined based on a time domain position of the control channel resource set in the third time unit, and the starting time domain position of the RO in the third time unit is after a time domain position of a preset control channel resource set in the third time unit, or the starting time domain position that is of the RO in the third time unit and that is indicated by the fifth indication information is a starting time domain position of the third time unit or a preset time domain position in the third time unit.

Optionally, with reference to the first aspect or the second aspect, in an implementation, the starting time domain position of the RO indicates a position, in the third time unit, of the first fourth time unit in at least one fourth time unit that is in the third time unit and that is occupied by the RO, and when the starting time domain position of the RO in the third time unit is after a time domain position of the last control channel resource set in the third time unit, a value of a sequence number of the fourth time unit corresponding to the starting time domain position of the RO in the third time unit is one of the following three: one time a time domain length of the control channel resource set in the third time unit, twice the time domain length of the control channel resource set in the third time unit, and a sum of a sequence number of a starting fourth time unit in the control channel resource set in the third time unit and one time the time domain length of the control channel resource set.

Therefore, in the embodiments of this application, a position of the time domain resource for the RO is determined based on the time domain position of the control channel resource set, thereby avoiding a conflict with a control channel resource to the greatest extent, increasing a quantity of valid ROs, and improving random access efficiency.

Optionally, with reference to the first aspect or the second aspect, in an implementation, the fourth indication information used to indicate the quantity of ROs in the third time unit is determined based on the starting time domain position of the RO in the third time unit and a length of a time domain resource occupied by the preamble sequence.

Optionally, with reference to the first aspect or the second aspect, in an implementation, the quantity that is of ROs in the third time unit and that is indicated by the fourth indication information is less than or equal to a ratio of a length of a time domain resource between the starting time domain position of the RO and an ending time domain position of the third time unit to the length of the time domain resource occupied by the preamble sequence.

Optionally, with reference to the first aspect or the second aspect, in an implementation, the first time unit is a system frame, the second time unit is a subframe or is of 0.25 ms, and the third time unit is a slot.

Optionally, in an implementation of the first aspect, the method further includes: sending, by the terminal device, a preamble sequence on the time domain resource for the at least one RO that is configured by using the first configuration information.

Therefore, in the embodiments of this application, the time domain resource for the RO is determined based on the time domain resource for the common signal block and/or the time domain information of the control channel resource set, thereby reducing a probability that the resource for the RO collides with a downlink resource (for example, an SSB and/or an RMSI CORESET), increasing a quantity of valid ROs in a PRACH configuration period, and improving random access efficiency of the terminal device.

Optionally, in an implementation of the first aspect, when time domain resources for one or more ROs in the time domain resource for the at least one RO conflict with a time domain resource for the common signal block or a time domain resource for the control channel resource set, the method further includes: skipping, by the terminal device, sending a preamble sequence on the time domain resources for the one or more ROs that conflict with the time domain resource for the common signal block or the time domain resource for the control channel resource set.

Optionally, the terminal device receives the time domain resource for the common signal block or the time domain resource for the control channel resource set on the time domain resources for the one or more ROs that conflict with the time domain resource for the common signal block or the time domain resource for the control channel resource set.

Therefore, in the embodiments of this application, when a resource conflict exists, a preamble sequence is not sent on a conflicting resource, thereby avoiding unnecessary and useless work, and avoiding a random access failure.

Optionally, in an implementation of the first aspect, when time domain resources for one or more ROs in the time domain resource for the at least one RO are located on a non-uplink resource in a semi-static uplink/downlink configuration, the method further includes: sending, by the terminal device, a preamble sequence on the time domain resource for the at least one RO that is configured by using the first configuration information.

Therefore, in the embodiments of this application, the preamble sequence is still sent when a selected time domain resource for one group of ROs does not match the semi-static uplink/downlink configuration, thereby improving a success rate of random access.

Optionally, in an implementation of the second aspect, when time domain resources for one or more ROs in the time domain resource for the at least one RO conflict with a time domain resource for the common signal block or a time domain resource for the control channel resource set, the method further includes: skipping, by the network device, receiving a preamble sequence on the time domain resources for the one or more ROs that conflict with the time domain resource for the common signal block or the time domain resource for the control channel resource set.

Optionally, the network device sends the time domain resource for the common signal block or the time domain resource for the control channel resource set on the time domain resources for the one or more ROs that conflict with the time domain resource for the common signal block or the time domain resource for the control channel resource set.

Optionally, in an implementation of the second aspect, when time domain resources for one or more ROs in the time domain resource for the at least one RO are located on a non-uplink resource in a semi-static uplink/downlink configuration, the method further includes: receiving, by the network device on the time domain resource for the at least one RO that is configured by using the first configuration information, a preamble sequence sent by the terminal device.

Optionally, the network device does not receive an uplink/downlink signal, other than the preamble sequence, sent by the terminal device on the determined time domain resource for the group of ROs.

According to a third aspect, a communication method is provided. The method includes: receiving, by a terminal device, index indication information, where the index indication information is used to indicate a first configuration index, determining, by the terminal device based on the first configuration index, first configuration information corresponding to the first configuration index, where the first configuration information is used to indicate a time domain resource for a first group of random access preamble occasions (ROs) or a time domain resource for a second group of ROs, the time domain resource for the first group of ROs and the time domain resource for the second group of ROs are located in a first time unit in a random access configuration period, and the time domain resource for the first group of ROs or the time domain resource for the second group of ROs is determined based on a time domain offset of a control channel resource set and/or an index of the first time unit, and determining, by the terminal device, a time domain resource for one group of ROs, where the time domain resource for the group of ROs is the time domain resource for the first group of ROs or the time domain resource for the second group of ROs.

According to a fourth aspect, a communication method is provided. The method includes: generating, by a network device, index indication information, where the index indication information is used to indicate a first configuration index, and sending, by the network device, the index indication information to a terminal device, where the index indication information is used by the terminal device to determine, based on the first configuration index, first configuration information corresponding to the first configuration index, the first configuration information is used to indicate a time domain resource for a first group of random access preamble occasions (ROs) or a time domain resource for a second group of ROs, so that the terminal device determines a time domain resource for one group of ROs, the time domain resource for the group of ROs is the time domain resource for the first group of ROs or the time domain resource for the second group of ROs, the time domain resource for the first group of ROs and the time domain resource for the second group of ROs are located in a first time unit in a random access configuration period, and the time domain resource for the first group of ROs or the time domain resource for the second group of ROs is determined based on a time domain offset of the control channel resource set and/or an index of the first time unit.

Specifically, the network device may first determine a time domain resource for a common signal block and/or time domain information of the control channel resource set, and then the network device may determine the time domain resource for the RO (that is, determine configuration information corresponding to the time domain resource for the RO) based on the time domain resource for the common signal block and/or the time domain information of the control channel resource set. Subsequently, the network device may determine, based on a prestored one-to-one correspondence between a plurality of configuration indexes and a plurality of sets of configuration information, a configuration index corresponding to the time domain resource for the RO. Finally, the network device configures the first configuration index for the terminal device by using the index indication information. Further, the terminal device may determine, in the prestored one-to-one correspondence between a plurality of configuration indexes and a plurality of sets of configuration information based on the first configuration index, the first configuration information corresponding to the first configuration index, and then the terminal device may determine the time domain resources for the two groups of ROs based on the first configuration information, and select a time domain resource for one group of ROs from the time domain resources for the two groups of ROs.

Therefore, in the embodiments of this application, the time domain resource for the RO is determined based on the time domain offset of the control channel resource set and/or the index of the first time unit, thereby reducing a probability that the resource for the RO collides with a downlink resource (for example, an SSB and/or an RMSI CORESET), increasing a quantity of valid ROs in a PRACH configuration period, and improving random access efficiency of the terminal device.

Optionally, with reference to the third aspect or the fourth aspect, in an implementation, the first configuration information includes at least one of the following information: first indication information used to indicate the first time unit in the random access configuration period, second indication information used to indicate at least one second time unit in the first time unit, where the at least one second time unit includes a first group of second time units and a second group of second time units, the time domain resource for the first group of ROs belongs to the first group of second time units, and the time domain resource for the second group of ROs belongs to the second group of second time units, third indication information used to indicate a quantity of third time units included in each second time unit in the first group of second time units and the second group of second time units, fourth indication information used to indicate a quantity of ROs in the third time unit, and fifth indication information used to indicate a starting time domain position of an RO in the third time unit.

Optionally, with reference to the third aspect or the fourth aspect, in an implementation, the random access configuration period is greater than a preset duration threshold, and the time domain offset of the control channel resource set indicates duration between a starting time domain position of a control channel resource set associated with the first common signal block in the common signal block detection window and a starting position of a system frame in which the control channel resource set is located, and the first indication information used to indicate the first time unit is determined based on the time domain offset of the control channel resource set.

Optionally, with reference to the third aspect or the fourth aspect, in an implementation, when the time domain offset of the control channel resource set is greater than or equal to a preset offset threshold, a sequence number corresponding to a position of the first time unit indicated by the first indication information in the random access configuration period is an even number, or when the time domain offset of the control channel resource set is less than a preset offset threshold, a sequence number corresponding to a position of the first time unit indicated by the first indication information in the random access configuration period is an odd number.

Optionally, with reference to the third aspect or the fourth aspect, in an implementation, the second indication information used to indicate the at least one second time unit is determined based on a time domain position of the common signal block.

Optionally, with reference to the third aspect or the fourth aspect, in an implementation, the at least one second time unit indicated by the second indication information is located at a time domain position other than an optional time domain position of the common signal block in the first time unit.

Optionally, with reference to the third aspect or the fourth aspect, in an implementation, the second indication information used to indicate the at least one second time unit is determined based on an optional time domain position of the common signal block and/or the index of the first time unit.

Optionally, with reference to the third aspect or the fourth aspect, in an implementation, the first group of second time units is located at a time domain position other than an optional time domain position of the common signal block in the first half time domain part of the first time unit, the second group of second time units is located at a time domain position other than an optional time domain position of the common signal block in the second half time domain part of the first time unit, and the determining, by the terminal device, a time domain resource for one group of ROs includes: determining, by the terminal device, the time domain resource for the group of ROs based on the index of the first time unit, where when the index of the first time unit is an even number, the time domain resource for the group of ROs that is determined by the terminal device is the time domain resource for the first group of ROs, or when the index of the first time unit is an odd number, the time domain resource for the group of ROs that is determined by the terminal device is the time domain resource for the second group of ROs.

Optionally, with reference to the third aspect or the fourth aspect, in an implementation, the preset offset threshold is one of 2, 2.5, 5, 7, and 7.5.

Optionally, with reference to the third aspect or the fourth aspect, in an implementation, the fifth indication information used to indicate the starting time domain position of the RO in the third time unit is determined based on a time domain position of the control channel resource set in the third time unit, and the starting time domain position of the RO in the third time unit is after a time domain position of a preset control channel resource set in the third time unit, or the starting time domain position that is of the RO in the third time unit and that is indicated by the fifth indication information is a starting time domain position of the third time unit or a preset time domain position in the third time unit.

Optionally, with reference to the third aspect or the fourth aspect, in an implementation, the starting time domain position of the RO indicates a position, in the third time unit, of the first fourth time unit in at least one fourth time unit that is in the third time unit and that is occupied by the RO, and when the starting time domain position of the RO in the third time unit is after a time domain position of the last control channel resource set in the third time unit, a value of a sequence number of the fourth time unit corresponding to the starting time domain position of the RO in the third time unit is one of the following three: one time a time domain length of the control channel resource set in the third time unit, twice the time domain length of the control channel resource set in the third time unit, and a sum of a sequence number of a starting fourth time unit in the control channel resource set in the third time unit and one time the time domain length of the control channel resource set.

Optionally, with reference to the third aspect or the fourth aspect, in an implementation, the fourth indication information used to indicate the quantity of ROs in the third time unit is determined based on the starting time domain position of the RO in the third time unit and a length of a time domain resource occupied by the preamble sequence.

Optionally, with reference to the third aspect or the fourth aspect, in an implementation, the quantity that is of ROs in the third time unit and that is indicated by the fourth indication information is less than or equal to a ratio of a length of a time domain resource between the starting time domain position of the RO and an ending time domain position of the third time unit to the length of the time domain resource occupied by the preamble sequence.

Optionally, with reference to the third aspect or the fourth aspect, in an implementation, the first time unit is a system frame, the second time unit is a subframe or is of 0.25 ms, and the third time unit is a slot.

Optionally, with reference to the third aspect, in an implementation, the method further includes: sending, by the terminal device, a preamble sequence on the determined time domain resource for the group of ROs.

Optionally, with reference to the third aspect, in an implementation, when time domain resources for one or more ROs in the time domain resource for the group of ROs that is determined by the terminal device conflict with a time domain resource for the common signal block or a time domain resource for the control channel resource set, the method further includes: skipping, by the terminal device, sending a preamble sequence on the time domain resources for the one or more ROs that conflict with the time domain resource for the common signal block or the time domain resource for the control channel resource set.

Optionally, the terminal device receives the time domain resource for the common signal block or the time domain resource for the control channel resource set on the time domain resources for the one or more ROs that conflict with the time domain resource for the common signal block or the time domain resource for the control channel resource set.

Optionally, with reference to the third aspect, in an implementation, when time domain resources for one or more ROs in the time domain resource for the group of ROs that is determined by the terminal device are located on a non-uplink resource in a semi-static uplink/downlink configuration, the method further includes: sending, by the terminal device, a preamble sequence on the determined time domain resource for the group of ROs.

Optionally, with reference to the fourth aspect, in an implementation, the method further includes: receiving, by the network device, a preamble sequence that is sent by the terminal device on the determined time domain resource for the group of ROs.

Optionally, with reference to the fourth aspect, in an implementation, when time domain resources for one or more ROs in the time domain resource for the group of ROs that is determined by the terminal device conflict with a time domain resource for the common signal block or a time domain resource for the control channel resource set, the method further includes: skipping, by the network device, receiving a preamble sequence on the time domain resources for the one or more ROs that conflict with the time domain resource for the common signal block or the time domain resource for the control channel resource set.

Optionally, the network device sends the time domain resource for the common signal block or the time domain resource for the control channel resource set on the time domain resources for the one or more ROs that conflict with the time domain resource for the common signal block or the time domain resource for the control channel resource set.

Optionally, with reference to the fourth aspect, in an implementation, when time domain resources for one or more ROs in the time domain resource for the group of ROs that is determined by the terminal device are located on a non-uplink resource in a semi-static uplink/downlink configuration, the method further includes: receiving, by the network device, a preamble sequence that is sent by the terminal device on the time domain resource for the group of ROs.

Optionally, the network device does not receive an uplink/downlink signal, other than the preamble sequence, sent by the terminal device on the determined time domain resource for the group of ROs.

According to a fifth aspect, a communication method is provided. The method includes: receiving, by a terminal device, index indication information, where the index indication information is used to indicate a first configuration index, determining, by the terminal device based on the first configuration index, a time domain resource for at least one random access preamble occasion (RO) corresponding to the first configuration index, and when the terminal device determines that time domain resources for one or more ROs in the time domain resource for the at least one RO conflict with a time domain resource for a common signal block or a time domain resource for a control channel resource set, skipping, by the terminal device, sending a preamble sequence on the time domain resources for the one or more ROs that conflict with the time domain resource for the common signal block or the time domain resource for the control channel resource set, or when the terminal device determines that time domain resources for one or more ROs in the time domain resource for the at least one RO are located on a non-uplink resource in a semi-static uplink/downlink configuration, sending, by the terminal device, a preamble sequence on the time domain resource for the at least one RO.

According to a sixth aspect, a communication method is provided. The method includes: generating, by a network device, index indication information, where the index indication information is used to indicate a first configuration index, sending, by the network device, the index indication information to a terminal device, where the index indication information is used by the terminal device to determine, based on the first configuration index, a time domain resource for at least one random access preamble occasion (RO) corresponding to the first configuration index, and when the network device determines that time domain resources for one or more ROs in the time domain resource for the at least one RO conflict with a time domain resource for a common signal block or a time domain resource for a control channel resource set, skipping, by the network device, receiving a preamble sequence on the time domain resources for the one or more ROs that conflict with the time domain resource for the common signal block or the time domain resource for the control channel resource set, or when the network device determines that time domain resources for one or more ROs in the time domain resource for the at least one RO are located on a non-uplink resource in a semi-static uplink/downlink configuration, receiving, by the network device, a preamble sequence that is sent by the terminal device on the time domain resource for the at least one RO that is configured by using the first configuration information.

Therefore, in the embodiments of this application, when a resource conflict exists, a preamble sequence is not sent on a conflicting resource, thereby avoiding unnecessary and useless work, and avoiding a random access failure. In addition, in the embodiments of this application, the preamble sequence is still sent when a selected time domain resource for one group of ROs does not match the semi-static uplink/downlink configuration, thereby improving a success rate of random access.

According to a seventh aspect, a terminal device is provided. The terminal device includes modules or units configured to perform the method according to any one of the first aspect, the third aspect, the fifth aspect, or the possible implementations of the first aspect, the third aspect, or the fifth aspect.

According to an eighth aspect, a network device is provided. The network device includes modules or units configured to perform the method according to any one of the second aspect, the fourth aspect, the sixth aspect, or the possible implementations of the second aspect, the fourth aspect, or the sixth aspect.

According to a ninth aspect, a terminal device is provided. The terminal device includes a transceiver, a processor, and a memory. The processor is configured to control the transceiver to receive and send a signal. The memory is configured to store a computer program. The processor is configured to invoke the computer program from the memory and run the computer program, so that the terminal device performs the method according to any one of the first aspect, the third aspect, the fifth aspect, or the possible implementations of the first aspect, the third aspect, or the fifth aspect.

According to a tenth aspect, a network device is provided. The network device includes a transceiver, a processor, and a memory. The processor is configured to control the transceiver to receive and send a signal. The memory is configured to store a computer program. The processor is configured to invoke the computer program from the memory and run the computer program, so that the terminal device performs the method according to any one of the second aspect, the fourth aspect, the sixth aspect, or the possible implementations of the second aspect, the fourth aspect, or the sixth aspect.

According to an eleventh aspect, a computer-readable medium is provided. The computer-readable medium stores a computer program. When the computer program is executed by a computer, the method according to any one of the first aspect to the sixth aspect or the possible implementations of the first aspect to the sixth aspect is implemented.

According to a twelfth aspect, a computer program product is provided. When the computer program product is executed by a computer, the method according to any one of the first aspect to the sixth aspect or the possible implementations of the first aspect to the sixth aspect is implemented.

According to a thirteenth aspect, a processing apparatus is provided. The processing apparatus includes a processor and an interface.

The processor is configured to perform the method according to any one of the first aspect to the sixth aspect or the possible implementations of the first aspect to the sixth aspect. A related data exchange process (for example, performing data transmission or receiving transmitted data) is completed by using the foregoing interface. In a specific implementation process, the interface may further complete the foregoing data exchange process by using a transceiver.

It should be understood that, the processing apparatus according to the thirteenth aspect may be a chip. The processor may be implemented by using hardware, or may be implemented by using software. When the processor is implemented by using the hardware, the processor may be a logic circuit, an integrated circuit, or the like, or when the processor is implemented by using the software, the processor may be a general-purpose processor, and is implemented by reading software code stored in the memory. The memory may be integrated into the processor, or may be located outside the processor, and exist independently.

DETAILED DESCRIPTION OF ILLUSTRATIVE EMBODIMENTS

Figure 1:
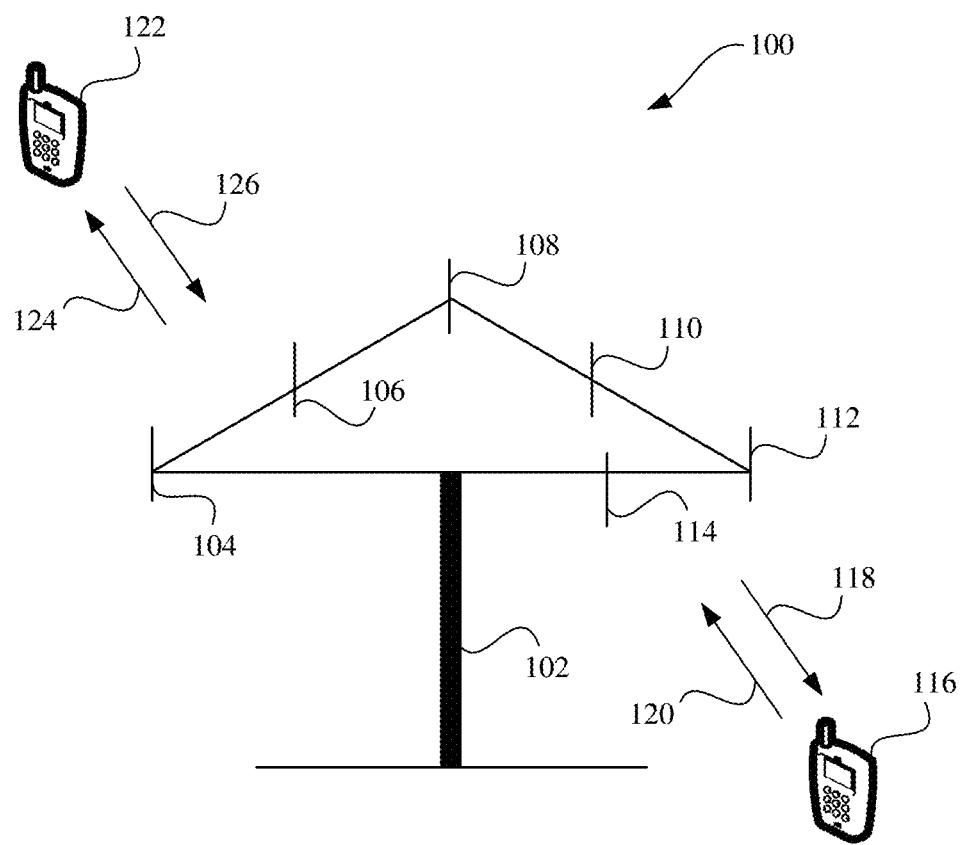
FIG. 1 is a schematic diagram of a scenario of a communications system to which an embodiment of this application is applicable.

The following describes technical solutions of this application with reference to the accompanying drawings.

Embodiments of this application are applicable to various communications systems. Therefore, the following descriptions are not limited to a particular communications system. A next-generation communications system is a 5th generation (5G) communications system, such as a new radio (NR) system.

In the embodiments of this application, a network device may be a network side device in a future 5G network, for example, a transmission point (TRP or TP) in an NR system, a gNB (gNB) in an NR system, or a radio frequency unit in an NR system, such as a remote radio unit or one antenna panel or a group of antenna panels (including a plurality of antenna panels) of a base station in a 5G system. Different network devices may be located in a same cell, or may be located in different cells. This is not specifically limited herein.

In some deployments, the gNB may include a centralized unit (CU) and a distributed unit (DU). The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information on the RRC layer eventually becomes information on the PHY layer, or is converted from information on the PHY layer. Therefore, in this architecture, higher layer signaling, such as RRC layer signaling or PHCP layer signaling, may also be considered as being sent by the DU or sent by the DU and the RU. It may be understood that the network device may be a CU node, a DU node, or a device including a CU node and a DU node. In addition, the CU may be classified into a network device in an access network RAN, or the CU may be classified into a network device in a core network CN. This is not limited herein.

The terminal device in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a drone device, a terminal device in a future 5G network, or a terminal device in a future evolved public land mobile network (PLMN). This is not limited in the embodiments of this application.

By way of example but not limitation, in the embodiments of the present disclosure, the terminal device may also be a wearable device. The wearable device may also be referred to as a wearable intelligent device, and is a generic name of wearable devices developed by intelligently designing daily wear by using a wearable technology, such as glasses, gloves, a watch, clothing, or shoes. A wearable device is a portable device that can be directly worn on a body or integrated into clothes or an accessory of a user. The wearable device is not merely a hardware device, and further implements powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

The embodiments of this application are applicable to any one of the foregoing communications systems. For example, the embodiments of this application are applicable to an LTE system and a subsequent evolved system such as 5G, or other wireless communications systems using various radio access technologies, for example, a system using an access technology such as code division multiple access, frequency division multiple access, orthogonal frequency division multiple access, or single-carrier frequency division multiple access, especially applicable to a scenario in which a channel information feedback is required and/or a two-stage precoding technology is applied, for example, a wireless network to which a massive array antenna (Massive MIMO) technology is applied, or a wireless network to which a distributed antenna technology is applied.

It should be understood that the term "and/or" in this specification describes only an association relationship for describing associated objects and represents that three relationships may exist. For example, A and/or B may represent the following three cases: Only A exists, both A and B exist, and only B exists.

FIG. 1 is a schematic diagram of a scenario of a communications system 100 to which an embodiment of this application is applicable. As shown in FIG. 1, the communications system 100 includes a network side device 102 and a plurality of terminal devices (such as a terminal device 116 and a terminal device 122). The network device 102 may provide a communications service for the terminal device and access a core network. The terminal device accesses a network by searching for a synchronization signal, a broadcast signal, or the like that is sent by the network device, to communicate with the network, for example, perform uplink/downlink transmission.

Specifically, the network side device 102 may include a plurality of antenna groups. Each antenna group may include a plurality of antennas. For example, one antenna group may include antennas 104 and 106, another antenna group may include antennas 106 and 110, and an additional group may include antennas 112 and 114. FIG. 1 shows two antennas for each antenna group, but each group may include more or fewer antennas. The network side device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

The network side device 102 may communicate with a plurality of terminal devices (such as the terminal device 116 and the terminal device 122). However, it may be understood that the network side device 102 may communicate with any quantity of terminal devices similar to the terminal device 116 or 122.

As shown in FIG. 1, the terminal device 116 communicates with the antennas 112 and 114. The antennas 112 and 114 send information to the terminal device 116 through a forward link 118, and receive information from the terminal device 116 through a reverse link 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD) system, for example, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna group and/or area designed for communication is referred to as a sector of the network side device 102. For example, an antenna group may be designed to communicate with a terminal device in a sector within coverage of the network side device 102. In a process in which the network side device 102 communicates with the terminal devices 116 and 122 by using the forward links 118 and 124 respectively, a transmit antenna of the network side device 102 may increase signal-to-noise ratios of the forward links 118 and 124 through beamforming. In addition, compared with a manner in which the network side device sends signals to all terminal devices of the network side device by using a single antenna, when the network side device 102 sends, through beamforming, signals to the terminal devices 116 and 122 that are randomly distributed within related coverage, a mobile device in a neighboring cell is subject to relatively less interference.

At a given time, the network side device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of data, and the transport block may be segmented to generate a plurality of code blocks.

In addition, the communications system 100 may be a public land mobile network PLMN network, a device-to-device (D2D) network, a machine-to-machine (M2M) network, or another network. FIG. 1 is merely a simplified schematic diagram of an example used for ease of understanding, and the network may further include another network device that is not shown in FIG. 1.

As described above, when the terminal device needs to access a network (for example, after the terminal device is powered on, or when the terminal device needs to be reconnected after being disconnected from the network device), the terminal device may first complete downlink synchronization by searching for an SSB, and then obtain a system message. Subsequently, the terminal device may initiate a random access procedure by sending a random access preamble sequence, to establish a connection to a cell and achieve uplink synchronization. A resource occupied by the preamble sequence sent by the terminal device belongs to a resource for a random access occasion (RO) configured by the network device.

Currently, in NR, only PRACH configurations in some frequency bands and systems (for example, the FDD system) are specified in an existing protocol. Because there is a relatively large difference between SSB and RMSI configurations corresponding to different frequency bands or different systems (for example, the FDD system or the TDD system), if the foregoing configuration is directly and simply applied to another frequency band or system, a probability that the resource for the RO collides with a downlink resource (for example, an SSB and/or an RMSI CORESET) may be greatly increased. Consequently, there are a relatively small quantity of valid ROs in a RACH configuration period, and random access efficiency of the terminal device is lowered.

In view of the foregoing problem, embodiments of this application provide a communication method, to reduce a probability that a resource for an RO collides with a downlink resource (for example, an SSB and/or an RMSI CORESET), increase a quantity of valid ROs in a PRACH configuration period, and improve random access efficiency of a terminal device.

In other words, the resource for the RO that is configured in the embodiments of this application can avoid an SSB and/or RMSI CORESET resource as much as possible, so that according to the embodiments of this application, a resource collision probability can be reduced, a quantity of valid ROs in the RACH configuration period can be increased, and random access efficiency of the terminal device can be improved.

For ease of understanding and description, by way of example and not limitation, the following describes an execution process and an execution action in the communication method in a communications system in this application.

First, to make the method in the embodiments of this application easier to understand, some concepts in the embodiments of this application are described below.

In the embodiments of this application, one SSB occupies four consecutive orthogonal frequency division multiplexing (OFDM) symbols. An SSB detection window is a time window that is defined in NR and whose duration is 5 ms. A maximum of L SSBs can be transmitted in the SSB detection window of 5 ms. For different frequency bands, a value of L is as follows:

L=4 in a frequency band below 3 GHz;
L=8 or 16 in a frequency band from 3 GHz to 6 GHz; or
L=64 in a frequency band from 6 GHz to 52.6 GHz.

The SSB supports subcarrier spacings of 15 kHz, 30 kHz, 120 kHz, and 240 kHz. For different subcarrier spacings, in one SSB detection window, mapping patterns configured for SSBs in time domain are different. For each specific mapping pattern, refer to a definition in an existing standard. To avoid repetition, details are not described herein.

The resource for the RO that is configured in the embodiments of this application need to avoid the SSB and/or RMSI CORESET resource. Therefore, before the embodiments of this application are described, the following first describes, with reference to FIG. 2, three multiplexing patterns of SSBs and RMSI CORESETs that are defined in NR based on a current NR protocol.

Figure 2:
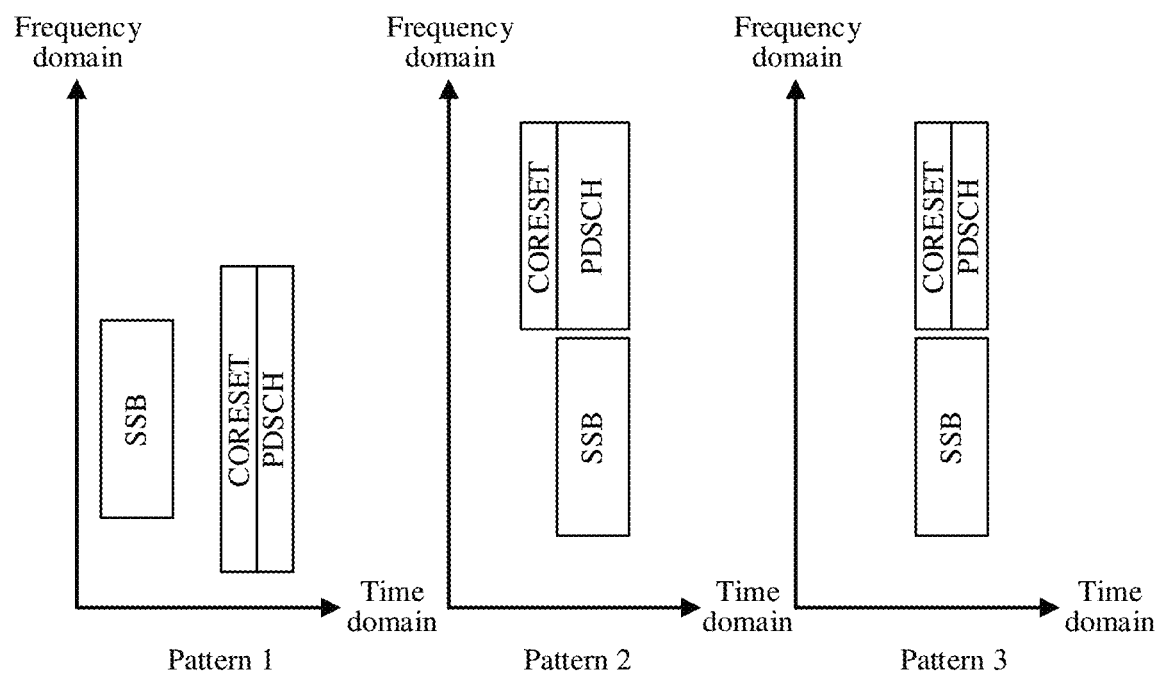
FIG. 2 is a schematic diagram of a multiplexing pattern of an SSB and an RMSI CORESET according to an embodiment of this application.

As shown in FIG. 2, there are three types of configuration patterns of an SSB and an RMSI CORESET/a PDSCH, namely, a pattern 1 to a pattern 3. In the pattern 1, an SSB and an RMSI CORESET are located at different moments. A transmission bandwidth of the SSB partially overlaps an initial access downlink bandwidth part of the RMSI CORESET. In other words, time division transmission is performed on the SSB and the RMSI CORESET. In the pattern 2, an SSB and an RMSI CORESET are located at different moments. A transmission bandwidth of the SSB does not overlap an initial access downlink bandwidth part including the RMSI CORESET. In other words, frequency division transmission is performed on the SSB and the RMSI CORESET. In the pattern 3, an SSB and an RMSI CORESET are located at a same moment. A transmission bandwidth of the SSB does not overlap an initial access downlink bandwidth part including the RMSI CORESET. In this case, frequency division transmission is also performed on the SSB and the RMSI CORESET.

Currently, in NR, below 6 GHz, subcarrier spacings corresponding to an SSB and an RMSI CORESRET are 15 kHz or 30 kHz. Above 6 GHz, a subcarrier spacing corresponding to an SSB is 120 kHz or 240 kHz, and a subcarrier spacing corresponding to an RMSI CORESRET may be 60 kHz or 120 kHz.

Subcarrier spacing (SCS) combinations for an SSB and an RMSI CORESET that are supported in NR include: {SSB SCS, RMSI CORESET SCS}={15, 15}, {15, 30}, {30, 15}, {30, 30}, {120, 60}, {120, 120}, {240, 60}, and {240, 120} kHz.

The SSBs and the RMSI CORESETs in the pattern 2 and the pattern 3 occupy a same slot. Therefore, the SSB and the RMSI CORESET can be avoided provided that a time domain resource for the RO avoids one of the SSB and the RMSI CORESET. In the pattern 1, time domain resources occupied by the SSB and the RMSI CORESET are located at different moments. Therefore, to avoid the SSB and the RMSI CORESET, the time domain resource for the RO need to avoid both the SSB and the RMSI CORESET with respect of the time domain resource. Therefore, a configuration solution for the pattern 1 is more complex than those for the pattern 2 and the pattern 3.

In the embodiments of this application, a solution for the pattern 1, that is, how to configure a resource for an RO in a TDD system is mainly described below. Solutions for the pattern 2 and the pattern 3 may be obtained by referring to the solution for the pattern 1. Details are not described in the embodiments of this application.

After a multiplexing pattern of the SSB and the RMSI CORESET is clarified, in the embodiments of this application, a time domain position of the resource for the RO needs to be configured for distribution of SSB and RMSI CORESET resources, to avoid the SSB and RMSI CORESET resources, thereby improving a success rate of sending a preamble sequence on the resource for the RO by the terminal device.

A preamble sequence in NR is described below.

Two types of random access preambles are defined in NR:

a first type of random access preambles: four long sequences with a sequence length of 839 and sequence formats 0 to 3, and a second type of random access preambles: nine short sequences with a sequence length of 139 and sequence formats including A1, A2, A3, B1, B2, B3, B4, C0, and C2.

Sizes of time domain resources occupied by the foregoing different types of preamble sequences in different formats may be different. For a specific definition of each sequence, refer to descriptions in an existing standard. Details are not described herein.

In conclusion, it can be learned that NR supports a plurality of subcarrier spacings, flexible TDD semi-static uplink/downlink configurations, flexible and complex time domain configurations of an SSB/RMSI, and a plurality of random access preamble formats. Therefore, a new design needs to be made for a PRACH configuration.

A specific PRACH configuration method in an embodiment of this application is described below with reference to FIG. 3.

Figure 3:
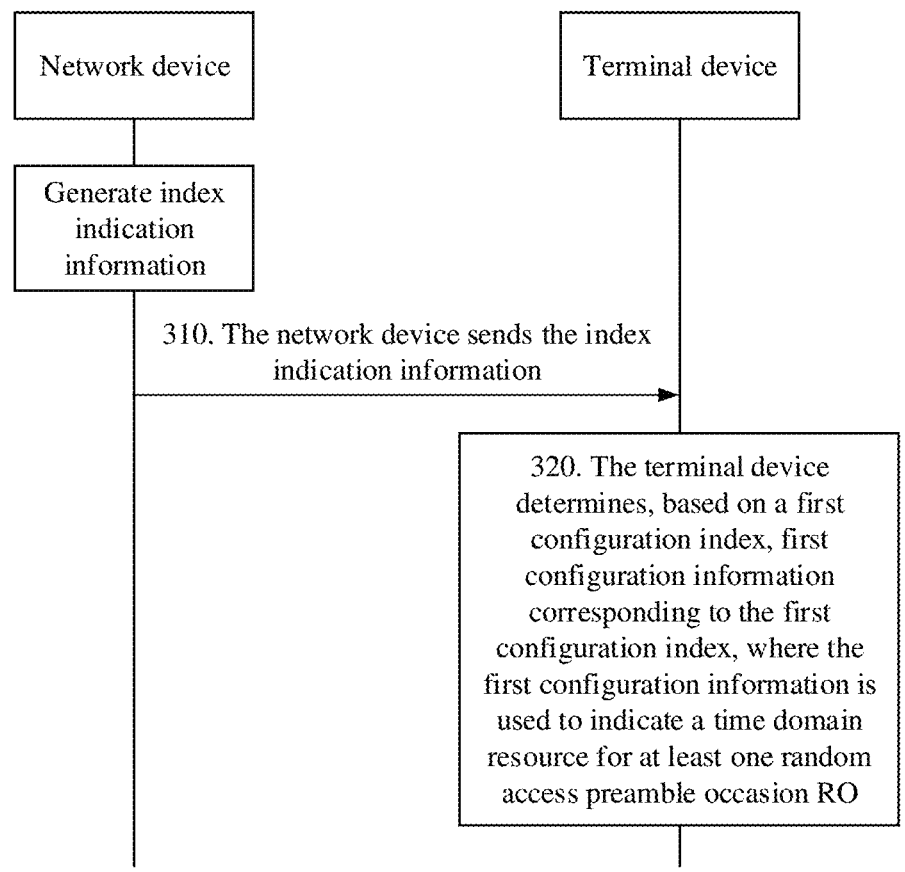
FIG. 3 is a schematic flowchart of a communication method according to an embodiment of this application.

FIG. 3 is a schematic flowchart of a communication method 300 according to an embodiment of the present disclosure. The method shown in FIG. 3 may be applied to any one of the foregoing communications systems. The communication method in this embodiment of this application is described from a perspective of a system in FIG. 3. Specifically, the method 300 shown in FIG. 3 includes the following steps.

310. A network device sends index indication information, where the index indication information is used to indicate a first configuration index.

Specifically, the network device first generates the index indication information, and then the network device sends the index indication information to a terminal device. Correspondingly, the terminal device receives the index indication information.

For example, the network device may send the index indication information by using RMSI. This embodiment of this application is not limited thereto.

Specifically, a size of the index indication information may be 8 bits, and the first configuration index indicated by the index indication information may be one of a plurality of (for example, less than or equal to 256) configuration indexes.

It should be understood that, in this embodiment of this application, the configuration index may be a PRACH configuration index.

In this embodiment of this application, the size of the index indication information may correspond to the plurality of configuration indexes. For example, a quantity of the plurality of configuration indexes is less than or equal to $2^n$, and the size of the index indication information may be n bits. This embodiment of this application is not limited thereto.

Optionally, the network device may further send subcarrier spacing indication information to the terminal device. A size of the subcarrier spacing indication information may be 1 bit, and the subcarrier spacing indication information is used to indicate a subcarrier spacing of a PRACH message 1 (preamble). For a frequency band below 6 GHz, a subcarrier spacing of the PRACH message 1 may be 15 kHz or 30 kHz. For a frequency band above 6 GHz, a subcarrier spacing of the PRACH message 1 may be 60 kHz or 120 kHz.

It should be understood that, in actual application, the network device may combine the index indication information and the subcarrier spacing indication information for sending together by using one piece of signaling, or may separately send the index indication information and the subcarrier spacing indication information. This embodiment of this application is not limited thereto.

320. The terminal device determines, based on the first configuration index, first configuration information corresponding to the first configuration index, where the first configuration information is used to indicate a time domain resource for at least one random access preamble occasion (RO), and the first configuration information is determined based on a time domain resource for a common signal block and/or time domain information of a control channel resource set.

In other words, the terminal device may determine the time domain resource for the at least one RO based on the first configuration index.

It should be understood that, in this embodiment of this application, the time domain information of the control channel resource set may include a time domain offset of the control channel resource set or a time domain position of the control channel resource set. This is not limited in this embodiment to this application.

Specifically, the terminal device may determine, based on a one-to-one correspondence between a plurality of configuration indexes and a plurality of sets of configuration information, the first configuration information corresponding to the first configuration index, where the first configuration index is one of the plurality of configuration indexes, and after determining the first configuration information, the terminal device may determine the time domain resource for the at least one random access preamble occasion (RO) based on the configuration information.

It should be understood that, in this embodiment of this application, both the terminal device and the network device learn of the one-to-one correspondence between a plurality of configuration indexes and a plurality of sets of configuration information in advance. In other words, both the terminal device and the network device prestore the one-to-one correspondence between a plurality of configuration indexes and a plurality of sets of configuration information.

Specifically, the network device may first determine the time domain resource for the common signal block and/or the time domain information of the control channel resource set, and then the network device may determine the time domain resource for the RO (that is, determine configuration information corresponding to the time domain resource for the RO) based on the time domain resource for the common signal block and/or the time domain information of the control channel resource set. Subsequently, the network device may determine, based on a prestored one-to-one correspondence between a plurality of configuration indexes and a plurality of sets of configuration information, a configuration index corresponding to the time domain resource for the RO. Finally, the network device configures the first configuration index for the terminal device by using the index indication information. Further, the terminal device may determine, in the prestored one-to-one correspondence between a plurality of configuration indexes and a plurality of sets of configuration information based on the first configuration index, the first configuration information corresponding to the first configuration index, and then the terminal device may determine the time domain resource for the at least one RO based on the first configuration information.

In this embodiment of this application, the time domain resource for the at least one RO is determined based on the time domain resource for the common signal block and/or the time domain information of the control channel resource set. Therefore, the resource for the RO that is configured in this embodiment of this application can avoid an SSB and/or RMSI CORESET resource to the greatest extent, thereby reducing a probability that the resource for the RO collides with a downlink resource (for example, an SSB and/or an RMSI CORESET), increasing a quantity of valid ROs in a PRACH configuration period, and improving random access efficiency of the terminal device.

It should be understood that, in this embodiment of this application, the common signal block may be an SS/PBCH block, and a control channel resource (set) may be an RMSI CORESET, an OSI CORESET, a control channel resource for a paging channel, a control channel resource for a random access response, or the like. An example in which the control channel resource is an RMSI CORESET is used below for description, but this embodiment of this application is not limited thereto. The RMSI CORESET may also be referred to as a CORESET of Typeo-PDCCH (the control resource set of the Typeo-PDCCH common search space). Configuration information of the CORESET of Typeo-PDCCH is indicated in a MIB, and may be indicated by using indication information pdcch-ConfigSIB1 in the MIB. High-order 4 bits and low-order 4 bits of the indication information jointly indicate a time-frequency resource position (for example, several consecutive RBs and several consecutive symbols) of the CORESET of Typeo-PDCCH. Typeo-PDCCH may be used to transmit scheduling information of a SIB 1 (which may also be referred to as RMSI).

Specifically, in this embodiment of this application, as shown in Table 1, there may be the following correspondences between configuration indexes and configuration information:

TABLE 1

| Configuration index | Configuration information |
|---|---|
| 0 | Configuration information 0 |
| 1 | Configuration information 1 |
| 2 | Configuration information 2 |
| ... | ... |

It can be learned from Table 1 that, there is a one-to-one correspondence between configuration indexes and configuration information. In actual application, after determining the configuration index, the terminal device may query Table 1 to obtain the configuration information corresponding to the configuration index, to determine the time domain resource for the RO.

It should be understood that, in this embodiment of this application, each set of configuration information may include at least one of the following information: first indication information used to indicate a first time unit in a random access configuration period, second indication information used to indicate at least one second time unit in the first time unit, third indication information used to indicate a quantity of third time units included in each of the at least one second time unit, fourth indication information used to indicate a quantity of ROs in the third time unit, and fifth indication information used to indicate a starting time domain position of an RO in the third time unit.

Optionally, in an embodiment, the first time unit is a system frame, the second time unit is a subframe or is of 0.25 ms, and the third time unit is a slot.

Optionally, in an embodiment, the starting time domain position of the RO indicates a position, in the third time unit, of the first fourth time unit in at least one fourth time unit that is in the third time unit and that is occupied by the RO.

It should be understood that, the first fourth time unit may alternatively be the first fourth time unit occupied by the first RO in at least one RO in the third time unit.

Optionally, in an embodiment, the fourth time unit may be an OFDM symbol.

A person skilled in the art may clearly understand that various numbers such as "first" and "second" in this application are for distinguishing only for ease of description, and are not intended to limit this embodiment of this application.

It should be understood that, a slot in the present disclosure may alternatively be a TTI and/or a time unit and/or a subframe and/or a mini-slot and/or the like. This embodiment of this application is not limited thereto.

Specifically, the terminal device determines, based on the first indication information, a sequence number of the first time unit in the configuration period (or a sequence number corresponding to a position of the first time unit in the configuration period), determines, based on the second indication information, a time domain position or a time domain sequence number of the second time unit in the first time unit (namely, the first time unit indicated by the first indication information), determines, based on the third indication information, the quantity of third time units in the second time unit, and finally determines, based on the fourth indication information and the fifth indication information, a time domain resource for the RO in each third time unit. It should be understood that, the time domain resource for the RO in the third time unit may include a sequence number of a starting fourth time unit (such as a symbol) of the RO in the third time unit and the quantity of ROs.

For example, the terminal device determines, based on the first indication information, a sequence number, in one configuration period, of a first time unit (a system frame) in which a time domain resource for at least one RO in the configuration period is located, determines, based on the second indication information, a sequence number of a subframe (1 ms) in the system frame (which may also be referred to as an index of a slot corresponding to a subcarrier of 15 kHz in a current system frame) or a specific time unit of 0.25 ms (which may also be referred to as an index of a slot corresponding to a subcarrier of 60 kHz in a current system frame), and then determines a quantity of slots in the subframe or 0.25 ms, and determine a starting symbol in the subframe or 0.25 ms and a quantity of ROs in each slot.

In other words, the time domain resource for the at least one RO includes resources in a plurality of slots, namely, time domain resources for a plurality of consecutive ROs starting from a starting symbol in each of the plurality of slots.

It should be noted that a name "configuration period" in this embodiment of this application is equivalent to a "PRACH period", and a name "symbol" is equivalent to an "OFDM symbol".

It should be understood that, in this embodiment of this application, the one-to-one correspondence between a plurality of configuration indexes and a plurality of sets of configuration information may be in a form of a table, for example, a PRACH configuration table. Optionally, the one-to-one correspondence between a plurality of configuration indexes and a plurality of sets of configuration information may alternatively be a group of symbols, a string of bit data, or the like. This embodiment of this application is not limited thereto.

For example, the PRACH configuration table may be a short preamble sequence configuration table below 6 GHz in TDD or a short preamble sequence configuration table above 6 GHz in TDD.

The short preamble sequence PRACH configuration table below 6 GHz in TDD is described below with reference to Table 2 and Table 3. Table 2 corresponds to Table 3. Both Table 2 and Table 3 are short preamble sequence PRACH configuration tables below 6 GHz. Table 2 and Table 3 respectively correspond to different solutions for configuring time domain resources for the RO. For details, refer to the following descriptions.

The short preamble sequence PRACH configuration table above 6 GHz in TDD is described in detail with reference to Table 4 and Table 5. Table 4 corresponds to Table 5. Both Table 4 and Table 5 are short preamble sequence PRACH configuration tables above 6 GHz. Table 4 and Table 5 respectively correspond to different solutions for configuring time domain resources for the RO. For details, refer to the following descriptions.

TABLE 2

| PRACH Config. Index | Preamble format | SFN mod x = y | | subframe number (1 ms) | Starting symbol | Number of PRACH slots within a subframe | Number of ROs within a RACH slot |
|---|---|---|---|---|---|---|---|
| | | x | y | | | | |
| 71 | A1 | 1 | 0 | 9 | 0 | 2 | 6 |
| 72 | A1 | 1 | 0 | 4 | 0 | 2 | 6 |
| 73 | A1 | 1 | 0 | 8 | 0 | 2 | 6 |
| 74 | A1 | 1 | 0 | 3 | 0 | 2 | 6 |
| 75 | A1 | 1 | 0 | 4, 9 | 0 | 1 | 6 |
| 76 | A1 | 1 | 0 | 3, 8 | 0 | 2 | 6 |
| 77 | A1 | 1 | 0 | 2, 7 | 0 | 1 | 6 |
| 78 | A1 | 1 | 0 | 4, 8, 9 | 0 | 2 | 6 |
| 79 | A1 | 1 | 0 | 3, 4, 8, 9 | 0 | 2 | 6 |
| 80 | A1 | 1 | 0 | 1, 3, 5, 7, 9 | 0 | 2 | 6 |
| 81 | A1 | 2 | 1 | 4, 9 | 0 | 1 | 6 |
| 82 | A1 | 2 | 1 | 3, 8 | 0 | 1 | 6 |
| 83 | A1 | 2 | 1 | 4 | 0 | 2 | 6 |
| 84 | A1 | 2 | 1 | 9 | 0 | 2 | 6 |
| 85 | A1 | 2 | 1 | 8 | 0 | 2 | 6 |
| 86 | A1 | 4 | 1 | 9 | 0 | 2 | 6 |
| 87 | A1 | 4 | 1 | 4, 9 | 0 | 1 | 6 |
| 88 | A1 | 8 | 1 | 9 | 0 | 2 | 6 |
| 89 | A1 | 8 | 1 | 4, 9 | 0 | 1 | 6 |
| 90 | A1 | 16 | 1 | 9 | 0 | 2 | 6 |
| 91 | A1 | 16 | 1 | 4, 9 | 0 | 1 | 6 |
| 92 | B1 | 1 | 0 | 9 | 0 | 2 | 7 |
| 93 | B1 | 1 | 0 | 4 | 0 | 2 | 7 |
| 94 | B1 | 1 | 0 | 8 | 0 | 2 | 7 |
| 95 | B1 | 1 | 0 | 3 | 0 | 2 | 7 |
| 96 | B1 | 1 | 0 | 4, 9 | 0 | 1 | 7 |
| 97 | B1 | 1 | 0 | 3, 8 | 0 | 2 | 7 |
| 98 | B1 | 1 | 0 | 2, 7 | 0 | 1 | 7 |
| 99 | B1 | 1 | 0 | 4, 8, 9 | 0 | 2 | 7 |
| 100 | B1 | 1 | 0 | 3, 4, 8, 9 | 0 | 2 | 7 |
| 101 | B1 | 1 | 0 | 1, 3, 5, 7, 9 | 0 | 2 | 7 |
| 102 | B1 | 2 | 1 | 4, 9 | 0 | 1 | 7 |
| 103 | B1 | 2 | 1 | 3, 8 | 0 | 1 | 7 |
| 104 | B1 | 2 | 1 | 4 | 0 | 2 | 7 |
| 105 | B1 | 2 | 1 | 9 | 0 | 2 | 7 |
| 106 | B1 | 2 | 1 | 8 | 0 | 2 | 7 |
| 107 | B1 | 4 | 1 | 9 | 0 | 2 | 7 |
| 108 | B1 | 4 | 1 | 4, 9 | 0 | 1 | 7 |
| 109 | B1 | 8 | 1 | 9 | 0 | 2 | 7 |
| 110 | B1 | 8 | 1 | 4, 9 | 0 | 1 | 7 |
| 111 | B1 | 16 | 1 | 9 | 0 | 2 | 7 |
| 112 | B1 | 16 | 1 | 4, 9 | 0 | 1 | 7 |
| 113 | A2 | 1 | 0 | 9 | 0 | 2 | 3 |
| 114 | A2 | 1 | 0 | 4 | 0 | 2 | 3 |
| 115 | A2 | 1 | 0 | 8 | 0 | 2 | 3 |
| 116 | A2 | 1 | 0 | 3 | 0 | 2 | 3 |
| 117 | A2 | 1 | 0 | 4, 9 | 0 | 1 | 3 |

TABLE 2-continued

| PRACH Config. Index | Preamble format | SFN mod x = y x | SFN mod x = y y | subframe number (1 ms) | Starting symbol | Number of PRACH slots within a subframe | Number of ROs within a RACH slot |
|---|---|---|---|---|---|---|---|
| 118 | A2 | 1 | 0 | 3, 8 | 0 | 2 | 3 |
| 119 | A2 | 1 | 0 | 2, 7 | 0 | 1 | 3 |
| 120 | A2 | 1 | 0 | 4, 8, 9 | 0 | 2 | 3 |
| 121 | A2 | 1 | 0 | 3, 4, 8, 9 | 0 | 2 | 3 |
| 122 | A2 | 1 | 0 | 1, 3, 5, 7, 9 | 0 | 2 | 3 |
| 123 | A2 | 2 | 1 | 4, 8, 9 | 0 | 1 | 3 |
| 124 | A2 | 2 | 1 | 4, 9 | 0 | 1 | 3 |
| 125 | A2 | 2 | 1 | 4 | 0 | 2 | 3 |
| 126 | A2 | 2 | 1 | 9 | 0 | 2 | 3 |
| 127 | A2 | 2 | 1 | 8 | 0 | 2 | 3 |
| 128 | A2 | 4 | 1 | 9 | 0 | 2 | 3 |
| 129 | A2 | 4 | 1 | 4, 8, 9 | 0 | 1 | 3 |
| 130 | A2 | 8 | 1 | 9 | 0 | 2 | 3 |
| 131 | A2 | 8 | 1 | 4, 8, 9 | 0 | 1 | 3 |
| 132 | A2 | 16 | 1 | 9 | 0 | 2 | 3 |
| 133 | A2 | 16 | 1 | 4, 8, 9 | 0 | 1 | 3 |
| 134 | A3 | 1 | 0 | 9 | 0 | 2 | 2 |
| 135 | A3 | 1 | 0 | 4 | 0 | 2 | 2 |
| 136 | A3 | 1 | 0 | 8 | 0 | 2 | 2 |
| 137 | A3 | 1 | 0 | 3 | 0 | 2 | 2 |
| 138 | A3 | 1 | 0 | 4, 9 | 0 | 1 | 2 |
| 139 | A3 | 1 | 0 | 3, 8 | 0 | 2 | 2 |
| 140 | A3 | 1 | 0 | 2, 7 | 0 | 1 | 2 |
| 141 | A3 | 1 | 0 | 4, 8, 9 | 0 | 2 | 2 |
| 142 | A3 | 1 | 0 | 3, 4, 8, 9 | 0 | 2 | 2 |
| 143 | A3 | 1 | 0 | 1, 3, 5, 7, 9 | 0 | 2 | 2 |
| 144 | A3 | 2 | 1 | 4, 8, 9 | 0 | 1 | 2 |
| 145 | A3 | 2 | 1 | 4, 9 | 0 | 1 | 2 |
| 146 | A3 | 2 | 1 | 4 | 0 | 2 | 2 |
| 147 | A3 | 2 | 1 | 9 | 0 | 2 | 2 |
| 148 | A3 | 2 | 1 | 8 | 0 | 2 | 2 |
| 149 | A3 | 4 | 1 | 9 | 0 | 2 | 2 |
| 150 | A3 | 4 | 1 | 4, 9 | 0 | 1 | 2 |
| 151 | A3 | 8 | 1 | 9 | 0 | 2 | 2 |
| 152 | A3 | 8 | 1 | 4, 9 | 0 | 1 | 2 |
| 153 | A3 | 16 | 1 | 9 | 0 | 2 | 2 |
| 154 | A3 | 16 | 1 | 4, 9 | 0 | 1 | 2 |
| 155 | B4 | 1 | 0 | 9 | 0 | 2 | 1 |
| 156 | B4 | 1 | 0 | 4 | 0 | 2 | 1 |
| 157 | B4 | 1 | 0 | 8 | 0 | 2 | 1 |
| 158 | B4 | 1 | 0 | 3 | 0 | 2 | 1 |
| 159 | B4 | 1 | 0 | 4, 9 | 0 | 1 | 1 |
| 160 | B4 | 1 | 0 | 3, 8 | 0 | 2 | 1 |
| 161 | B4 | 1 | 0 | 2, 7 | 0 | 1 | 1 |
| 162 | B4 | 1 | 0 | 4, 8, 9 | 0 | 2 | 1 |
| 163 | B4 | 1 | 0 | 3, 4, 8, 9 | 0 | 2 | 1 |
| 164 | B4 | 1 | 0 | 1, 3, 5, 7, 9 | 0 | 2 | 1 |
| 165 | B4 | 2 | 1 | 4, 9 | 0 | 1 | 1 |
| 166 | B4 | 2 | 1 | 3, 8 | 0 | 1 | 1 |
| 167 | B4 | 2 | 1 | 4 | 0 | 2 | 1 |
| 168 | B4 | 2 | 1 | 9 | 0 | 2 | 1 |
| 169 | B4 | 2 | 1 | 8 | 0 | 2 | 1 |
| 170 | B4 | 4 | 1 | 9 | 0 | 2 | 1 |
| 171 | B4 | 4 | 1 | 4, 9 | 0 | 1 | 1 |
| 172 | B4 | 8 | 1 | 9 | 0 | 2 | 1 |
| 173 | B4 | 8 | 1 | 4, 9 | 0 | 1 | 1 |
| 174 | B4 | 16 | 1 | 9 | 0 | 2 | 1 |
| 175 | B4 | 16 | 1 | 4, 9 | 0 | 1 | 1 |
| 176 | C0 | 1 | 0 | 9 | 0 | 2 | 7 |
| 177 | C0 | 1 | 0 | 4 | 0 | 2 | 7 |
| 178 | C0 | 1 | 0 | 8 | 0 | 2 | 7 |
| 179 | C0 | 1 | 0 | 3 | 0 | 2 | 7 |
| 180 | C0 | 1 | 0 | 4, 9 | 0 | 1 | 7 |
| 181 | C0 | 1 | 0 | 3, 8 | 0 | 2 | 7 |
| 182 | C0 | 1 | 0 | 2, 7 | 0 | 1 | 7 |
| 183 | C0 | 1 | 0 | 4, 8, 9 | 0 | 2 | 7 |
| 184 | C0 | 1 | 0 | 3, 4, 8, 9 | 0 | 2 | 7 |
| 185 | C0 | 1 | 0 | 1, 3, 5, 7, 9 | 0 | 2 | 7 |
| 186 | C0 | 2 | 1 | 4, 9 | 0 | 1 | 7 |
| 187 | C0 | 2 | 1 | 3, 8 | 0 | 1 | 7 |
| 188 | C0 | 2 | 1 | 4 | 0 | 2 | 7 |
| 189 | C0 | 2 | 1 | 9 | 0 | 2 | 7 |
| 190 | C0 | 2 | 1 | 8 | 0 | 2 | 7 |
| 191 | C0 | 4 | 1 | 9 | 0 | 2 | 7 |

TABLE 2-continued

| PRACH Config. Index | Preamble format | SFN mod x = y | | subframe number (1 ms) | Starting symbol | Number of PRACH slots within a subframe | Number of ROs within a RACH slot |
|---|---|---|---|---|---|---|---|
| | | x | y | | | | |
| 192 | C0 | 4 | 1 | 4, 9 | 0 | 1 | 7 |
| 193 | C0 | 8 | 1 | 9 | 0 | 2 | 7 |
| 194 | C0 | 8 | 1 | 4, 9 | 0 | 1 | 7 |
| 195 | C2 | 1 | 0 | 9 | 0 | 2 | 2 |
| 196 | C2 | 1 | 0 | 4 | 0 | 2 | 2 |
| 197 | C2 | 1 | 0 | 8 | 0 | 2 | 2 |
| 198 | C2 | 1 | 0 | 3 | 0 | 2 | 2 |
| 199 | C2 | 1 | 0 | 4, 9 | 0 | 1 | 2 |
| 200 | C2 | 1 | 0 | 3, 8 | 0 | 2 | 2 |
| 201 | C2 | 1 | 0 | 2, 7 | 0 | 1 | 2 |
| 202 | C2 | 1 | 0 | 4, 8, 9 | 0 | 2 | 2 |
| 203 | C2 | 1 | 0 | 3, 4, 8, 9 | 0 | 2 | 2 |
| 204 | C2 | 1 | 0 | 1, 3, 5, 7, 9 | 0 | 2 | 2 |
| 205 | C2 | 2 | 1 | 4, 8, 9 | 0 | 1 | 2 |
| 206 | C2 | 2 | 1 | 4, 9 | 0 | 1 | 2 |
| 207 | C2 | 2 | 1 | 4 | 0 | 2 | 2 |
| 208 | C2 | 2 | 1 | 9 | 0 | 2 | 2 |
| 209 | C2 | 2 | 1 | 8 | 0 | 2 | 2 |
| 210 | C2 | 4 | 1 | 9 | 0 | 2 | 2 |
| 211 | C2 | 4 | 1 | 4, 8, 9 | 0 | 1 | 2 |
| 212 | C2 | 8 | 1 | 9 | 0 | 2 | 2 |
| 213 | C2 | 8 | 1 | 4, 8, 9 | 0 | 1 | 2 |
| 214 | C2 | 16 | 1 | 9 | 0 | 2 | 2 |
| 215 | C2 | 16 | 1 | 4, 8, 9 | 0 | 1 | 2 |
| 216 | A1/B1 | 1 | 0 | 9 | 0 | 2 | 7 |
| 217 | A1/B1 | 1 | 0 | 4 | 0 | 2 | 7 |
| 218 | A1/B1 | 1 | 0 | 8 | 0 | 2 | 7 |
| 219 | A1/B1 | 1 | 0 | 3 | 0 | 2 | 7 |
| 220 | A1/B1 | 1 | 0 | 4, 9 | 0 | 1 | 7 |
| 221 | A1/B1 | 1 | 0 | 3, 8 | 0 | 2 | 7 |
| 222 | A1/B1 | 1 | 0 | 2, 7 | 0 | 1 | 7 |
| 223 | A1/B1 | 1 | 0 | 4, 8, 9 | 0 | 2 | 7 |
| 224 | A1/B1 | 1 | 0 | 3, 4, 8, 9 | 0 | 2 | 7 |
| 225 | A1/B1 | 1 | 0 | 1, 3, 5, 7, 9 | 0 | 2 | 7 |
| 226 | A1/B1 | 2 | 1 | 4, 9 | 0 | 1 | 7 |
| 227 | A1/B1 | 2 | 1 | 9 | 0 | 2 | 7 |
| 228 | A2/B2 | 1 | 0 | 9 | 0 | 2 | 3 |
| 229 | A2/B2 | 1 | 0 | 4 | 0 | 2 | 3 |
| 230 | A2/B2 | 1 | 0 | 8 | 0 | 2 | 3 |
| 231 | A2/B2 | 1 | 0 | 3 | 0 | 2 | 3 |
| 232 | A2/B2 | 1 | 0 | 4, 9 | 0 | 1 | 3 |
| 233 | A2/B2 | 1 | 0 | 3, 8 | 0 | 2 | 3 |
| 234 | A2/B2 | 1 | 0 | 2, 7 | 0 | 1 | 3 |
| 235 | A2/B2 | 1 | 0 | 4, 8, 9 | 0 | 2 | 3 |
| 236 | A2/B2 | 1 | 0 | 3, 4, 8, 9 | 0 | 2 | 3 |
| 237 | A2/B2 | 1 | 0 | 1, 3, 5, 7, 9 | 0 | 2 | 3 |
| 238 | A2/B2 | 2 | 1 | 4, 8, 9 | 0 | 1 | 3 |
| 239 | A2/B2 | 2 | 1 | 4, 9 | 0 | 1 | 3 |
| 240 | A2/B2 | 2 | 1 | 4 | 0 | 2 | 3 |
| 241 | A2/B2 | 2 | 1 | 9 | 0 | 2 | 3 |
| 242 | A3/B3 | 1 | 0 | 9 | 0 | 2 | 2 |
| 243 | A3/B3 | 1 | 0 | 4 | 0 | 2 | 2 |
| 244 | A3/B3 | 1 | 0 | 8 | 0 | 2 | 2 |
| 245 | A3/B3 | 1 | 0 | 3 | 0 | 2 | 2 |
| 246 | A3/B3 | 1 | 0 | 4, 9 | 0 | 1 | 2 |
| 247 | A3/B3 | 1 | 0 | 3, 8 | 0 | 2 | 2 |
| 248 | A3/B3 | 1 | 0 | 2, 7 | 0 | 1 | 2 |
| 249 | A3/B3 | 1 | 0 | 4, 8, 9 | 0 | 2 | 2 |
| 250 | A3/B3 | 1 | 0 | 3, 4, 8, 9 | 0 | 2 | 2 |
| 251 | A3/B3 | 1 | 0 | 1, 3, 5, 7, 9 | 0 | 2 | 2 |
| 252 | A3/B3 | 2 | 1 | 4, 8, 9 | 0 | 1 | 2 |
| 253 | A3/B3 | 2 | 1 | 4, 9 | 0 | 1 | 2 |
| 254 | A3/B3 | 2 | 1 | 4 | 0 | 2 | 2 |
| 255 | A3/B3 | 2 | 1 | 9 | 0 | 2 | 2 |

TABLE 3

| PRACH Config. Index | Preamble format | SFN mod x = y | | subframe number (1 ms) | Starting symbol (Ns) | Number of PRACH slots within a subframe | Number of ROs within a RACH slot |
|---|---|---|---|---|---|---|---|
| | | x | y | | | | |
| 71 | A1 | 1 | 0 | 9 | {l, 2l, k + l} | 2 | floor [(13 − Ns)/2] |
| 72 | A1 | 1 | 0 | 4 | {l, 2l, k + l} | 2 | floor [(13 − Ns)/2] |
| 73 | A1 | 1 | 0 | 8 | {l, 2l, k + l} | 2 | floor [(13 − Ns)/2] |
| 74 | A1 | 1 | 0 | 3 | {l, 2l, k + l} | 2 | floor [(13 − Ns)/2] |
| 75 | A1 | 1 | 0 | 4, 9 | {l, 2l, k + l} | 1 | floor [(13 − Ns)/2] |
| 76 | A1 | 1 | 0 | 3, 8 | {l, 2l, k + l} | 2 | floor [(13 − Ns)/2] |
| 77 | A1 | 1 | 0 | 2, 7 | {l, 2l, k + l} | 1 | floor [(13 − Ns)/2] |
| 78 | A1 | 1 | 0 | 4, 8, 9 | {l, 2l, k + l} | 2 | floor [(13 − Ns)/2] |
| 79 | A1 | 1 | 0 | 3, 4, 8, 9 | {l, 2l, k + l} | 2 | floor [(13 − Ns)/2] |
| 80 | A1 | 1 | 0 | 1, 3, 5, 7, 9 | {l, 2l, k + l} | 2 | floor [(13 − Ns)/2] |
| 81 | A1 | 2 | 1 | 4, 9 | {l, 2l, k + l} | 1 | floor [(13 − Ns)/2] |
| 82 | A1 | 2 | 1 | 3, 8 | {l, 2l, k + l} | 1 | floor [(13 − Ns)/2] |
| 83 | A1 | 2 | 1 | 4 | {l, 2l, k + l} | 2 | floor [(13 − Ns)/2] |
| 84 | A1 | 2 | 1 | 9 | {l, 2l, k + l} | 2 | floor [(13 − Ns)/2] |
| 85 | A1 | 2 | 1 | 8 | {l, 2l, k + l} | 2 | floor [(13 − Ns)/2] |
| 86 | A1 | 4 | 1 | 9 | {l, 2l, k + l} | 2 | floor [(13 − Ns)/2] |
| 87 | A1 | 4 | 1 | 4, 9 | {l, 2l, k + l} | 1 | floor [(13 − Ns)/2] |
| 88 | A1 | 8 | 1 | 9 | {l, 2l, k + l} | 2 | floor [(13 − Ns)/2] |
| 89 | A1 | 8 | 1 | 4, 9 | {l, 2l, k + l} | 1 | floor [(13 − Ns)/2] |
| 90 | A1 | 16 | 1 | 9 | {l, 2l, k + l} | 2 | floor [(13 − Ns)/2] |
| 91 | A1 | 16 | 1 | 4, 9 | {l, 2l, k + l} | 1 | floor [(13 − Ns)/2] |
| 92 | B1 | 1 | 0 | 9 | {l, 2l, k + l} | 2 | floor [(14 − Ns)/2] |
| 93 | B1 | 1 | 0 | 4 | {l, 2l, k + l} | 2 | floor [(14 − Ns)/2] |
| 94 | B1 | 1 | 0 | 8 | {l, 2l, k + l} | 2 | floor [(14 − Ns)/2] |
| 95 | B1 | 1 | 0 | 3 | {l, 2l, k + l} | 2 | floor [(14 − Ns)/2] |
| 96 | B1 | 1 | 0 | 4, 9 | {l, 2l, k + l} | 1 | floor [(14 − Ns)/2] |
| 97 | B1 | 1 | 0 | 3, 8 | {l, 2l, k + l} | 2 | floor [(14 − Ns)/2] |
| 98 | B1 | 1 | 0 | 2, 7 | {l, 2l, k + l} | 1 | floor [(14 − Ns)/2] |
| 99 | B1 | 1 | 0 | 4, 8, 9 | {l, 2l, k + l} | 2 | floor [(14 − Ns)/2] |
| 100 | B1 | 1 | 0 | 3, 4, 8, 9 | {l, 2l, k + l} | 2 | floor [(14 − Ns)/2] |
| 101 | B1 | 1 | 0 | 1, 3, 5, 7, 9 | {l, 2l, k + l} | 2 | floor [(14 − Ns)/2] |
| 102 | B1 | 2 | 1 | 4, 9 | {l, 2l, k + l} | 1 | floor [(14 − Ns)/2] |
| 103 | B1 | 2 | 1 | 3, 8 | {l, 2l, k + l} | 1 | floor [(14 − Ns)/2] |
| 104 | B1 | 2 | 1 | 4 | {l, 2l, k + l} | 2 | floor [(14 − Ns)/2] |
| 105 | B1 | 2 | 1 | 9 | {l, 2l, k + l} | 2 | floor [(14 − Ns)/2] |
| 106 | B1 | 2 | 1 | 8 | {l, 2l, k + l} | 2 | floor [(14 − Ns)/2] |
| 107 | B1 | 4 | 1 | 9 | {l, 2l, k + l} | 2 | floor [(14 − Ns)/2] |
| 108 | B1 | 4 | 1 | 4, 9 | {l, 2l, k + l} | 1 | floor [(14 − Ns)/2] |
| 109 | B1 | 8 | 1 | 9 | {l, 2l, k + l} | 2 | floor [(14 − Ns)/2] |
| 110 | B1 | 8 | 1 | 4, 9 | {l, 2l, k + l} | 1 | floor [(14 − Ns)/2] |
| 111 | B1 | 16 | 1 | 9 | {l, 2l, k + l} | 2 | floor [(14 − Ns)/2] |
| 112 | B1 | 16 | 1 | 4, 9 | {l, 2l, k + l} | 1 | floor [(14 − Ns)/2] |
| 113 | A2 | 1 | 0 | 9 | {l, 2l, k + l} | 2 | floor [(13 − Ns)/4] |
| 114 | A2 | 1 | 0 | 4 | {l, 2l, k + l} | 2 | floor [(13 − Ns)/4] |
| 115 | A2 | 1 | 0 | 8 | {l, 2l, k + l} | 2 | floor [(13 − Ns)/4] |
| 116 | A2 | 1 | 0 | 3 | {l, 2l, k + l} | 2 | floor [(13 − Ns)/4] |
| 117 | A2 | 1 | 0 | 4, 9 | {l, 2l, k + l} | 1 | floor [(13 − Ns)/4] |
| 118 | A2 | 1 | 0 | 3, 8 | {l, 2l, k + l} | 2 | floor [(13 − Ns)/4] |
| 119 | A2 | 1 | 0 | 2, 7 | {l, 2l, k + l} | 1 | floor [(13 − Ns)/4] |
| 120 | A2 | 1 | 0 | 4, 8, 9 | {l, 2l, k + l} | 2 | floor [(13 − Ns)/4] |
| 121 | A2 | 1 | 0 | 3, 4, 8, 9 | {l, 2l, k + l} | 2 | floor [(13 − Ns)/4] |
| 122 | A2 | 1 | 0 | 1, 3, 5, 7, 9 | {l, 2l, k + l} | 2 | floor [(13 − Ns)/4] |
| 123 | A2 | 2 | 1 | 4, 8, 9 | {l, 2l, k + l} | 1 | floor [(13 − Ns)/4] |
| 124 | A2 | 2 | 1 | 4, 9 | {l, 2l, k + l} | 1 | floor [(13 − Ns)/4] |
| 125 | A2 | 2 | 1 | 4 | {l, 2l, k + l} | 2 | floor [(13 − Ns)/4] |
| 126 | A2 | 2 | 1 | 9 | {l, 2l, k + l} | 2 | floor [(13 − Ns)/4] |
| 127 | A2 | 2 | 1 | 8 | {l, 2l, k + l} | 2 | floor [(13 − Ns)/4] |
| 128 | A2 | 4 | 1 | 9 | {l, 2l, k + l} | 2 | floor [(13 − Ns)/4] |
| 129 | A2 | 4 | 1 | 4, 8, 9 | {l, 2l, k + l} | 1 | floor [(13 − Ns)/4] |
| 130 | A2 | 8 | 1 | 9 | {l, 2l, k + l} | 2 | floor [(13 − Ns)/4] |
| 131 | A2 | 8 | 1 | 4, 8, 9 | {l, 2l, k + l} | 1 | floor [(13 − Ns)/4] |
| 132 | A2 | 16 | 1 | 9 | {l, 2l, k + l} | 2 | floor [(13 − Ns)/4] |
| 133 | A2 | 16 | 1 | 4, 8, 9 | {l, 2l, k + l} | 1 | floor [(13 − Ns)/4] |
| 134 | A3 | 1 | 0 | 9 | {l, 2l, k + l} | 2 | floor [(13 − Ns)/6] |
| 135 | A3 | 1 | 0 | 4 | {l, 2l, k + l} | 2 | floor [(13 − Ns)/6] |
| 136 | A3 | 1 | 0 | 8 | {l, 2l, k + l} | 2 | floor [(13 − Ns)/6] |
| 137 | A3 | 1 | 0 | 3 | {l, 2l, k + l} | 2 | floor [(13 − Ns)/6] |
| 138 | A3 | 1 | 0 | 4, 9 | {l, 2l, k + l} | 1 | floor [(13 − Ns)/6] |
| 139 | A3 | 1 | 0 | 3, 8 | {l, 2l, k + l} | 2 | floor [(13 − Ns)/6] |
| 140 | A3 | 1 | 0 | 2, 7 | {l, 2l, k + l} | 1 | floor [(13 − Ns)/6] |
| 141 | A3 | 1 | 0 | 4, 8, 9 | {l, 2l, k + l} | 2 | floor [(13 − Ns)/6] |
| 142 | A3 | 1 | 0 | 3, 4, 8, 9 | {l, 2l, k + l} | 2 | floor [(13 − Ns)/6] |
| 143 | A3 | 1 | 0 | 1, 3, 5, 7, 9 | {l, 2l, k + l} | 2 | floor [(13 − Ns)/6] |
| 144 | A3 | 2 | 1 | 4, 8, 9 | {l, 2l, k + l} | 1 | floor [(13 − Ns)/6] |

TABLE 3-continued

| PRACH Config. Index | Preamble format | SFN mod x = y  x | SFN mod x = y  y | subframe number (1 ms) | Starting symbol (Ns) | Number of PRACH slots within a subframe | Number of ROs within a RACH slot |
|---|---|---|---|---|---|---|---|
| 145 | A3 | 2 | 1 | 4, 9 | {l, 2l, k + l} | 1 | floor [(13 − Ns)/6] |
| 146 | A3 | 2 | 1 | 4 | {l, 2l, k + l} | 2 | floor [(13 − Ns)/6] |
| 147 | A3 | 2 | 1 | 9 | {l, 2l, k + l} | 2 | floor [(13 − Ns)/6] |
| 148 | A3 | 2 | 1 | 8 | {l, 2l, k + l} | 2 | floor [(13 − Ns)/6] |
| 149 | A3 | 4 | 1 | 9 | {l, 2l, k + l} | 2 | floor [(13 − Ns)/6] |
| 150 | A3 | 4 | 1 | 4, 9 | {l, 2l, k + l} | 1 | floor [(13 − Ns)/6] |
| 151 | A3 | 8 | 1 | 9 | {l, 2l, k + l} | 2 | floor [(13 − Ns)/6] |
| 152 | A3 | 8 | 1 | 4, 9 | {l, 2l, k + l} | 1 | floor [(13 − Ns)/6] |
| 153 | A3 | 16 | 1 | 9 | {l, 2l, k + l} | 2 | floor [(13 − Ns)/6] |
| 154 | A3 | 16 | 1 | 4, 9 | {l, 2l, k + l} | 1 | floor [(13 − Ns)/6] |
| 155 | B4 | 1 | 0 | 9 | {l, 2l, k + l} | 2 | floor [(14 − Ns)/12] |
| 156 | B4 | 1 | 0 | 4 | {l, 2l, k + l} | 2 | floor [(14 − Ns)/12] |
| 157 | B4 | 1 | 0 | 8 | {l, 2l, k + l} | 2 | floor [(14 − Ns)/12] |
| 158 | B4 | 1 | 0 | 3 | {l, 2l, k + l} | 2 | floor [(14 − Ns)/12] |
| 159 | B4 | 1 | 0 | 4, 9 | {l, 2l, k + l} | 1 | floor [(14 − Ns)/12] |
| 160 | B4 | 1 | 0 | 3, 8 | {l, 2l, k + l} | 2 | floor [(14 − Ns)/12] |
| 161 | B4 | 1 | 0 | 2, 7 | {l, 2l, k + l} | 1 | floor [(14 − Ns)/12] |
| 162 | B4 | 1 | 0 | 4, 8, 9 | {l, 2l, k + l} | 2 | floor [(14 − Ns)/12] |
| 163 | B4 | 1 | 0 | 3, 4, 8, 9 | {l, 2l, k + l} | 2 | floor [(14 − Ns)/12] |
| 164 | B4 | 1 | 0 | 1, 3, 5, 7, 9 | {l, 2l, k + l} | 2 | floor [(14 − Ns)/12] |
| 165 | B4 | 2 | 1 | 4, 9 | {l, 2l, k + l} | 1 | floor [(14 − Ns)/12] |
| 166 | B4 | 2 | 1 | 3, 8 | {l, 2l, k + l} | 1 | floor [(14 − Ns)/12] |
| 167 | B4 | 2 | 1 | 4 | {l, 2l, k + l} | 2 | floor [(14 − Ns)/12] |
| 168 | B4 | 2 | 1 | 9 | {l, 2l, k + l} | 2 | floor [(14 − Ns)/12] |
| 169 | B4 | 2 | 1 | 8 | {l, 2l, k + l} | 2 | floor [(14 − Ns)/12] |
| 170 | B4 | 4 | 1 | 9 | {l, 2l, k + l} | 2 | floor [(14 − Ns)/12] |
| 171 | B4 | 4 | 1 | 4, 9 | {l, 2l, k + l} | 1 | floor [(14 − Ns)/12] |
| 172 | B4 | 8 | 1 | 9 | {l, 2l, k + l} | 2 | floor [(14 − Ns)/12] |
| 173 | B4 | 8 | 1 | 4, 9 | {l, 2l, k + l} | 1 | floor [(14 − Ns)/12] |
| 174 | B4 | 16 | 1 | 9 | {l, 2l, k + l} | 2 | floor [(14 − Ns)/12] |
| 175 | B4 | 16 | 1 | 4, 9 | {l, 2l, k + l} | 1 | floor [(14 − Ns)/12] |
| 176 | C0 | 1 | 0 | 9 | {l, 2l, k + l} | 2 | floor [(13 − Ns)] |
| 177 | C0 | 1 | 0 | 4 | {l, 2l, k + l} | 2 | floor [(13 − Ns)] |
| 178 | C0 | 1 | 0 | 8 | {l, 2l, k + l} | 2 | floor [(13 − Ns)] |
| 179 | C0 | 1 | 0 | 3 | {l, 2l, k + l} | 2 | floor [(13 − Ns)] |
| 180 | C0 | 1 | 0 | 4, 9 | {l, 2l, k + l} | 1 | floor [(13 − Ns)] |
| 181 | C0 | 1 | 0 | 3, 8 | {l, 2l, k + l} | 2 | floor [(13 − Ns)] |
| 182 | C0 | 1 | 0 | 2, 7 | {l, 2l, k + l} | 1 | floor [(13 − Ns)] |
| 183 | C0 | 1 | 0 | 4, 8, 9 | {l, 2l, k + l} | 2 | floor [(13 − Ns)] |
| 184 | C0 | 1 | 0 | 3, 4, 8, 9 | {l, 2l, k + l} | 2 | floor [(13 − Ns)] |
| 185 | C0 | 1 | 0 | 1, 3, 5, 7, 9 | {l, 2l, k + l} | 2 | floor [(13 − Ns)] |
| 186 | C0 | 2 | 1 | 4, 9 | {l, 2l, k + l} | 1 | floor [(13 − Ns)] |
| 187 | C0 | 2 | 1 | 3, 8 | {l, 2l, k + l} | 1 | floor [(13 − Ns)] |
| 188 | C0 | 2 | 1 | 4 | {l, 2l, k + l} | 2 | floor [(13 − Ns)] |
| 189 | C0 | 2 | 1 | 9 | {l, 2l, k + l} | 2 | floor [(13 − Ns)] |
| 190 | C0 | 2 | 1 | 8 | {l, 2l, k + l} | 2 | floor [(13 − Ns)] |
| 191 | C0 | 4 | 1 | 9 | {l, 2l, k + l} | 2 | floor [(13 − Ns)] |
| 192 | C0 | 4 | 1 | 4, 9 | {l, 2l, k + l} | 1 | floor [(13 − Ns)] |
| 193 | C0 | 8 | 1 | 9 | {l, 2l, k + l} | 2 | floor [(13 − Ns)] |
| 194 | C0 | 8 | 1 | 4, 9 | {l, 2l, k + l} | 1 | floor [(13 − Ns)] |
| 195 | C2 | 1 | 0 | 9 | {l, 2l, k + l} | 2 | floor [(13 − Ns)/4] |
| 196 | C2 | 1 | 0 | 4 | {l, 2l, k + l} | 2 | floor [(13 − Ns)/4] |
| 197 | C2 | 1 | 0 | 8 | {l, 2l, k + l} | 2 | floor [(13 − Ns)/4] |
| 198 | C2 | 1 | 0 | 3 | {l, 2l, k + l} | 2 | floor [(13 − Ns)/4] |
| 199 | C2 | 1 | 0 | 4, 9 | {l, 2l, k + l} | 1 | floor [(13 − Ns)/4] |
| 200 | C2 | 1 | 0 | 3, 8 | {l, 2l, k + l} | 2 | floor [(13 − Ns)/4] |
| 201 | C2 | 1 | 0 | 2, 7 | {l, 2l, k + l} | 1 | floor [(13 − Ns)/4] |
| 202 | C2 | 1 | 0 | 4, 8, 9 | {l, 2l, k + l} | 2 | floor [(13 − Ns)/4] |
| 203 | C2 | 1 | 0 | 3, 4, 8, 9 | {l, 2l, k + l} | 2 | floor [(13 − Ns)/4] |
| 204 | C2 | 1 | 0 | 1, 3, 5, 7, 9 | {l, 2l, k + l} | 2 | floor [(13 − Ns)/4] |
| 205 | C2 | 2 | 1 | 4, 8, 9 | {l, 2l, k + l} | 1 | floor [(13 − Ns)/4] |
| 206 | C2 | 2 | 1 | 4, 9 | {l, 2l, k + l} | 1 | floor [(13 − Ns)/4] |
| 207 | C2 | 2 | 1 | 4 | {l, 2l, k + l} | 2 | floor [(13 − Ns)/4] |
| 208 | C2 | 2 | 1 | 9 | {l, 2l, k + l} | 2 | floor [(13 − Ns)/4] |
| 209 | C2 | 2 | 1 | 8 | {l, 2l, k + l} | 2 | floor [(13 − Ns)/4] |
| 210 | C2 | 4 | 1 | 9 | {l, 2l, k + l} | 2 | floor [(13 − Ns)/4] |
| 211 | C2 | 4 | 1 | 4, 8, 9 | {l, 2l, k + l} | 1 | floor [(13 − Ns)/4] |
| 212 | C2 | 8 | 1 | 9 | {l, 2l, k + l} | 2 | floor [(13 − Ns)/4] |
| 213 | C2 | 8 | 1 | 4, 8, 9 | {l, 2l, k + l} | 1 | floor [(13 − Ns)/4] |
| 214 | C2 | 16 | 1 | 9 | {l, 2l, k + l} | 2 | floor [(13 − Ns)/4] |
| 215 | C2 | 16 | 1 | 4, 8, 9 | {l, 2l, k + l} | 1 | floor [(13 − Ns)/4] |
| 216 | A1/B1 | 1 | 0 | 9 | {l, 2l, k + l} | 2 | floor [(14 − Ns)/2] |
| 217 | A1/B1 | 1 | 0 | 4 | {l, 2l, k + l} | 2 | floor [(14 − Ns)/2] |
| 218 | A1/B1 | 1 | 0 | 8 | {l, 2l, k + l} | 2 | floor [(14 − Ns)/2] |

TABLE 3-continued

| PRACH Config. Index | Preamble format | SFN mod x = y x | SFN mod x = y y | subframe number (1 ms) | Starting symbol (Ns) | Number of PRACH slots within a subframe | Number of ROs within a RACH slot |
|---|---|---|---|---|---|---|---|
| 219 | A1/B1 | 1 | 0 | 3 | {l, 2l, k + l} | 2 | floor [(14 − Ns)/2] |
| 220 | A1/B1 | 1 | 0 | 4, 9 | {l, 2l, k + l} | 1 | floor [(14 − Ns)/2] |
| 221 | A1/B1 | 1 | 0 | 3, 8 | {l, 2l, k + l} | 2 | floor [(14 − Ns)/2] |
| 222 | A1/B1 | 1 | 0 | 2, 7 | {l, 2l, k + l} | 1 | floor [(14 − Ns)/2] |
| 223 | A1/B1 | 1 | 0 | 4, 8, 9 | {l, 2l, k + l} | 2 | floor [(14 − Ns)/2] |
| 224 | A1/B1 | 1 | 0 | 3, 4, 8, 9 | {l, 2l, k + l} | 2 | floor [(14 − Ns)/2] |
| 225 | A1/B1 | 1 | 0 | 1, 3, 5, 7, 9 | {l, 2l, k + l} | 2 | floor [(14 − Ns)/2] |
| 226 | A1/B1 | 2 | 1 | 4, 9 | {l, 2l, k + l} | 1 | floor [(14 − Ns)/2] |
| 227 | A1/B1 | 2 | 1 | 9 | {l, 2l, k + l} | 2 | floor [(14 − Ns)/2] |
| 228 | A2/B2 | 1 | 0 | 9 | {l, 2l, k + l} | 2 | floor [(14 − Ns)/4] |
| 229 | A2/B2 | 1 | 0 | 4 | {l, 2l, k + l} | 2 | floor [(14 − Ns)/4] |
| 230 | A2/B2 | 1 | 0 | 8 | {l, 2l, k + l} | 2 | floor [(14 − Ns)/4] |
| 231 | A2/B2 | 1 | 0 | 3 | {l, 2l, k + l} | 2 | floor [(14 − Ns)/4] |
| 232 | A2/B2 | 1 | 0 | 4, 9 | {l, 2l, k + l} | 1 | floor [(14 − Ns)/4] |
| 233 | A2/B2 | 1 | 0 | 3, 8 | {l, 2l, k + l} | 2 | floor [(14 − Ns)/4] |
| 234 | A2/B2 | 1 | 0 | 2, 7 | {l, 2l, k + l} | 1 | floor [(14 − Ns)/4] |
| 235 | A2/B2 | 1 | 0 | 4, 8, 9 | {l, 2l, k + l} | 2 | floor [(14 − Ns)/4] |
| 236 | A2/B2 | 1 | 0 | 3, 4, 8, 9 | {l, 2l, k + l} | 2 | floor [(14 − Ns)/4] |
| 237 | A2/B2 | 1 | 0 | 1, 3, 5, 7, 9 | {l, 2l, k + l} | 2 | floor [(14 − Ns)/4] |
| 238 | A2/B2 | 2 | 1 | 4, 8, 9 | {l, 2l, k + l} | 1 | floor [(14 − Ns)/4] |
| 239 | A2/B2 | 2 | 1 | 4, 9 | {l, 2l, k + l} | 1 | floor [(14 − Ns)/4] |
| 240 | A2/B2 | 2 | 1 | 4 | {l, 2l, k + l} | 2 | floor [(14 − Ns)/4] |
| 241 | A2/B2 | 2 | 1 | 9 | {l, 2l, k + l} | 2 | floor [(14 − Ns)/4] |
| 242 | A3/B3 | 1 | 0 | 9 | {l, 2l, k + l} | 2 | floor [(14 − Ns)/6] |
| 243 | A3/B3 | 1 | 0 | 4 | {l, 2l, k + l} | 2 | floor [(14 − Ns)/6] |
| 244 | A3/B3 | 1 | 0 | 8 | {l, 2l, k + l} | 2 | floor [(14 − Ns)/6] |
| 245 | A3/B3 | 1 | 0 | 3 | {l, 2l, k + l} | 2 | floor [(14 − Ns)/6] |
| 246 | A3/B3 | 1 | 0 | 4, 9 | {l, 2l, k + l} | 1 | floor [(14 − Ns)/6] |
| 247 | A3/B3 | 1 | 0 | 3, 8 | {l, 2l, k + l} | 2 | floor [(14 − Ns)/6] |
| 248 | A3/B3 | 1 | 0 | 2, 7 | {l, 2l, k + l} | 1 | floor [(14 − Ns)/6] |
| 249 | A3/B3 | 1 | 0 | 4, 8, 9 | {l, 2l, k + l} | 2 | floor [(14 − Ns)/6] |
| 250 | A3/B3 | 1 | 0 | 3, 4, 8, 9 | {l, 2l, k + l} | 2 | floor [(14 − Ns)/6] |
| 251 | A3/B3 | 1 | 0 | 1, 3, 5, 7, 9 | {l, 2l, k + l} | 2 | floor [(14 − Ns)/6] |
| 252 | A3/B3 | 2 | 1 | 4, 8, 9 | {l, 2l, k + l} | 1 | floor [(14 − Ns)/6] |
| 253 | A3/B3 | 2 | 1 | 4, 9 | {l, 2l, k + l} | 1 | floor [(14 − Ns)/6] |
| 254 | A3/B3 | 2 | 1 | 4 | {l, 2l, k + l} | 2 | floor [(14 − Ns)/6] |
| 255 | A3/B3 | 2 | 1 | 9 | {l, 2l, k + l} | 2 | floor [(14 − Ns)/6] |

TABLE 4

| PRACH Config. Index | Preamble format | SFN mod x = y x | SFN mod x = y y | slot number (60 kHz SCS) | Starting symbol | Number of PRACH slots within a 0.25 ms | Number of ROs within a RACH slot |
|---|---|---|---|---|---|---|---|
| 0 | A1 | 1 | 0 | case A: 9<br>case B: 39 | 0 | 2 | 6 |
| 1 | A1 | 1 | 0 | case A: 9<br>case B: 29 | 0 | 2 | 6 |
| 2 | A1 | 1 | 0 | case A: 4, 9<br>case B: 29, 39 | 0 | 1 | 6 |
| 3 | A1 | 1 | 0 | case A: 4, 9, 19<br>case B: 29, 34, 39 | 0 | 1 | 6 |
| 4 | A1 | 1 | 0 | case A: 4, 9, 14, 19<br>case B: 24, 29, 34, 39 | 0 | 1 | 6 |
| 5 | A1 | 1 | 0 | case A: 16, 17, 18, 19<br>case B: 33, 35, 37, 39 | 0 | 2 | 6 |
| 6 | A1 | 1 | 0 | case A: 9, 11, 13, 15<br>case B: 33, 35, 37, 39 | 0 | 2 | 6 |
| 7 | A1 | 1 | 0 | case A: 9, 11, 13, 15, 17, 19<br>case B: 29, 31, 33, 35, 37, 39 | 0 | 2 | 6 |
| 8 | A1 | 1 | 0 | case A: 4, 9, 14, 19, 24, 29<br>case B: 14, 19, 24, 29, 34, 39 | 0 | 1 | 6 |
| 9 | A1 | 1 | 0 | 4, 9, 14, 19, 24, 29, 34, 39 | 0 | 1 | 6 |

TABLE 4-continued

| PRACH Config. Index | Preamble format | SFN mod x = y | | slot number (60 kHz SCS) | Starting symbol | Number of PRACH slots within a 0.25 ms | Number of ROs within a RACH slot |
|---|---|---|---|---|---|---|---|
| | | x | y | | | | |
| 10 | A1 | 1 | 0 | case A: 4, 9, 11, 13, 14, 15, 17, 19<br>case B: 24, 29, 31, 33, 34, 35, 37, 39 | 0 | 2 | 6 |
| 11 | A1 | 1 | 0 | case A: 12, 13, 14, 15, 16, 17, 18, 19<br>case B: 32, 33, 34, 35, 36, 37, 38, 39 | 0 | 2 | 6 |
| 12 | A1 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 6 |
| 13 | A1 | 1 | 0 | 4, 9, 11, 13, 15, 17, 19, 24, 29, 31, 33, 35, 37, 39 | 0 | 2 | 6 |
| 14 | A1 | 1 | 0 | 4, 9, 11, 13, 14, 15, 17, 19, 24, 29, 31, 33, 34, 35, 37, 39 | 0 | 2 | 6 |
| 15 | A1 | 1 | 0 | 4, 9, 10, 11, 12, 13, 14, 15, 16, 17, 18, 19, 24, 29, 30, 31, 32, 33, 34, 35, 36, 37, 38, 39 | 0 | 2 | 6 |
| 16 | A1 | 2 | O ≥ 5: 0<br>O < 5: 1 | case A: 4, 9<br>case B: 29, 39 | 0 | 2 | 6 |
| 17 | A1 | 2 | O ≥ 5: 0<br>O < 5: 1 | case A: 9, 11, 13, 15<br>case B: 33, 35, 37, 39 | 0 | 2 | 6 |
| 18 | A1 | 2 | O ≥ 5: 0<br>O < 5: 1 | case A: 4, 9, 14, 19<br>case B: 24, 29, 34, 39 | 0 | 1 | 6 |
| 19 | A1 | 2 | O ≥ 5: 0<br>O < 5: 1 | 4, 9, 14, 19, 24, 29, 34, 39 | 0 | 1 | 6 |
| 20 | A1 | 2 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 6 |
| 21 | A1 | 2 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 6 |
| 22 | A1 | 2 | O ≥ 5: 0<br>O < 5: 1 | 4, 9, 11, 13, 14, 15, 17, 19, 24, 29, 31, 33, 34, 35, 37, 39 | 0 | 2 | 6 |
| 23 | A1 | 2 | O ≥ 5: 0<br>O < 5: 1 | 4, 9, 10, 11, 12, 13, 14, 15, 16, 17, 18, 19, 24, 29, 30, 31, 32, 33, 34, 35, 36, 37, 38, 39 | 0 | 2 | 6 |
| 24 | A1 | 4 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 6 |
| 25 | A1 | 4 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 6 |
| 26 | A1 | 8 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 6 |
| 27 | A1 | 8 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 6 |

TABLE 4-continued

| PRACH Config. Index | Preamble format | SFN mod x = y | | slot number (60 kHz SCS) | Starting symbol | Number of PRACH slots within a 0.25 ms | Number of ROs within a RACH slot |
|---|---|---|---|---|---|---|---|
| | | x | y | | | | |
| 28 | A1 | 16 | O ≥ 5: 0<br>O < 5: 1 | case A: 4, 9, 11, 13,<br>14, 15, 17, 19<br>case B: 24, 29, 31,<br>33, 34, 35, 37, 39 | 0 | 2 | 6 |
| 29 | A1 | 16 | O ≥ 5: 0<br>O < 5: 1 | case A: 4, 9, 10, 11,<br>12, 13, 14, 15, 16,<br>17, 18, 19<br>case B: 24, 29, 30,<br>31, 32, 33, 34, 35,<br>36, 37, 38, 39 | 0 | 2 | 6 |
| 30 | A2 | 1 | 0 | case A: 9<br>case B: 39 | 0 | 2 | 3 |
| 31 | A2 | 1 | 0 | case A: 9<br>case B: 29 | 0 | 2 | 3 |
| 32 | A2 | 1 | 0 | case A: 4, 9<br>case B: 29, 39 | 0 | 1 | 3 |
| 33 | A2 | 1 | 0 | case A: 4, 9, 19<br>case B: 29, 34, 39 | 0 | 1 | 3 |
| 34 | A2 | 1 | 0 | case A: 4, 9, 14, 19<br>case B: 24, 29, 34, 39 | 0 | 1 | 3 |
| 35 | A2 | 1 | 0 | case A: 16, 17, 18, 19<br>case B: 33, 35, 37, 39 | 0 | 2 | 3 |
| 36 | A2 | 1 | 0 | case A: 9, 11, 13, 15<br>case B: 33, 35, 37, 39 | 0 | 2 | 3 |
| 37 | A2 | 1 | 0 | case A: 9, 11, 13, 15,<br>17, 19<br>case B: 29, 31, 33,<br>35, 37, 39 | 0 | 2 | 3 |
| 38 | A2 | 1 | 0 | case A: 4, 9, 14, 19,<br>24, 29<br>case B: 14, 19, 24,<br>29, 34, 39 | 0 | 1 | 3 |
| 39 | A2 | 1 | 0 | 4, 9, 14, 19, 24, 29,<br>34, 39 | 0 | 1 | 3 |
| 40 | A2 | 1 | 0 | case A: 4, 9, 11, 13,<br>14, 15, 17, 19<br>case B: 24, 29, 31,<br>33, 34, 35, 37, 39 | 0 | 2 | 3 |
| 41 | A2 | 1 | 0 | case A: 12, 13, 14,<br>15, 16, 17, 18, 19<br>case B: 32, 33, 34,<br>35, 36, 37, 38, 39 | 0 | 2 | 3 |
| 42 | A2 | 1 | 0 | case A: 4, 9, 10, 11,<br>12, 13, 14, 15, 16,<br>17, 18, 19<br>case B: 24, 29, 30,<br>31, 32, 33, 34, 35,<br>36, 37, 38, 39 | 0 | 2 | 3 |
| 43 | A2 | 1 | 0 | 4, 9, 11, 13, 15, 17,<br>19, 24, 29, 31, 33,<br>35, 37, 39 | 0 | 2 | 3 |
| 44 | A2 | 1 | 0 | 4, 9, 11, 13, 14, 15,<br>17, 19, 24, 29, 31,<br>33, 34, 35, 37, 39 | 0 | 2 | 3 |
| 45 | A2 | 1 | 0 | 4, 9, 10, 11, 12, 13,<br>14, 15, 16, 17, 18,<br>19, 24, 29, 30, 31,<br>32, 33, 34, 35, 36,<br>37, 38, 39 | 0 | 2 | 3 |
| 46 | A2 | 2 | O ≥ 5: 0<br>O < 5: 1 | case A: 4, 9<br>case B: 29, 39 | 0 | 2 | 3 |
| 47 | A2 | 2 | O ≥ 5: 0<br>O < 5: 1 | case A: 9, 11, 13, 15<br>case B: 33, 35, 37, 39 | 0 | 2 | 3 |
| 48 | A2 | 2 | O ≥ 5: 0<br>O < 5: 1 | case A: 4, 9, 14, 19<br>case B: 24, 29, 34, 39 | 0 | 1 | 3 |
| 49 | A2 | 2 | O ≥ 5: 0<br>O < 5: 1 | 4, 9, 14, 19, 24, 29,<br>34, 39 | 0 | 1 | 3 |
| 50 | A2 | 2 | O ≥ 5: 0<br>O < 5: 1 | case A: 4, 9, 11, 13,<br>14, 15, 17, 19<br>case B: 24, 29, 31,<br>33, 34, 35, 37, 39 | 0 | 2 | 3 |

TABLE 4-continued

| PRACH Config. Index | Preamble format | SFN mod x = y | | slot number (60 kHz SCS) | Starting symbol | Number of PRACH slots within a 0.25 ms | Number of ROs within a RACH slot |
|---|---|---|---|---|---|---|---|
| | | x | y | | | | |
| 51 | A2 | 2 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 3 |
| 52 | A2 | 2 | O ≥ 5: 0<br>O < 5: 1 | 4, 9, 11, 13, 14, 15, 17, 19, 24, 29, 31, 33, 34, 35, 37, 39 | 0 | 2 | 3 |
| 53 | A2 | 2 | O ≥ 5: 0<br>O < 5: 1 | 4, 9, 10, 11, 12, 13, 14, 15, 16, 17, 18, 19, 24, 29, 30, 31, 32, 33, 34, 35, 36, 37, 38, 39 | 0 | 2 | 3 |
| 54 | A2 | 4 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 3 |
| 55 | A2 | 4 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 3 |
| 56 | A2 | 8 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 3 |
| 57 | A2 | 8 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 3 |
| 58 | A2 | 16 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 3 |
| 59 | A2 | 16 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 3 |
| 60 | A3 | 1 | 0 | case A: 9<br>case B: 39 | 0 | 2 | 2 |
| 61 | A3 | 1 | 0 | case A: 9<br>case B: 29 | 0 | 2 | 2 |
| 62 | A3 | 1 | 0 | case A: 4, 9<br>case B: 29, 39 | 0 | 1 | 2 |
| 63 | A3 | 1 | 0 | case A: 4, 9, 19<br>case B: 29, 34, 39 | 0 | 1 | 2 |
| 64 | A3 | 1 | 0 | case A: 4, 9, 14, 19<br>case B: 24, 29, 34, 39 | 0 | 1 | 2 |
| 65 | A3 | 1 | 0 | case A: 16, 17, 18, 19<br>case B: 33, 35, 37, 39 | 0 | 2 | 2 |
| 66 | A3 | 1 | 0 | case A: 9, 11, 13, 15<br>case B: 33, 35, 37, 39 | 0 | 2 | 2 |
| 67 | A3 | 1 | 0 | case A: 9, 11, 13, 15, 17, 19<br>case B: 29, 31, 33, 35, 37, 39 | 0 | 2 | 2 |
| 68 | A3 | 1 | 0 | case A: 4, 9, 14, 19, 24, 29<br>case B: 14, 19, 24, 29, 34, 39 | 0 | 1 | 2 |
| 69 | A3 | 1 | 0 | 4, 9, 14, 19, 24, 29, 34, 39 | 0 | 1 | 2 |
| 70 | A3 | 1 | 0 | case A: 4, 9, 11, 13, 14, 15, 17, 19<br>case B: 24, 29, 31, 33, 34, 35, 37, 39 | 0 | 2 | 2 |

TABLE 4-continued

| PRACH Config. Index | Preamble format | SFN mod x = y | | slot number (60 kHz SCS) | Starting symbol | Number of PRACH slots within a 0.25 ms | Number of ROs within a RACH slot |
|---|---|---|---|---|---|---|---|
| | | x | y | | | | |
| 71 | A3 | 1 | 0 | case A: 12, 13, 14, 15, 16, 17, 18, 19 case B: 32, 33, 34, 35, 36, 37, 38, 39 | 0 | 2 | 2 |
| 72 | A3 | 1 | 0 | case A: 4, 9, 10, 11, 12, 13, 14, 15, 16, 17, 18, 19 case B: 24, 29, 30, 31, 32, 33, 34, 35, 36, 37, 38, 39 | 0 | 2 | 2 |
| 73 | A3 | 1 | 0 | 4, 9, 11, 13, 15, 17, 19, 24, 29, 31, 33, 35, 37, 39 | 0 | 2 | 2 |
| 74 | A3 | 1 | 0 | 4, 9, 11, 13, 14, 15, 17, 19, 24, 29, 31, 33, 34, 35, 37, 39 | 0 | 2 | 2 |
| 75 | A3 | 1 | 0 | 4, 9, 10, 11, 12, 13, 14, 15, 16, 17, 18, 19, 24, 29, 30, 31, 32, 33, 34, 35, 36, 37, 38, 39 | 0 | 2 | 2 |
| 76 | A3 | 2 | O ≥ 5: 0 O < 5: 1 | case A: 4, 9 case B: 29, 39 | 0 | 2 | 2 |
| 77 | A3 | 2 | O ≥ 5: 0 O < 5: 1 | case A: 9, 11, 13, 15 case B: 33, 35, 37, 39 | 0 | 2 | 2 |
| 78 | A3 | 2 | O ≥ 5: 0 O < 5: 1 | case A: 4, 9, 14, 19 case B: 24, 29, 34, 39 | 0 | 1 | 2 |
| 79 | A3 | 2 | O ≥ 5: 0 O < 5: 1 | 4, 9, 14, 19, 24, 29, 34, 39 | 0 | 1 | 2 |
| 80 | A3 | 2 | O ≥ 5: 0 O < 5: 1 | case A: 4, 9, 11, 13, 14, 15, 17, 19 case B: 24, 29, 31, 33, 34, 35, 37, 39 | 0 | 2 | 2 |
| 81 | A3 | 2 | O ≥ 5: 0 O < 5: 1 | case A: 4, 9, 10, 11, 12, 13, 14, 15, 16, 17, 18, 19 case B: 24, 29, 30, 31, 32, 33, 34, 35, 36, 37, 38, 39 | 0 | 2 | 2 |
| 82 | A3 | 2 | O ≥ 5: 0 O < 5: 1 | 4, 9, 11, 13, 14, 15, 17, 19, 24, 29, 31, 33, 34, 35, 37, 39 | 0 | 2 | 2 |
| 83 | A3 | 2 | O ≥ 5: 0 O < 5: 1 | 4, 9, 10, 11, 12, 13, 14, 15, 16, 17, 18, 19, 24, 29, 30, 31, 32, 33, 34, 35, 36, 37, 38, 39 | 0 | 2 | 2 |
| 84 | A3 | 4 | O ≥ 5: 0 O < 5: 1 | case A: 4, 9, 11, 13, 14, 15, 17, 19 case B: 24, 29, 31, 33, 34, 35, 37, 39 | 0 | 2 | 2 |
| 85 | A3 | 4 | O ≥ 5: 0 O < 5: 1 | case A: 4, 9, 10, 11, 12, 13, 14, 15, 16, 17, 18, 19 case B: 24, 29, 30, 31, 32, 33, 34, 35, 36, 37, 38, 39 | 0 | 2 | 2 |
| 86 | A3 | 8 | O ≥ 5: 0 O < 5: 1 | case A: 4, 9, 11, 13, 14, 15, 17, 19 case B: 24, 29, 31, 33, 34, 35, 37, 39 | 0 | 2 | 2 |
| 87 | A3 | 8 | O ≥ 5: 0 O < 5: 1 | case A: 4, 9, 10, 11, 12, 13, 14, 15, 16, 17, 18, 19 case B: 24, 29, 30, 31, 32, 33, 34, 35, 36, 37, 38, 39 | 0 | 2 | 2 |
| 88 | A3 | 16 | O ≥ 5: 0 O < 5: 1 | case A: 4, 9, 11, 13, 14, 15, 17, 19 case B: 24, 29, 31, 33, 34, 35, 37, 39 | 0 | 2 | 2 |

TABLE 4-continued

| PRACH Config. Index | Preamble format | SFN mod x = y | | slot number (60 kHz SCS) | Starting symbol | Number of PRACH slots within a 0.25 ms | Number of ROs within a RACH slot |
|---|---|---|---|---|---|---|---|
| | | x | y | | | | |
| 89 | A3 | 16 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 2 |
| 90 | B1 | 1 | 0 | case A: 9<br>case B: 39 | 0 | 2 | 7 |
| 91 | B1 | 1 | 0 | case A: 9<br>case B: 29 | 0 | 2 | 7 |
| 92 | B1 | 1 | 0 | case A: 4, 9<br>case B: 29, 39 | 0 | 1 | 7 |
| 93 | B1 | 1 | 0 | case A: 4, 9, 19<br>case B: 29, 34, 39 | 0 | 1 | 7 |
| 94 | B1 | 1 | 0 | case A: 4, 9, 14, 19<br>case B: 24, 29, 34, 39 | 0 | 1 | 7 |
| 95 | B1 | 1 | 0 | case A: 16, 17, 18, 19<br>case B: 33, 35, 37, 39 | 0 | 2 | 7 |
| 96 | B1 | 1 | 0 | case A: 9, 11, 13, 15<br>case B: 33, 35, 37, 39 | 0 | 2 | 7 |
| 97 | B1 | 1 | 0 | case A: 9, 11, 13, 15, 17, 19<br>case B: 29, 31, 33, 35, 37, 39 | 0 | 2 | 7 |
| 98 | B1 | 1 | 0 | case A: 4, 9, 14, 19, 24, 29<br>case B: 14, 19, 24, 29, 34, 39 | 0 | 1 | 7 |
| 99 | B1 | 1 | 0 | 4, 9, 14, 19, 24, 29, 34, 39 | 0 | 1 | 7 |
| 100 | B1 | 1 | 0 | case A: 4, 9, 11, 13, 14, 15, 17, 19<br>case B: 24, 29, 31, 33, 34, 35, 37, 39 | 0 | 2 | 7 |
| 101 | B1 | 1 | 0 | case A: 12, 13, 14, 15, 16, 17, 18, 19<br>case B: 32, 33, 34, 35, 36, 37, 38, 39 | 0 | 2 | 7 |
| 102 | B1 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 7 |
| 103 | B1 | 1 | 0 | 4, 9, 11, 13, 15, 17, 19, 24, 29, 31, 33, 35, 37, 39 | 0 | 2 | 7 |
| 104 | B1 | 1 | 0 | 4, 9, 11, 13, 14, 15, 17, 19, 24, 29, 31, 33, 34, 35, 37, 39 | 0 | 2 | 7 |
| 105 | B1 | 1 | 0 | 4, 9, 10, 11, 12, 13, 14, 15, 16, 17, 18, 19, 24, 29, 30, 31, 32, 33, 34, 35, 36, 37, 38, 39 | 0 | 2 | 7 |
| 106 | B1 | 2 | O ≥ 5: 0<br>O < 5: 1 | case A: 4, 9<br>case B: 29, 39 | 0 | 2 | 7 |
| 107 | B1 | 2 | O ≥ 5: 0<br>O < 5: 1 | case A: 9, 11, 13, 15<br>case B: 33, 35, 37, 39 | 0 | 2 | 7 |
| 108 | B1 | 2 | O ≥ 5: 0<br>O < 5: 1 | case A: 4, 9, 14, 19<br>case B: 24, 29, 34, 39 | 0 | 1 | 7 |
| 109 | B1 | 2 | O ≥ 5: 0<br>O < 5: 1 | 4, 9, 14, 19, 24, 29, 34, 39 | 0 | 1 | 7 |
| 110 | B1 | 2 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 7 |
| 111 | B1 | 2 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 7 |

TABLE 4-continued

| PRACH Config. Index | Preamble format | SFN mod x = y |  | slot number (60 kHz SCS) | Starting symbol | Number of PRACH slots within a 0.25 ms | Number of ROs within a RACH slot |
|---|---|---|---|---|---|---|---|
| | | x | y | | | | |
| 112 | B1 | 2 | O ≥ 5: 0<br>O < 5: 1 | 4, 9, 11, 13, 14, 15, 17, 19, 24, 29, 31, 33, 34, 35, 37, 39 | 0 | 2 | 7 |
| 113 | B1 | 2 | O ≥ 5: 0<br>O < 5: 1 | 4, 9, 10, 11, 12, 13, 14, 15, 16, 17, 18, 19, 24, 29, 30, 31, 32, 33, 34, 35, 36, 37, 38, 39 | 0 | 2 | 7 |
| 114 | B1 | 4 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 7 |
| 115 | B1 | 4 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 7 |
| 116 | B1 | 8 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 7 |
| 117 | B1 | 8 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 7 |
| 118 | B1 | 16 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 7 |
| 119 | B1 | 16 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 7 |
| 120 | B4 | 1 | 0 | case A: 9<br>case B: 39 | 0 | 2 | 1 |
| 121 | B4 | 1 | 0 | case A: 9<br>case B: 29 | 0 | 2 | 1 |
| 122 | B4 | 1 | 0 | case A: 4, 9<br>case B: 29, 39 | 0 | 1 | 1 |
| 123 | B4 | 1 | 0 | case A: 4, 9, 19<br>case B: 29, 34, 39 | 0 | 1 | 1 |
| 124 | B4 | 1 | 0 | case A: 4, 9, 14, 19<br>case B: 24, 29, 34, 39 | 0 | 1 | 1 |
| 125 | B4 | 1 | 0 | case A: 16, 17, 18, 19<br>case B: 33, 35, 37, 39 | 0 | 2 | 1 |
| 126 | B4 | 1 | 0 | case A: 9, 11, 13, 15<br>case B: 33, 35, 37, 39 | 0 | 2 | 1 |
| 127 | B4 | 1 | 0 | case A: 9, 11, 13, 15, 17, 19<br>case B: 29, 31, 33, 35, 37, 39 | 0 | 2 | 1 |
| 128 | B4 | 1 | 0 | case A: 4, 9, 14, 19, 24, 29<br>case B: 14, 19, 24, 29, 34, 39 | 0 | 1 | 1 |
| 129 | B4 | 1 | 0 | 4, 9, 14, 19, 24, 29, 34, 39 | 0 | 1 | 1 |
| 130 | B4 | 1 | 0 | case A: 4, 9, 11, 13, 14, 15, 17, 19<br>case B: 24, 29, 31, 33, 34, 35, 37, 39 | 0 | 2 | 1 |
| 131 | B4 | 1 | 0 | case A: 12, 13, 14, 15, 16, 17, 18, 19<br>case B: 32, 33, 34, 35, 36, 37, 38, 39 | 0 | 2 | 1 |

TABLE 4-continued

| PRACH Config. Index | Preamble format | SFN mod x = y | | slot number (60 kHz SCS) | Starting symbol | Number of PRACH slots within a 0.25 ms | Number of ROs within a RACH slot |
|---|---|---|---|---|---|---|---|
| | | x | y | | | | |
| 132 | B4 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 1 |
| 133 | B4 | 1 | 0 | 4, 9, 11, 13, 15, 17, 19, 24, 29, 31, 33, 35, 37, 39 | 0 | 2 | 1 |
| 134 | B4 | 1 | 0 | 4, 9, 11, 13, 14, 15, 17, 19, 24, 29, 31, 33, 34, 35, 37, 39 | 0 | 2 | 1 |
| 135 | B4 | 1 | 0 | 4, 9, 10, 11, 12, 13, 14, 15, 16, 17, 18, 19, 24, 29, 30, 31, 32, 33, 34, 35, 36, 37, 38, 39 | 0 | 2 | 1 |
| 136 | B4 | 2 | O ≥ 5: 0<br>O < 5: 1 | case A: 4, 9<br>case B: 29, 39 | 0 | 2 | 1 |
| 137 | B4 | 2 | O ≥ 5: 0<br>O < 5: 1 | case A: 9, 11, 13, 15<br>case B: 33, 35, 37, 39 | 0 | 2 | 1 |
| 138 | B4 | 2 | O ≥ 5: 0<br>O < 5: 1 | case A: 4, 9, 14, 19<br>case B: 24, 29, 34, 39 | 0 | 1 | 1 |
| 139 | B4 | 2 | O ≥ 5: 0<br>O < 5: 1 | 4, 9, 14, 19, 24, 29, 34, 39 | 0 | 1 | 1 |
| 140 | B4 | 2 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 1 |
| 141 | B4 | 2 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 1 |
| 142 | B4 | 2 | O ≥ 5: 0<br>O < 5: 1 | 4, 9, 11, 13, 14, 15, 17, 19, 24, 29, 31, 33, 34, 35, 37, 39 | 0 | 2 | 1 |
| 143 | B4 | 2 | O ≥ 5: 0<br>O < 5: 1 | 4, 9, 10, 11, 12, 13, 14, 15, 16, 17, 18, 19, 24, 29, 30, 31, 32, 33, 34, 35, 36, 37, 38, 39 | 0 | 2 | 1 |
| 144 | B4 | 4 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 1 |
| 145 | B4 | 4 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 1 |
| 146 | B4 | 8 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 1 |
| 147 | B4 | 8 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 1 |
| 148 | B4 | 16 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 1 |
| 149 | B4 | 16 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 1 |

TABLE 4-continued

| PRACH Config. Index | Preamble format | SFN mod x = y | | slot number (60 kHz SCS) | Starting symbol | Number of PRACH slots within a 0.25 ms | Number of ROs within a RACH slot |
|---|---|---|---|---|---|---|---|
| | | x | y | | | | |
| 150 | C0 | 1 | 0 | case A: 9<br>case B: 39 | 0 | 2 | 7 |
| 151 | C0 | 1 | 0 | case A: 9<br>case B: 29 | 0 | 2 | 7 |
| 152 | C0 | 1 | 0 | case A: 4, 9<br>case B: 29, 39 | 0 | 2 | 7 |
| 153 | C0 | 1 | 0 | case A: 4, 9, 19<br>case B: 29, 34, 39 | 0 | 1 | 7 |
| 154 | C0 | 1 | 0 | case A: 4, 9, 14, 19<br>case B: 24, 29, 34, 39 | 0 | 1 | 7 |
| 155 | C0 | 1 | 0 | case A: 16, 17, 18, 19<br>case B: 33, 35, 37, 39 | 0 | 2 | 7 |
| 156 | C0 | 1 | 0 | case A: 9, 11, 13, 15<br>case B: 33, 35, 37, 39 | 0 | 2 | 7 |
| 157 | C0 | 1 | 0 | case A: 9, 11, 13, 15, 17, 19<br>case B: 29, 31, 33, 35, 37, 39 | 0 | 2 | 7 |
| 158 | C0 | 1 | 0 | case A: 4, 9, 14, 19, 24, 29<br>case B: 14, 19, 24, 29, 34, 39 | 0 | 1 | 7 |
| 159 | C0 | 1 | 0 | 4, 9, 14, 19, 24, 29, 34, 39 | 0 | 1 | 7 |
| 160 | C0 | 1 | 0 | case A: 4, 9, 11, 13, 14, 15, 17, 19<br>case B: 24, 29, 31, 33, 34, 35, 37, 39 | 0 | 2 | 7 |
| 161 | C0 | 1 | 0 | case A: 12, 13, 14, 15, 16, 17, 18, 19<br>case B: 32, 33, 34, 35, 36, 37, 38, 39 | 0 | 2 | 7 |
| 162 | C0 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 7 |
| 163 | C0 | 1 | 0 | 4, 9, 11, 13, 15, 17, 19, 24, 29, 31, 33, 35, 37, 39 | 0 | 2 | 7 |
| 164 | C0 | 1 | 0 | 4, 9, 11, 13, 14, 15, 17, 19, 24, 29, 31, 33, 34, 35, 37, 39 | 0 | 2 | 7 |
| 165 | C0 | 1 | 0 | 4, 9, 10, 11, 12, 13, 14, 15, 16, 17, 18, 19, 24, 29, 30, 31, 32, 33, 34, 35, 36, 37, 38, 39 | | 2 | 7 |
| 166 | C0 | 2 | O ≥ 5: 0<br>O < 5: 1 | case A: 4, 9<br>case B: 29, 39 | 0 | 2 | 7 |
| 167 | C0 | 2 | O ≥ 5: 0<br>O < 5: 1 | case A: 9, 11, 13, 15<br>case B: 33, 35, 37, 39 | 0 | 2 | 7 |
| 168 | C0 | 2 | O ≥ 5: 0<br>O < 5: 1 | case A: 4, 9, 14, 19<br>case B: 24, 29, 34, 39 | 0 | 1 | 7 |
| 169 | C0 | 2 | O ≥ 5: 0<br>O < 5: 1 | 4, 9, 14, 19, 24, 29, 34, 39 | 0 | 1 | 7 |
| 170 | C0 | 2 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 7 |
| 171 | C0 | 2 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 7 |
| 172 | C0 | 2 | O ≥ 5: 0<br>O < 5: 1 | 4, 9, 11, 13, 14, 15, 17, 19, 24, 29, 31, 33, 34, 35, 37, 39 | 0 | 2 | 7 |

TABLE 4-continued

| PRACH Config. Index | Preamble format | SFN mod x = y | | slot number (60 kHz SCS) | Starting symbol | Number of PRACH slots within a 0.25 ms | Number of ROs within a RACH slot |
|---|---|---|---|---|---|---|---|
| | | x | y | | | | |
| 173 | C0 | 2 | O ≥ 5: 0<br>O < 5: 1 | 4, 9, 10, 11, 12, 13, 14, 15, 16, 17, 18, 19, 24, 29, 30, 31, 32, 33, 34, 35, 36, 37, 38, 39 | 0 | 2 | 7 |
| 174 | C0 | 4 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 7 |
| 175 | C0 | 4 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 7 |
| 176 | C0 | 8 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 7 |
| 177 | C2 | 1 | 0 | case A: 9<br>case B: 39 | 0 | 2 | 2 |
| 178 | C2 | 1 | 0 | case A: 9<br>case B: 29 | 0 | 2 | 2 |
| 179 | C2 | 1 | 0 | case A: 4, 9<br>case B: 29, 39 | 0 | 1 | 2 |
| 180 | C2 | 1 | 0 | case A: 4, 9, 19<br>case B: 29, 34, 39 | 0 | 1 | 2 |
| 181 | C2 | 1 | 0 | case A: 4, 9, 14, 19<br>case B: 24, 29, 34, 39 | 0 | 1 | 2 |
| 182 | C2 | 1 | 0 | case A: 16, 17, 18, 19<br>case B: 33, 35, 37, 39 | 0 | 2 | 2 |
| 183 | C2 | 1 | 0 | case A: 9, 11, 13, 15<br>case B: 33, 35, 37, 39 | 0 | 2 | 2 |
| 184 | C2 | 1 | 0 | case A: 9, 11, 13, 15, 17, 19<br>case B: 29, 31, 33, 35, 37, 39 | 0 | 2 | 2 |
| 185 | C2 | 1 | 0 | case A: 4, 9, 14, 19, 24, 29<br>case B: 14, 19, 24, 29, 34, 39 | 0 | 1 | 2 |
| 186 | C2 | 1 | 0 | 4, 9, 14, 19, 24, 29, 34, 39 | 0 | 1 | 2 |
| 187 | C2 | 1 | 0 | case A: 4, 9, 11, 13, 14, 15, 17, 19<br>case B: 24, 29, 31, 33, 34, 35, 37, 39 | 0 | 2 | 2 |
| 188 | C2 | 1 | 0 | case A: 12, 13, 14, 15, 16, 17, 18, 19<br>case B: 32, 33, 34, 35, 36, 37, 38, 39 | 0 | 2 | 2 |
| 189 | C2 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 2 |
| 190 | C2 | 1 | 0 | 4, 9, 11, 13, 15, 17, 19, 24, 29, 31, 33, 35, 37, 39 | 0 | 2 | 2 |
| 191 | C2 | 1 | 0 | 4, 9, 11, 13, 14, 15, 17, 19, 24, 29, 31, 33, 34, 35, 37, 39 | 0 | 2 | 2 |
| 192 | C2 | 1 | 0 | 4, 9, 10, 11, 12, 13, 14, 15, 16, 17, 18, 19, 24, 29, 30, 31, 32, 33, 34, 35, 36, 37, 38, 39 | 0 | 2 | 2 |
| 193 | C2 | 2 | O ≥ 5: 0<br>O < 5: 1 | case A: 4, 9<br>case B: 29, 39 | 0 | 2 | 2 |
| 194 | C2 | 2 | O ≥ 5: 0<br>O < 5: 1 | case A: 9, 11, 13, 15<br>case B: 33, 35, 37, 39 | 0 | 2 | 2 |

TABLE 4-continued

| PRACH Config. Index | Preamble format | SFN mod x = y | | slot number (60 kHz SCS) | Starting symbol | Number of PRACH slots within a 0.25 ms | Number of ROs within a RACH slot |
|---|---|---|---|---|---|---|---|
| | | x | y | | | | |
| 195 | C2 | 2 | O ≥ 5: 0<br>O < 5: 1 | case A: 4, 9, 14, 19<br>case B: 24, 29, 34, 39 | 0 | 1 | 2 |
| 196 | C2 | 2 | O ≥ 5: 0<br>O < 5: 1 | 4, 9, 14, 19, 24, 29, 34, 39 | 0 | 1 | 2 |
| 197 | C2 | 2 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 2 |
| 198 | C2 | 2 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 2 |
| 199 | C2 | 2 | O ≥ 5: 0<br>O < 5: 1 | 4, 9, 11, 13, 14, 15, 17, 19, 24, 29, 31, 33, 34, 35, 37, 39 | 0 | 2 | 2 |
| 200 | C2 | 2 | O ≥ 5: 0<br>O < 5: 1 | 4, 9, 10, 11, 12, 13, 14, 15, 16, 17, 18, 19, 24, 29, 30, 31, 32, 33, 34, 35, 36, 37, 38, 39 | 0 | 2 | 2 |
| 201 | C2 | 4 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 2 |
| 202 | C2 | 4 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 2 |
| 203 | C2 | 8 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 2 |
| 204 | C2 | 8 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 2 |
| 205 | C2 | 16 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 2 |
| 206 | C2 | 16 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 2 |
| 207 | A1/B1 | 1 | 0 | case A: 9<br>case B: 29 | 0 | 2 | 7 |
| 208 | A1/B1 | 1 | 0 | case A: 4, 9<br>case B: 29, 39 | 0 | 2 | 7 |
| 209 | A1/B1 | 1 | 0 | case A: 4, 9, 19<br>case B: 29, 34, 39 | 0 | 1 | 7 |
| 210 | A1/B1 | 1 | 0 | case A: 4, 9, 14, 19<br>case B: 24, 29, 34, 39 | 0 | 1 | 7 |
| 211 | A1/B1 | 1 | 0 | case A: 9, 11, 13, 15<br>case B: 33, 35, 37, 39 | 0 | 2 | 7 |
| 212 | A1/B1 | 1 | 0 | 4, 9, 14, 19, 24, 29, 34, 39 | 0 | 1 | 7 |
| 213 | A1/B1 | 1 | 0 | case A: 4, 9, 11, 13, 14, 15, 17, 19<br>case B: 24, 29, 31, 33, 34, 35, 37, 39 | 0 | 2 | 7 |
| 214 | A1/B1 | 1 | 0 | case A: 12, 13, 14, 15, 16, 17, 18, 19<br>case B: 32, 33, 34, 35, 36, 37, 38, 39 | 0 | 2 | 7 |

TABLE 4-continued

| PRACH Config. Index | Preamble format | SFN mod x = y | | slot number (60 kHz SCS) | Starting symbol | Number of PRACH slots within a 0.25 ms | Number of ROs within a RACH slot |
|---|---|---|---|---|---|---|---|
| | | x | y | | | | |
| 215 | A1/B1 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 7 |
| 216 | A1/B1 | 1 | 0 | 4, 9, 11, 13, 14, 15, 17, 19, 24, 29, 31, 33, 34, 35, 37, 39 | 0 | 2 | 7 |
| 217 | A1/B1 | 1 | 0 | 4, 9, 10, 11, 12, 13, 14, 15, 16, 17, 18, 19, 24, 29, 30, 31, 32, 33, 34, 35, 36, 37, 38, 39 | 0 | 2 | 7 |
| 218 | A1/B1 | 2 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 7 |
| 219 | A1/B1 | 2 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 7 |
| 220 | A1/B1 | 2 | O ≥ 5: 0<br>O < 5: 1 | 4, 9, 11, 13, 14, 15, 17, 19, 24, 29, 31, 33, 34, 35, 37, 39 | 0 | 2 | 7 |
| 221 | A1/B1 | 2 | O ≥ 5: 0<br>O < 5: 1 | 4, 9, 10, 11, 12, 13, 14, 15, 16, 17, 18, 19, 24, 29, 30, 31, 32, 33, 34, 35, 36, 37, 38, 39 | 0 | 2 | 7 |
| 222 | A2/B2 | 1 | 0 | case A: 9<br>case B: 29 | 0 | 2 | 3 |
| 223 | A2/B2 | 1 | 0 | case A: 4, 9<br>case B: 29, 39 | 0 | 2 | 3 |
| 224 | A2/B2 | 1 | 0 | case A: 4, 9, 19<br>case B: 29, 34, 39 | 0 | 1 | 3 |
| 225 | A2/B2 | 1 | 0 | case A: 4, 9, 14, 19<br>case B: 24, 29, 34, 39 | 0 | 1 | 3 |
| 226 | A2/B2 | 1 | 0 | case A: 9, 11, 13, 15<br>case B: 33, 35, 37, 39 | 0 | 2 | 3 |
| 227 | A2/B2 | 1 | 0 | 4, 9, 14, 19, 24, 29, 34, 39 | 0 | 1 | 3 |
| 228 | A2/B2 | 1 | 0 | case A: 4, 9, 11, 13, 14, 15, 17, 19<br>case B: 24, 29, 31, 33, 34, 35, 37, 39 | 0 | 2 | 3 |
| 229 | A2/B2 | 1 | 0 | case A: 12, 13, 14, 15, 16, 17, 18, 19<br>case B: 32, 33, 34, 35, 36, 37, 38, 39 | 0 | 2 | 3 |
| 230 | A2/B2 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 3 |
| 231 | A2/B2 | 1 | 0 | 4, 9, 11, 13, 14, 15, 17, 19, 24, 29, 31, 33, 34, 35, 37, 39 | 0 | 2 | 3 |
| 232 | A2/B2 | 1 | 0 | 4, 9, 10, 11, 12, 13, 14, 15, 16, 17, 18, 19, 24, 29, 30, 31, 32, 33, 34, 35, 36, 37, 38, 39 | 0 | 2 | 3 |
| 233 | A2/B2 | 2 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 3 |

TABLE 4-continued

| PRACH Config. Index | Preamble format | SFN mod x = y | | slot number (60 kHz SCS) | Starting symbol | Number of PRACH slots within a 0.25 ms | Number of ROs within a RACH slot |
|---|---|---|---|---|---|---|---|
| | | x | y | | | | |
| 234 | A2/B2 | 2 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 3 |
| 235 | A2/B2 | 2 | O ≥ 5: 0<br>O < 5: 1 | 4, 9, 11, 13, 14, 15, 17, 19, 24, 29, 31, 33, 34, 35, 37, 39 | 0 | 2 | 3 |
| 236 | A2/B2 | 2 | O ≥ 5: 0<br>O < 5: 1 | 4, 9, 10, 11, 12, 13, 14, 15, 16, 17, 18, 19, 24, 29, 30, 31, 32, 33, 34, 35, 36, 37, 38, 39 | 0 | 2 | 3 |
| 237 | A3/B3 | 1 | 0 | case A: 9<br>case B: 29 | 0 | 2 | 2 |
| 238 | A3/B3 | 1 | 0 | case A: 4, 9<br>case B: 29, 39 | 0 | 1 | 2 |
| 239 | A3/B3 | 1 | 0 | case A: 4, 9, 19<br>case B: 29, 34, 39 | 0 | 1 | 2 |
| 240 | A3/B3 | 1 | 0 | case A: 4, 9, 14, 19<br>case B: 24, 29, 34, 39 | 0 | 1 | 2 |
| 241 | A3/B3 | 1 | 0 | case A: 9, 11, 13, 15<br>case B: 33, 35, 37, 39 | 0 | 2 | 2 |
| 242 | A3/B3 | 1 | 0 | 4, 9, 14, 19, 24, 29, 34, 39 | 0 | 1 | 2 |
| 243 | A3/B3 | 1 | 0 | case A: 4, 9, 11, 13, 14, 15, 17, 19<br>case B: 24, 29, 31, 33, 34, 35, 37, 39 | 0 | 2 | 2 |
| 244 | A3/B3 | 1 | 0 | case A: 12, 13, 14, 15, 16, 17, 18, 19<br>case B: 32, 33, 34, 35, 36, 37, 38, 39 | 0 | 2 | 2 |
| 245 | A3/B3 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 2 |
| 246 | A3/B3 | 1 | 0 | 4, 9, 11, 13, 14, 15, 17, 19, 24, 29, 31, 33, 34, 35, 37, 39 | 0 | 2 | 2 |
| 247 | A3/B3 | 1 | 0 | 4, 9, 10, 11, 12, 13, 14, 15, 16, 17, 18, 19, 24, 29, 30, 31, 32, 33, 34, 35, 36, 37, 38, 39 | 0 | 2 | 2 |
| 248 | A3/B3 | 2 | O ≥ 5: 0<br>O < 5: 1 | case A: 4, 9, 11, 13, 14, 15, 17, 19<br>case B: 24, 29, 31, 33, 34, 35, 37, 39 | 0 | 2 | 2 |
| 249 | A3/B3 | 2 | O ≥ 5: 0<br>O < 5: 1 | case A: 4, 9, 10, 11, 12, 13, 14, 15, 16, 17, 18, 19<br>case B: 24, 29, 30, 31, 32, 33, 34, 35, 36, 37, 38, 39 | 0 | 2 | 2 |
| 250 | A3/B3 | 2 | O ≥ 5: 0<br>O < 5: 1 | 4, 9, 11, 13, 14, 15, 17, 19, 24, 29, 31, 33, 34, 35, 37, 39 | 0 | 2 | 2 |
| 251 | A3/B3 | 2 | O ≥ 5: 0<br>O < 5: 1 | 4, 9, 10, 11, 12, 13, 14, 15, 16, 17, 18, 19, 24, 29, 30, 31, 32, 33, 34, 35, 36, 37, 38, 39 | 0 | 2 | 2 |
| 252 | | | | | | | |
| 253 | | | | | | | |
| 254 | | | | | | | |
| 255 | | | | | | | |

TABLE 5

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 0 | A1 | 1 | 0 | case A: 9<br>case B: 39 | {l, 2l, k + l} | 2 | floor[(13 − Ns)/2] |
| 1 | A1 | 1 | 0 | case A: 9<br>case B: 29 | {l, 2l, k + l} | 2 | floor[(13 − Ns)/2] |
| 2 | A1 | 1 | 0 | case A: 4, 9<br>case B: 29, 39 | {l, 2l, k + l} | 1 | floor[(13 − Ns)/2] |
| 3 | A1 | 1 | 0 | case A: 4, 9, 19<br>case B: 29, 34, 39 | {l, 2l, k + l} | 1 | floor[(13 − Ns)/2] |
| 4 | A1 | 1 | 0 | case A: 4, 9, 14, 19<br>case B: 24, 29, 34, 39 | {l, 2l, k + l} | 1 | floor[(13 − Ns)/2] |
| 5 | A1 | 1 | 0 | case A: 16, 17, 18, 19<br>case B: 33, 35, 37, 39 | {l, 2l, k + l} | 2 | floor[(13 − Ns)/2] |
| 6 | A1 | 1 | 0 | case A: 9, 11, 13, 15<br>case B: 33, 35, 37, 39 | {l, 2l, k + l} | 2 | floor[(13 − Ns)/2] |
| 7 | A1 | 1 | 0 | case A: 9, 11, 13, 15, 17, 19<br>case B: 29, 31, 33, 35, 37, 39 | {l, 2l, k + l} | 2 | floor[(13 − Ns)/2] |
| 8 | A1 | 1 | 0 | case A: 4, 9, 14, 19, 24, 29<br>case B: 14, 19, 24, 29, 34, 39 | {l, 2l, k + l} | 1 | floor[(13 − Ns)/2] |
| 9 | A1 | 1 | 0 | 4, 9, 14, 19, 24, 29, 34, 39 | {l, 2l, k + l} | 1 | floor[(13 − Ns)/2] |
| 10 | A1 | 1 | 0 | case A: 4, 9, 11, 13, 14, 15, 17, 19<br>case B: 24, 29, 31, 33, 34, 35, 37, 39 | {l, 2l, k + l} | 2 | floor[(13 − Ns)/2] |
| 11 | A1 | 1 | 0 | case A: 12, 13, 14, 15, 16, 17, 18, 19<br>case B: 32, 33, 34, 35, 36, 37, 38, 39 | {l, 2l, k + l} | 2 | floor[(13 − Ns)/2] |
| 12 | A1 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/2] |
| 13 | A1 | 1 | 0 | 4, 9, 11, 13, 15, 17, 19, 24, 29, 31, 33, 35, 37, 39 | {l, 2l, k + l} | 2 | floor[(13 − Ns)/2] |
| 14 | A1 | 1 | 0 | 4, 9, 11, 13, 14, 15, 17, 19, 24, 29, 31, 33, 34, 35, 37, 39 | {l, 2l, k + l} | 2 | floor[(13 − Ns)/2] |
| 15 | A1 | 1 | 0 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(13 − Ns)/2] |
| 16 | A1 | 2 | O ≥ 5:0<br>O < 5:1 | case A: 4, 9<br>case B: 29, 39 | {l, 2l, k + l} | 2 | floor[(13 − Ns)/2] |
| 17 | A1 | 2 | O ≥ 5:0<br>O < 5:1 | case A: 9, 11, 13, 15<br>case B: 33, 35, 37, 39 | {l, 2l, k + l} | 2 | floor[(13 − Ns)/2] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 18 | A1 | 2 | O ≥ 5:0<br>O < 5:1 | case A: 4, 9, 14, 19<br>case B: 24, 29, 34, 39 | {l, 2l, k + l} | 1 | floor[(13 − Ns)/2] |
| 19 | A1 | 2 | O ≥ 5:0<br>O < 5:1 | 4, 9, 14, 19, 24, 29, 34, 39 | {l, 2l, k + l} | 1 | floor[(13 − Ns)/2] |
| 20 | A1 | 2 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(13 − Ns)/2] |
| 21 | A1 | 2 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/2] |
| 22 | A1 | 2 | O ≥ 5:0<br>O < 5:1 | 4, 9, 11, 13, 14, 15, 17, 19, 24, 29, 31, 33, 34, 35, 37, 39 | {l, 2l, k + l} | 2 | floor[(13 − Ns)/2] |
| 23 | A1 | 2 | O ≥ 5:0<br>O < 5:1 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(13 − Ns)/2] |
| 24 | A1 | 4 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(13 − Ns)/2] |
| 25 | A1 | 4 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/2] |
| 26 | A1 | 8 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(13 − Ns)/2] |
| 27 | A1 | 8 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/2] |
| 28 | A1 | 16 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(13 − Ns)/2] |
| 29 | A1 | 16 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/2] |
| 30 | A2 | 1 | 0 | case A: 9<br>case B: 39 | {l, 2l, k + l} | 2 | floor[(13 − Ns)/4] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 31 | A2 | 1 | 0 | case A: 9<br>case B: 29 | {l, 2l, k + l} | 2 | floor[(13 − Ns)/4] |
| 32 | A2 | 1 | 0 | case A: 4, 9<br>case B: 29, 39 | {l, 2l, k + l} | 1 | floor[(13 − Ns)/4] |
| 33 | A2 | 1 | 0 | case A: 4, 9, 19<br>case B: 29, 34, 39 | {l, 2l, k + l} | 1 | floor[(13 − Ns)/4] |
| 34 | A2 | 1 | 0 | case A: 4, 9, 14, 19<br>case B: 24, 29, 34, 39 | {l, 2l, k + l} | 1 | floor[(13 − Ns)/4] |
| 35 | A2 | 1 | 0 | case A: 16, 17, 18, 19<br>case B: 33, 35, 37, 39 | {l, 2l, k + l} | 2 | floor[(13 − Ns)/4] |
| 36 | A2 | 1 | 0 | case A: 9, 11, 13, 15<br>case B: 33, 35, 37, 39 | {l, 2l, k + l} | 2 | floor[(13 − Ns)/4] |
| 37 | A2 | 1 | 0 | case A: 9, 11, 13, 15, 17, 19<br>case B: 29, 31, 33, 35, 37, 39 | {l, 2l, k + l} | 2 | floor[(13 − Ns)/4] |
| 38 | A2 | 1 | 0 | case A: 4, 9, 14, 19, 24, 29<br>case B: 14, 19, 24, 29, 34, 39 | {l, 2l, k + l} | 1 | floor[(13 − Ns)/4] |
| 39 | A2 | 1 | 0 | 4, 9, 14, 19, 24, 29, 34, 39 | {l, 2l, k + l} | 1 | floor[(13 − Ns)/4] |
| 40 | A2 | 1 | 0 | case A: 4, 9, 11, 13, 14, 15, 17, 19<br>case B: 24, 29, 31, 33, 34, 35, 37, 39 | {l, 2l, k + l} | 2 | floor[(13 − Ns)/4] |
| 41 | A2 | 1 | 0 | case A: 12, 13, 14, 15, 16, 17, 18, 19<br>case B: 32, 33, 34, 35, 36, 37, 38, 39 | {l, 2l, k + l} | 2 | floor[(13 − Ns)/4] |
| 42 | A2 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/4] |
| 43 | A2 | 1 | 0 | 4, 9, 11, 13, 15, 17, 19, 24, 29, 31, 33, 35, 37, 39 | {l, 2l, k + l} | 2 | floor[(13 − Ns)/4] |
| 44 | A2 | 1 | 0 | 4, 9, 11, 13, 14, 15, 17, 19, 24, 29, 31, 33, 34, 35, 37, 39 | {l, 2l, k + l} | 2 | floor[(13 − Ns)/4] |
| 45 | A2 | 1 | 0 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(13 − Ns)/4] |
| 46 | A2 | 2 | O ≥ 5:0<br>O < 5:1 | case A: 4, 9<br>case B: 29, 39 | {l, 2l, k + l} | 2 | floor[(13 − Ns)/4] |
| 47 | A2 | 2 | O ≥ 5:0<br>O < 5:1 | case A: 9, 11, 13, 15<br>case B: 33, 35, 37, 39 | {l, 2l, k + l} | 2 | floor[(13 − Ns)/4] |
| 48 | A2 | 2 | O ≥ 5:0<br>O < 5:1 | case A: 4, 9, 14, 19<br>case B: 24, 29, 34, 39 | {l, 2l, k + l} | 1 | floor[(13 − Ns)/4] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 49 | A2 | 2 | O ≥ 5:0<br>O < 5:1 | 4, 9, 14, 19,<br>24, 29, 34, 39 | {l, 2l, k + l} | 1 | floor[(13 − Ns)/4] |
| 50 | A2 | 2 | O ≥ 5:0<br>O < 5:1 | case A: 4, 9,<br>11, 13, 14, 15,<br>17, 19<br>case B: 24, 29,<br>31, 33, 34, 35,<br>37, 39 | {l, 2l, k + l} | 2 | floor[(13 − Ns)/4] |
| 51 | A2 | 2 | O ≥ 5:0<br>O < 5:1 | case A: 4, 9,<br>10, 11, 12, 13,<br>14, 15, 16, 17,<br>18, 19<br>case B: 24, 29,<br>30, 31, 32, 33,<br>34, 35, 36, 37,<br>38, 39 | {l, 2l, k + l} | 2 | floor[(13 − Ns)/4] |
| 52 | A2 | 2 | O ≥ 5:0<br>O < 5:1 | 4, 9, 11, 13,<br>14, 15, 17, 19,<br>24, 29, 31, 33,<br>34, 35, 37, 39 | {l, 2l, k + l} | 2 | floor[(13 − Ns)/4] |
| 53 | A2 | 2 | O ≥ 5:0<br>O < 5:1 | 4, 9, 10, 11,<br>12, 13, 14, 15,<br>16, 17, 18, 19,<br>24, 29, 30, 31,<br>32, 33, 34, 35,<br>36, 37, 38, 39 | {l, 2l, k + l} | 2 | floor[(13 − Ns)/4] |
| 54 | A2 | 4 | O ≥ 5:0<br>O < 5:1 | case A: 4, 9,<br>11, 13, 14, 15,<br>17, 19<br>case B: 24, 29,<br>31, 33, 34, 35,<br>37, 39 | {l, 2l, k + l} | 2 | floor[(13 − Ns)/4] |
| 55 | A2 | 4 | O ≥ 5:0<br>O < 5:1 | case A: 4, 9,<br>10, 11, 12, 13,<br>14, 15, 16, 17,<br>18, 19<br>case B: 24, 29,<br>30, 31, 32, 33,<br>34, 35, 36, 37,<br>38, 39 | {l, 2l, k + l} | 2 | floor[(13 − Ns)/4] |
| 56 | A2 | 8 | O ≥ 5:0<br>O < 5:1 | case A: 4, 9,<br>11, 13, 14, 15,<br>17, 19<br>case B: 24, 29,<br>31, 33, 34, 35,<br>37, 39 | {l, 2l, k + l} | 2 | floor[(13 − Ns)/4] |
| 57 | A2 | 8 | O ≥ 5:0<br>O < 5:1 | case A: 4, 9,<br>10, 11, 12, 13,<br>14, 15, 16, 17,<br>18, 19<br>case B: 24, 29,<br>30, 31, 32, 33,<br>34, 35, 36, 37,<br>38, 39 | {l, 2l, k + l} | 2 | floor[(13 − Ns)/4] |
| 58 | A2 | 16 | O ≥ 5:0<br>O < 5:1 | case A: 4, 9,<br>11, 13, 14, 15,<br>17, 19<br>case B: 24, 29,<br>31, 33, 34, 35,<br>37, 39 | {l, 2l, k + l} | 2 | floor[(13 − Ns)/4] |
| 59 | A2 | 16 | O ≥ 5:0<br>O < 5:1 | case A: 4, 9,<br>10, 11, 12, 13,<br>14, 15, 16, 17,<br>18, 19<br>case B: 24, 29,<br>30, 31, 32, 33,<br>34, 35, 36, 37,<br>38, 39 | {l, 2l, k + l} | 2 | floor[(13 − Ns)/4] |
| 60 | A3 | 1 | 0 | case A: 9<br>case B: 39 | {l, 2l, k + l} | 2 | floor[(13 − Ns)/6] |
| 61 | A3 | 1 | 0 | case A: 9<br>case B: 29 | {l, 2l, k + l} | 2 | floor[(13 − Ns)/6] |
| 62 | A3 | 1 | 0 | case A: 4, 9<br>case B: 29, 39 | {l, 2l, k + l} | 1 | floor[(13 − Ns)/6] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 63 | A3 | 1 | 0 | case A: 4, 9, 19<br>case B: 29, 34, 39 | {l, 2l, k + l} | 1 | floor[(13 − Ns)/6] |
| 64 | A3 | 1 | 0 | case A: 4, 9, 14, 19<br>case B: 24, 29, 34, 39 | {l, 2l, k + l} | 1 | floor[(13 − Ns)/6] |
| 65 | A3 | 1 | 0 | case A: 16, 17, 18, 19<br>case B: 33, 35, 37, 39 | {l, 2l, k + l} | 2 | floor[(13 − Ns)/6] |
| 66 | A3 | 1 | 0 | case A: 9, 11, 13, 15<br>case B: 33, 35, 37, 39 | {l, 2l, k + l} | 2 | floor[(13 − Ns)/6] |
| 67 | A3 | 1 | 0 | case A: 9, 11, 13, 15, 17, 19<br>case B: 29, 31, 33, 35, 37, 39 | {l, 2l, k + l} | 2 | floor[(13 − Ns)/6] |
| 68 | A3 | 1 | 0 | case A: 4, 9, 14, 19, 24, 29<br>case B: 14, 19, 24, 29, 34, 39 | {l, 2l, k + l} | 1 | floor[(13 − Ns)/6] |
| 69 | A3 | 1 | 0 | 4, 9, 14, 19, 24, 29, 34, 39 | {l, 2l, k + l} | 1 | floor[(13 − Ns)/6] |
| 70 | A3 | 1 | 0 | case A: 4, 9, 11, 13, 14, 15, 17, 19<br>case B: 24, 29, 31, 33, 34, 35, 37, 39 | {l, 2l, k + l} | 2 | floor[(13 − Ns)/6] |
| 71 | A3 | 1 | 0 | case A: 12, 13, 14, 15, 16, 17, 18, 19<br>case B: 32, 33, 34, 35, 36, 37, 38, 39 | {l, 2l, k + l} | 2 | floor[(13 − Ns)/6] |
| 72 | A3 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/6] |
| 73 | A3 | 1 | 0 | 4, 9, 11, 13, 15, 17, 19, 24, 29, 31, 33, 35, 37, 39 | {l, 2l, k + l} | 2 | floor[(13 − Ns)/6] |
| 74 | A3 | 1 | 0 | 4, 9, 11, 13, 14, 15, 17, 19, 24, 29, 31, 33, 34, 35, 37, 39 | {l, 2l, k + l} | 2 | floor[(13 − Ns)/6] |
| 75 | A3 | 1 | 0 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(13 − Ns)/6] |
| 76 | A3 | 2 | O ≥ 5:0<br>O < 5:1 | case A: 4, 9<br>case B: 29, 39 | {l, 2l, k + l} | 2 | floor[(13 − Ns)/6] |
| 77 | A3 | 2 | O ≥ 5:0<br>O < 5:1 | case A: 9, 11, 13, 15<br>case B: 33, 35, 37, 39 | {l, 2l, k + l} | 2 | floor[(13 − Ns)/6] |
| 78 | A3 | 2 | O ≥ 5:0<br>O < 5:1 | case A: 4, 9, 14, 19<br>case B: 24, 29, 34, 39 | {l, 2l, k + l} | 1 | floor[(13 − Ns)/6] |
| 79 | A3 | 2 | O ≥ 5:0<br>O < 5:1 | 4, 9, 14, 19, 24, 29, 34, 39 | {l, 2l, k + l} | 1 | floor[(13 − Ns)/6] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 80 | A3 | 2 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(13 − Ns)/6] |
| 81 | A3 | 2 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/6] |
| 82 | A3 | 2 | O ≥ 5:0<br>O < 5:1 | 4, 9, 11, 13, 14, 15, 17, 19, 24, 29, 31, 33, 34, 35, 37, 39 | {l, 2l, k + l} | 2 | floor[(13 − Ns)/6] |
| 83 | A3 | 2 | O ≥ 5:0<br>O < 5:1 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(13 − Ns)/6] |
| 84 | A3 | 4 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(13 − Ns)/6] |
| 85 | A3 | 4 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/6] |
| 86 | A3 | 8 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(13 − Ns)/6] |
| 87 | A3 | 8 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/6] |
| 88 | A3 | 16 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(13 − Ns)/6] |
| 89 | A3 | 16 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/6] |
| 90 | B1 | 1 | 0 | case A: 9<br>case B: 39 | {l, 2l, k + l} | 2 | floor[(14 − Ns)/2] |
| 91 | B1 | 1 | 0 | case A: 9<br>case B: 29 | {l, 2l, k + l} | 2 | floor[(14 − Ns)/2] |
| 92 | B1 | 1 | 0 | case A: 4, 9<br>case B: 29, 39 | {l, 2l, k + l} | 1 | floor[(14 − Ns)/2] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
| --- | --- | --- | --- | --- | --- | --- | --- |
| | | x | y | | | | |
| 93 | B1 | 1 | 0 | case A: 4, 9, 19<br>case B: 29, 34, 39 | {l, 2l, k + l} | 1 | floor[(14 − Ns)/2] |
| 94 | B1 | 1 | 0 | case A: 4, 9, 14, 19<br>case B: 24, 29, 34, 39 | {l, 2l, k + l} | 1 | floor[(14 − Ns)/2] |
| 95 | B1 | 1 | 0 | case A: 16, 17, 18, 19<br>case B: 33, 35, 37, 39 | {l, 2l, k + l} | 2 | floor[(14 − Ns)/2] |
| 96 | B1 | 1 | 0 | case A: 9, 11, 13, 15<br>case B: 33, 35, 37, 39 | {l, 2l, k + l} | 2 | floor[(14 − Ns)/2] |
| 97 | B1 | 1 | 0 | case A: 9, 11, 13, 15, 17, 19<br>case B: 29, 31, 33, 35, 37, 39 | {l, 2l, k + l} | 2 | floor[(14 − Ns)/2] |
| 98 | B1 | 1 | 0 | case A: 4, 9, 14, 19, 24, 29<br>case B: 14, 19, 24, 29, 34, 39 | {l, 2l, k + l} | 1 | floor[(14 − Ns)/2] |
| 99 | B1 | 1 | 0 | 4, 9, 14, 19, 24, 29, 34, 39 | {l, 2l, k + l} | 1 | floor[(14 − Ns)/2] |
| 100 | B1 | 1 | 0 | case A: 4, 9, 11, 13, 14, 15, 17, 19<br>case B: 24, 29, 31, 33, 34, 35, 37, 39 | {l, 2l, k + l} | 2 | floor[(14 − Ns)/2] |
| 101 | B1 | 1 | 0 | case A: 12, 13, 14, 15, 16, 17, 18, 19<br>case B: 32, 33, 34, 35, 36, 37, 38, 39 | {l, 2l, k + l} | 2 | floor[(14 − Ns)/2] |
| 102 | B1 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(14 − Ns)/2] |
| 103 | B1 | 1 | 0 | 4, 9, 11, 13, 15, 17, 19, 24, 29, 31, 33, 35, 37, 39 | {l, 2l, k + l} | 2 | floor[(14 − Ns)/2] |
| 104 | B1 | 1 | 0 | 4, 9, 11, 13, 14, 15, 17, 19, 24, 29, 31, 33, 34, 35, 37, 39 | {l, 2l, k + l} | 2 | floor[(14 − Ns)/2] |
| 105 | B1 | 1 | 0 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(14 − Ns)/2] |
| 106 | B1 | 2 | O ≥ 5:0<br>O < 5:1 | case A: 4, 9<br>case B: 29, 39 | {l, 2l, k + l} | 2 | floor[(14 − Ns)/2] |
| 107 | B1 | 2 | O ≥ 5:0<br>O < 5:1 | case A: 9, 11, 13, 15<br>case B: 33, 35, 37, 39 | {l, 2l, k + l} | 2 | floor[(14 − Ns)/2] |
| 108 | B1 | 2 | O ≥ 5:0<br>O < 5:1 | case A: 4, 9, 14, 19<br>case B: 24, 29, 34, 39 | {l, 2l, k + l} | 1 | floor[(14 − Ns)/2] |
| 109 | B1 | 2 | O ≥ 5:0<br>O < 5:1 | 4, 9, 14, 19, 24, 29, 34, 39 | {l, 2l, k + l} | 1 | floor[(14 − Ns)/2] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 110 | B1 | 2 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(14 − Ns)/2] |
| 111 | B1 | 2 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(14 − Ns)/2] |
| 112 | B1 | 2 | O ≥ 5:0<br>O < 5:1 | 4, 9, 11, 13, 14, 15, 17, 19, 24, 29, 31, 33, 34, 35, 37, 39 | {l, 2l, k + l} | 2 | floor[(14 − Ns)/2] |
| 113 | B1 | 2 | O ≥ 5:0<br>O < 5:1 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(14 − Ns)/2] |
| 114 | B1 | 4 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(14 − Ns)/2] |
| 115 | B1 | 4 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(14 − Ns)/2] |
| 116 | B1 | 8 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(14 − Ns)/2] |
| 117 | B1 | 8 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(14 − Ns)/2] |
| 118 | B1 | 16 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(14 − Ns)/2] |
| 119 | B1 | 16 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(14 − Ns)/2] |
| 120 | B4 | 1 | 0 | case A: 9<br>case B: 39 | {l, 2l, k + l} | 2 | floor[(14 − Ns)/12] |
| 121 | B4 | 1 | 0 | case A: 9<br>case B: 29 | {l, 2l, k + l} | 2 | floor[(14 − Ns)/12] |
| 122 | B4 | 1 | 0 | case A: 4, 9<br>case B: 29, 39 | {l, 2l, k + l} | 1 | floor[(14 − Ns)/12] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 123 | B4 | 1 | 0 | case A: 4, 9, 19<br>case B: 29, 34, 39 | {l, 2l, k + l} | 1 | floor[(14 − Ns)/12] |
| 124 | B4 | 1 | 0 | case A: 4, 9, 14, 19<br>case B: 24, 29, 34, 39 | {l, 2l, k + l} | 1 | floor[(14 − Ns)/12] |
| 125 | B4 | 1 | 0 | case A: 16, 17, 18, 19<br>case B: 33, 35, 37, 39 | {l, 2l, k + l} | 2 | floor[(14 − Ns)/12] |
| 126 | B4 | 1 | 0 | case A: 9, 11, 13, 15<br>case B: 33, 35, 37, 39 | {l, 2l, k + l} | 2 | floor[(14 − Ns)/12] |
| 127 | B4 | 1 | 0 | case A: 9, 11, 13, 15, 17, 19<br>case B: 29, 31, 33, 35, 37, 39 | {l, 2l, k + l} | 2 | floor[(14 − Ns)/12] |
| 128 | B4 | 1 | 0 | case A: 4, 9, 14, 19, 24, 29<br>case B: 14, 19, 24, 29, 34, 39 | {l, 2l, k + l} | 1 | floor[(14 − Ns)/12] |
| 129 | B4 | 1 | 0 | 4, 9, 14, 19, 24, 29, 34, 39 | {l, 2l, k + l} | 1 | floor[(14 − Ns)/12] |
| 130 | B4 | 1 | 0 | case A: 4, 9, 11, 13, 14, 15, 17, 19<br>case B: 24, 29, 31, 33, 34, 35, 37, 39 | {l, 2l, k + l} | 2 | floor[(14 − Ns)/12] |
| 131 | B4 | 1 | 0 | case A: 12, 13, 14, 15, 16, 17, 18, 19<br>case B: 32, 33, 34, 35, 36, 37, 38, 39 | {l, 2l, k + l} | 2 | floor[(14 − Ns)/12] |
| 132 | B4 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(14 − Ns)/12] |
| 133 | B4 | 1 | 0 | 4, 9, 11, 13, 15, 17, 19, 24, 29, 31, 33, 35, 37, 39 | {l, 2l, k + l} | 2 | floor[(14 − Ns)/12] |
| 134 | B4 | 1 | 0 | 4, 9, 11, 13, 14, 15, 17, 19, 24, 29, 31, 33, 34, 35, 37, 39 | {l, 2l, k + l} | 2 | floor[(14 − Ns)/12] |
| 135 | B4 | 1 | 0 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(14 − Ns)/12] |
| 136 | B4 | 2 | O ≥ 5:0<br>O < 5:1 | case A: 4, 9<br>case B: 29, 39 | {l, 2l, k + l} | 2 | floor[(14 − Ns)/12] |
| 137 | B4 | 2 | O ≥ 5:0<br>O < 5:1 | case A: 9, 11, 13, 15<br>case B: 33, 35, 37, 39 | {l, 2l, k + l} | 2 | floor[(14 − Ns)/12] |
| 138 | B4 | 2 | O ≥ 5:0<br>O < 5:1 | case A: 4, 9, 14, 19<br>case B: 24, 29, 34, 39 | {l, 2l, k + l} | 1 | floor[(14 − Ns)/12] |
| 139 | B4 | 2 | O ≥ 5:0<br>O < 5:1 | 4, 9, 14, 19, 24, 29, 34, 39 | {l, 2l, k + l} | 1 | floor[(14 − Ns)/12] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 140 | B4 | 2 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(14 − Ns)/12] |
| 141 | B4 | 2 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(14 − Ns)/12] |
| 142 | B4 | 2 | O ≥ 5:0<br>O < 5:1 | 4, 9, 11, 13, 14, 15, 17, 19, 24, 29, 31, 33, 34, 35, 37, 39 | {l, 2l, k + l} | 2 | floor[(14 − Ns)/12] |
| 143 | B4 | 2 | O ≥ 5:0<br>O < 5:1 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(14 − Ns)/12] |
| 144 | B4 | 4 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(14 − Ns)/12] |
| 145 | B4 | 4 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(14 − Ns)/12] |
| 146 | B4 | 8 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(14 − Ns)/12] |
| 147 | B4 | 8 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(14 − Ns)/12] |
| 148 | B4 | 16 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(14 − Ns)/12] |
| 149 | B4 | 16 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(14 − Ns)/12] |
| 150 | C0 | 1 | 0 | case A: 9<br>case B: 39 | {l, 2l, k + l} | 2 | floor[(13 − Ns)] |
| 151 | C0 | 1 | 0 | case A: 9<br>case B: 29 | {l, 2l, k + l} | 2 | floor[(13 − Ns)] |
| 152 | C0 | 1 | 0 | case A: 4, 9<br>case B: 29, 39 | {l, 2l, k + l} | 2 | floor[(13 − Ns)] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 153 | C0 | 1 | 0 | case A: 4, 9, 19<br>case B: 29, 34, 39 | {l, 2l, k + l} | 1 | floor[(13 − Ns)] |
| 154 | C0 | 1 | 0 | case A: 4, 9, 14, 19<br>case B: 24, 29, 34, 39 | {l, 2l, k + l} | 1 | floor[(13 − Ns)] |
| 155 | C0 | 1 | 0 | case A: 16, 17, 18, 19<br>case B: 33, 35, 37, 39 | {l, 2l, k + l} | 2 | floor[(13 − Ns)] |
| 156 | C0 | 1 | 0 | case A: 9, 11, 13, 15<br>case B: 33, 35, 37, 39 | {l, 2l, k + l} | 2 | floor[(13 − Ns)] |
| 157 | C0 | 1 | 0 | case A: 9, 11, 13, 15, 17, 19<br>case B: 29, 31, 33, 35, 37, 39 | {l, 2l, k + l} | 2 | floor[(13 − Ns)] |
| 158 | C0 | 1 | 0 | case A: 4, 9, 14, 19, 24, 29<br>case B: 14, 19, 24, 29, 34, 39 | {l, 2l, k + l} | 1 | floor[(13 − Ns)] |
| 159 | C0 | 1 | 0 | 4, 9, 14, 19, 24, 29, 34, 39 | {l, 2l, k + l} | 1 | floor[(13 − Ns)] |
| 160 | C0 | 1 | 0 | case A: 4, 9, 11, 13, 14, 15, 17, 19<br>case B: 24, 29, 31, 33, 34, 35, 37, 39 | {l, 2l, k + l} | 2 | floor[(13 − Ns)] |
| 161 | C0 | 1 | 0 | case A: 12, 13, 14, 15, 16, 17, 18, 19<br>case B: 32, 33, 34, 35, 36, 37, 38, 39 | {l, 2l, k + l} | 2 | floor[(13 − Ns)] |
| 162 | C0 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)] |
| 163 | C0 | 1 | 0 | 4, 9, 11, 13, 15, 17, 19, 24, 29, 31, 33, 35, 37, 39 | {l, 2l, k + l} | 2 | floor[(13 − Ns)] |
| 164 | C0 | 1 | 0 | 4, 9, 11, 13, 14, 15, 17, 19, 24, 29, 31, 33, 34, 35, 37, 39 | {l, 2l, k + l} | 2 | floor[(13 − Ns)] |
| 165 | C0 | 1 | 0 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(13 − Ns)] |
| 166 | C0 | 2 | O ≥ 5:0<br>O < 5:1 | case A: 4, 9<br>case B: 29, 39 | {l, 2l, k + l} | 2 | floor[(13 − Ns)] |
| 167 | C0 | 2 | O ≥ 5:0<br>O < 5:1 | case A: 9, 11, 13, 15<br>case B: 33, 35, 37, 39 | {l, 2l, k + l} | 2 | floor[(13 − Ns)] |
| 168 | C0 | 2 | O ≥ 5:0<br>O < 5:1 | case A: 4, 9, 14, 19<br>case B: 24, 29, 34, 39 | {l, 2l, k + l} | 1 | floor[(13 − Ns)] |
| 169 | C0 | 2 | O ≥ 5:0<br>O < 5:1 | 4, 9, 14, 19, 24, 29, 34, 39 | {l, 2l, k + l} | 1 | floor[(13 − Ns)] |

TABLE 5-continued

| PRACH Config. Index | Preamble format | SFN mod x = y, x | SFN mod x = y, y | slot number (60 kHz SCS) | Starting symbol (Ns) | Number of PRACH slots within a 0.25 ms | Number of ROs within a RACH slot |
|---|---|---|---|---|---|---|---|
| 170 | C0 | 2 | O ≥ 5:0 O < 5:1 | case A: 4, 9, 11, 13, 14, 15, 17, 19 case B: 24, 29, 31, 33, 34, 35, 37, 39 | {l, 2l, k + l} | 2 | floor[(13 − Ns)] |
| 171 | C0 | 2 | O ≥ 5:0 O < 5:1 | case A: 4, 9, 10, 11, 12, 13, 14, 15, 16, 17, 18, 19 case B: 24, 29, 30, 31, 32, 33, 34, 35, 36, 37, 38, 39 | {l, 2l, k + l} | 2 | floor[(13 − Ns)] |
| 172 | C0 | 2 | O ≥ 5:0 O < 5:1 | 4, 9, 11, 13, 14, 15, 17, 19, 24, 29, 31, 33, 34, 35, 37, 39 | {l, 2l, k + l} | 2 | floor[(13 − Ns)] |
| 173 | C0 | 2 | O ≥ 5:0 O < 5:1 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(13 − Ns)] |
| 174 | C0 | 4 | O ≥ 5:0 O < 5:1 | case A: 4, 9, 11, 13, 14, 15, 17, 19 case B: 24, 29, 31, 33, 34, 35, 37, 39 | {l, 2l, k + l} | 2 | floor[(13 − Ns)] |
| 175 | C0 | 4 | O ≥ 5:0 O < 5:1 | 34, 35, 36, 37, 38, 39 | {l, 2l, k + l} | 2 | floor[(13 − Ns)] |
| 176 | C0 | 8 | O ≥ 5:0 O < 5:1 | case A: 4, 9, 10, 11, 12, 13, 14, 15, 16, 17, 18, 19 case B: 24, 29, 30, 31, 32, 33, 34, 35, 36, 37, 38, 39 | {l, 2l, k + l} | 2 | floor[(13 − Ns)] |
| 177 | C2 | 1 | 0 | case A: 9 case B: 39 | {l, 2l, k + l} | 2 | floor[(13 − Ns)/4] |
| 178 | C2 | 1 | 0 | case A: 9 case B: 29 | {l, 2l, k + l} | 2 | floor[(13 − Ns)/4] |
| 179 | C2 | 1 | 0 | case A: 4, 9 case B: 29, 39 | {l, 2l, k + l} | 1 | floor[(13 − Ns)/4] |
| 180 | C2 | 1 | 0 | case A: 4, 9, 19 case B: 29, 34, 39 | {l, 2l, k + l} | 1 | floor[(13 − Ns)/4] |
| 181 | C2 | 1 | 0 | case A: 4, 9, 14, 19 case B: 24, 29, 34, 39 | {l, 2l, k + l} | 1 | floor[(13 − Ns)/4] |
| 182 | C2 | 1 | 0 | case A: 16, 17, 18, 19 case B: 33, 35, 37, 39 | {l, 2l, k + l} | 2 | floor[(13 − Ns)/4] |
| 183 | C2 | 1 | 0 | case A: 9, 11, 13, 15 case B: 33, 35, 37, 39 | {l, 2l, k + l} | 2 | floor[(13 − Ns)/4] |
| 184 | C2 | 1 | 0 | case A: 9, 11, 13, 15, 17, 19 case B: 29, 31, 33, 35, 37, 39 | {l, 2l, k + l} | 2 | floor[(13 − Ns)/4] |
| 185 | C2 | 1 | 0 | case A: 4, 9, 14, 19, 24, 29 case B: 14, 19, 24, 29, 34, 39 | {l, 2l, k + l} | 1 | floor[(13 − Ns)/4] |
| 186 | C2 | 1 | 0 | 4, 9, 14, 19, 24, 29, 34, 39 | {l, 2l, k + l} | 1 | floor[(13 − Ns)/4] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 187 | C2 | 1 | 0 | case A: 4, 9, 11, 13, 14, 15, 17, 19<br>case B: 24, 29, 31, 33, 34, 35, 37, 39 | {l, 2l, k + l} | 2 | floor[(13 − Ns)/4] |
| 188 | C2 | 1 | 0 | case A: 12, 13, 14, 15, 16, 17, 18, 19<br>case B: 32, 33, 34, 35, 36, 37, 38, 39 | {l, 2l, k + l} | 2 | floor[(13 − Ns)/4] |
| 189 | C2 | 1 | 0 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/4] |
| 190 | C2 | 1 | 0 | 4, 9, 11, 13, 15, 17, 19, 24, 29, 31, 33, 35, 37, 39 | {l, 2l, k + l} | 2 | floor[(13 − Ns)/4] |
| 191 | C2 | 1 | 0 | 4, 9, 11, 13, 14, 15, 17, 19, 24, 29, 31, 33, 34, 35, 37, 39 | {l, 2l, k + l} | 2 | floor[(13 − Ns)/4] |
| 192 | C2 | 1 | 0 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(13 − Ns)/4] |
| 193 | C2 | 2 | O ≥ 5:0<br>O < 5:1 | case A: 4, 9<br>case B: 29, 39 | {l, 2l, k + l} | 2 | floor[(13 − Ns)/4] |
| 194 | C2 | 2 | O ≥ 5:0<br>O < 5:1 | case A: 9, 11, 13, 15<br>case B: 33, 35, 37, 39 | {l, 2l, k + l} | 2 | floor[(13 − Ns)/4] |
| 195 | C2 | 2 | O ≥ 5:0<br>O < 5:1 | case A: 4, 9, 14, 19<br>case B: 24, 29, 34, 39 | {l, 2l, k + l} | 1 | floor[(13 − Ns)/4] |
| 196 | C2 | 2 | O ≥ 5:0<br>O < 5:1 | 4, 9, 14, 19, 24, 29, 34, 39 | {l, 2l, k + l} | 1 | floor[(13 − Ns)/4] |
| 197 | C2 | 2 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(13 − Ns)/4] |
| 198 | C2 | 2 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/4] |
| 199 | C2 | 2 | O ≥ 5:0<br>O < 5:1 | 4, 9, 11, 13, 14, 15, 17, 19, 24, 29, 31, 33, 34, 35, 37, 39 | {l, 2l, k + l} | 2 | floor[(13 − Ns)/4] |
| 200 | C2 | 2 | O ≥ 5:0<br>O < 5:1 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(13 − Ns)/4] |

TABLE 5-continued

| PRACH Config. Index | Preamble format | SFN mod x = y x | SFN mod x = y y | slot number (60 kHz SCS) | Starting symbol (Ns) | Number of PRACH slots within a 0.25 ms | Number of ROs within a RACH slot |
|---|---|---|---|---|---|---|---|
| 201 | C2 | 4 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(13 − Ns)/4] |
| 202 | C2 | 4 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/4] |
| 203 | C2 | 8 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(13 − Ns)/4] |
| 204 | C2 | 8 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/4] |
| 205 | C2 | 16 | O ≥ 5:0<br>O < 5:1 | case A: 4, 9, 11, 13, 14, 15, 17, 19<br>case B: 24, 29, 31, 33, 34, 35, 37, 39 | {l, 2l, k + l} | 2 | floor[(13 − Ns)/4] |
| 206 | C2 | 16 | O ≥ 5:0<br>O < 5:1 | case A: 4, 9, 10, 11, 12, 13, 14, 15, 16, 17, 18, 19<br>case B: 24, 29, 30, 31, 32, 33, 34, 35, 36, 37, 38, 39 | {l, 2l, k + l} | 2 | floor[(13 − Ns)/4] |
| 207 | A1/B1 | 1 | 0 | case A: 9<br>case B: 29 | {l, 2l, k + l} | 2 | floor[(14 − Ns)/2] |
| 208 | A1/B1 | 1 | 0 | case A: 4, 9<br>case B: 29, 39 | {l, 2l, k + l} | 2 | floor[(14 − Ns)/2] |
| 209 | A1/B1 | 1 | 0 | case A: 4, 9, 19<br>case B: 29, 34, 39 | {l, 2l, k + l} | 1 | floor[(14 − Ns)/2] |
| 210 | A1/B1 | 1 | 0 | case A: 4, 9, 14, 19<br>case B: 24, 29, 34, 39 | {l, 2l, k + l} | 1 | floor[(14 − Ns)/2] |
| 211 | A1/B1 | 1 | 0 | case A: 9, 11, 13, 15<br>case B: 33, 35, 37, 39 | {l, 2l, k + l} | 2 | floor[(14 − Ns)/2] |
| 212 | A1/B1 | 1 | 0 | 4, 9, 14, 19, 24, 29, 34, 39 | {l, 2l, k + l} | 1 | floor[(14 − Ns)/2] |
| 213 | A1/B1 | 1 | 0 | case A: 4, 9, 11, 13, 14, 15, 17, 19<br>case B: 24, 29, 31, 33, 34, 35, 37, 39 | {l, 2l, k + l} | 2 | floor[(14 − Ns)/2] |
| 214 | A1/B1 | 1 | 0 | case A: 12, 13, 14, 15, 16, 17, 18, 19<br>case B: 32, 33, 34, 35, 36, 37, 38, 39 | {l, 2l, k + l} | 2 | floor[(14 − Ns)/2] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 215 | A1/B1 | 1 | 0 | case A: 4, 9, 10, 11, 12, 13, 14, 15, 16, 17, 18, 19 case B: 24, 29, 30, 31, 32, 33, 34, 35, 36, 37, 38, 39 | {l, 2l, k + l} | 2 | floor[(14 − Ns)/2] |
| 216 | A1/B1 | 1 | 0 | 4, 9, 11, 13, 14, 15, 17, 19, 24, 29, 31, 33, 34, 35, 37, 39 | {l, 2l, k + l} | 2 | floor[(14 − Ns)/2] |
| 217 | A1/B1 | 1 | 0 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(14 − Ns)/2] |
| 218 | A1/B1 | 2 | O ≥ 5:0 O < 5:1 | case A: 4, 9, 11, 13, 14, 15, 17, 19 case B: 24, 29, 31, 33, 34, 35, 37, 39 | {l, 2l, k + l} | 2 | floor[(14 − Ns)/2] |
| 219 | A1/B1 | 2 | O ≥ 5:0 O < 5:1 | case A: 4, 9, 10, 11, 12, 13, 14, 15, 16, 17, 18, 19 case B: 24, 29, 30, 31, 32, 33, 34, 35, 36, 37, 38, 39 | {l, 2l, k + l} | 2 | floor[(14 − Ns)/2] |
| 220 | A1/B1 | 2 | O ≥ 5:0 O < 5:1 | 4, 9, 11, 13, 14, 15, 17, 19, 24, 29, 31, 33, 34, 35, 37, 39 | {l, 2l, k + l} | 2 | floor[(14 − Ns)/2] |
| 221 | A1/B1 | 2 | O ≥ 5:0 O < 5:1 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(14 − Ns)/2] |
| 222 | A2/B2 | 1 | 0 | case A: 9 case B: 29 | {l, 2l, k + l} | 2 | floor[(14 − Ns)/4] |
| 223 | A2/B2 | 1 | 0 | case A: 4, 9 case B: 29, 39 | {l, 2l, k + l} | 2 | floor[(14 − Ns)/4] |
| 224 | A2/B2 | 1 | 0 | case A: 4, 9, 19 case B: 29, 34, 39 | {l, 2l, k + l} | 1 | floor[(14 − Ns)/4] |
| 225 | A2/B2 | 1 | 0 | case A: 4, 9, 14, 19 case B: 24, 29, 34, 39 | {l, 2l, k + l} | 1 | floor[(14 − Ns)/4] |
| 226 | A2/B2 | 1 | 0 | case A: 9, 11, 13, 15 case B: 33, 35, 37, 39 | {l, 2l, k + l} | 2 | floor[(14 − Ns)/4] |
| 227 | A2/B2 | 1 | 0 | 4, 9, 14, 19, 24, 29, 34, 39 | {l, 2l, k + l} | 1 | floor[(14 − Ns)/4] |
| 228 | A2/B2 | 1 | 0 | case A: 4, 9, 11, 13, 14, 15, 17, 19 case B: 24, 29, 31, 33, 34, 35, 37, 39 | {l, 2l, k + l} | 2 | floor[(14 − Ns)/4] |
| 229 | A2/B2 | 1 | 0 | case A: 12, 13, 14, 15, 16, 17, 18, 19 case B: 32, 33, 34, 35, 36, 37, 38, 39 | {l, 2l, k + l} | 2 | floor[(14 − Ns)/4] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 230 | A2/B2 | 1 | 0 | case A: 4, 9, 10, 11, 12, 13, 14, 15, 16, 17, 18, 19 case B: 24, 29, 30, 31, 32, 33, 34, 35, 36, 37, 38, 39 | $\{l, 2l, k + l\}$ | 2 | floor[(14 − Ns)/4] |
| 231 | A2/B2 | 1 | 0 | 4, 9, 11, 13, 14, 15, 17, 19, 24, 29, 31, 33, 34, 35, 37, 39 | $\{l, 2l, k + l\}$ | 2 | floor[(14 − Ns)/4] |
| 232 | A2/B2 | 1 | 0 | 4, 9, 10, 11, 12, 13, 14, 15, 16, 17, 18, 19, 24, 29, 30, 31, 32, 33, 34, 35, 36, 37, 38, 39 | $\{l, 2l, k + l\}$ | 2 | floor[(14 − Ns)/4] |
| 233 | A2/B2 | 2 | O ≥ 5:0 O < 5:1 | case A: 4, 9, 11, 13, 14, 15, 17, 19 case B: 24, 29, 31,33,34,35, 37,39 | $\{l, 2l, k + l\}$ | 2 | floor[(14 − Ns)/4] |
| 234 | A2/B2 | 2 | O ≥ 5:0 O < 5:1 | case A: 4, 9, 10, 11, 12, 13, 14, 15, 16, 17, 18, 19 case B: 24, 29, 30, 31, 32, 33, 34, 35, 36, 37, 38, 39 | $\{l, 2l, k + l\}$ | 2 | floor[(14 − Ns)/4] |
| 235 | A2/B2 | 2 | O ≥ 5:0 O < 5:1 | 4, 9, 11, 13, 14, 15, 17, 19, 24, 29, 31, 33, 34, 35, 37, 39 | $\{l, 2l, k + l\}$ | 2 | floor[(14 − Ns)/4] |
| 236 | A2/B2 | 2 | O ≥ 5:0 O < 5:1 | 4, 9, 10, 11, 12, 13, 14, 15, 16, 17, 18, 19, 24, 29, 30, 31, 32, 33, 34, 35, 36, 37, 38, 39 | $\{l, 2l, k + l\}$ | 2 | floor[(14 − Ns)/4] |
| 237 | A3/B3 | 1 | 0 | case A: 9 case B: 29 | $\{l, 2l, k + l\}$ | 2 | floor[(14 − Ns)/6] |
| 238 | A3/B3 | 1 | 0 | case A: 4, 9 case B: 29, 39 | $\{l, 2l, k + l\}$ | 1 | floor[(14 − Ns)/6] |
| 239 | A3/B3 | 1 | 0 | case A: 4, 9, 19 case B: 29, 34, 39 | $\{l, 2l, k + l\}$ | 1 | floor[(14 − Ns)/6] |
| 240 | A3/B3 | 1 | 0 | case A: 4, 9, 14, 19 case B: 24, 29, 34, 39 | $\{l, 2l, k + l\}$ | 1 | floor[(14 − Ns)/6] |
| 241 | A3/B3 | 1 | 0 | case A: 9, 11, 13, 15 case B: 33, 35, 37, 39 | $\{l, 2l, k + l\}$ | 2 | floor[(14 − Ns)/6] |
| 242 | A3/B3 | 1 | 0 | 4, 9, 14, 19, 24, 29, 34, 39 | $\{l, 2l, k + l\}$ | 1 | floor[(14 − Ns)/6] |
| 243 | A3/B3 | 1 | 0 | case A: 4, 9, 11, 13, 14, 15, 17, 19 case B: 24, 29, 31, 33, 34, 35, 37, 39 | $\{l, 2l, k + l\}$ | 2 | floor[(14 − Ns)/6] |
| 244 | A3/B3 | 1 | 0 | case A: 12, 13, 14, 15, 16, 17, 18, 19 case B: 32, 33, 34, 35, 36, 37, 38, 39 | $\{l, 2l, k + l\}$ | 2 | floor[(14 − Ns)/6] |

TABLE 5-continued

| PRACH Config. Index | Preamble format | SFN mod x = y | | slot number (60 kHz SCS) | Starting symbol (Ns) | Number of PRACH slots within a 0.25 ms | Number of ROs within a RACH slot |
|---|---|---|---|---|---|---|---|
| | | x | y | | | | |
| 245 | A3/B3 | 1 | 0 | case A: 4, 9, 10, 11, 12, 13, 14, 15, 16, 17, 18, 19 case B: 24, 29, 30, 31, 32, 33, 34, 35, 36, 37, 38, 39 | {l, 2l, k + l} | 2 | floor[(14 − Ns)/6] |
| 246 | A3/B3 | 1 | 0 | 4, 9, 11, 13, 14, 15, 17, 19, 24, 29, 31, 33, 34, 35, 37, 39 | {l, 2l, k + l} | 2 | floor[(14 − Ns)/6] |
| 247 | A3/B3 | 1 | 0 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(14 − Ns)/6] |
| 248 | A3/B3 | 2 | O ≥ 5:0 O < 5:1 | case A: 4, 9, 11, 13, 14, 15, 17, 19 case B: 24, 29, 31, 33, 34, 35, 37, 39 | {l, 2l, k + l} | 2 | floor[(14 − Ns)/6] |
| 249 | A3/B3 | 2 | O ≥ 5:0 O < 5:1 | case A: 4, 9, 10, 11, 12, 13, 14, 15, 16, 17, 18, 19 case B: 24, 29, 30, 31, 32, 33, 34, 35, 36, 37, 38, 39 | {l, 2l, k + l} | 2 | floor[(14 − Ns)/6] |
| 250 | A3/B3 | 2 | O ≥ 5:0 O < 5:1 | 4, 9, 11, 13, 14, 15, 17, 19, 24, 29, 31, 33, 34, 35, 37, 39 | {l, 2l, k + l} | 2 | floor[(14 − Ns)/6] |
| 251 | A3/B3 | 2 | O ≥ 5:0 O < 5:1 | 4, 9, 10, 11, 12, 13, 14, 15, 16, 17, 18, 19, 24, 29, 30, 31, 32, 33, 34, 35, 36, 37, 38, 39 | {l, 2l, k + l} | 2 | floor[(14 − Ns)/6] |
| 252 | | | | | | | |
| 253 | | | | | | | |
| 254 | | | | | | | |
| 255 | | | | | | | |

It should be understood that, as shown in Table 2 to Table 5, in this embodiment of this application, the configuration index may be a PRACH configuration index. The first indication information may be a sequence number (corresponding to y in the tables, where for example, the configuration period is 4, and the first indication information, namely, y, may be 0, 1, 2, or 3) of a RACH system frame in the configuration period. For example, the first indication information may be a value of a RACH system frame number (SFN) mod the configuration period (corresponding to x in the tables). The second indication information may be a subframe number in the first time unit indicated by the first indication information or an index of a time unit of 0.25 ms in a system frame. The third indication information may be a quantity of PRACH slots in each subframe or 0.25 ms. The fourth indication information may be a quantity of ROs in a PRACH slot (Number of ROs within a RACH slot). The fifth indication information may be a sequence number of a starting symbol in the PRACH slot.

It should be understood that, configuration information corresponding to the configuration indexes in Table 2 to Table 5 may further include a preamble format. This embodiment of this application is not limited thereto.

Specifically, in this embodiment of this application, an optional value of a PRACH configuration sequence number is 0 to 255. A random access short preamble sequence format may be A1, A2, A3, B1, B4, A1/B1, A2/B2, A3/B3, C0, or C2. An optional value of the configuration period is {1, 2, 4, 8, 16}, where configuration period duration corresponding to configuration periods 1, 2, 4, 8, and 16 is 10 ms, 20 ms, 40 ms, 80 ms, and 160 ms. The quantity of PRACH slots is a quantity of PRACH subframes included within a duration granularity of 1 ms for a frequency band below 6 GHz, or a quantity of PRACH subframes included within a duration granularity of 0.25 ms for a frequency band above 6 GHz, and a value of the quantity of PRACH slots may be 1 or 2.

In this embodiment of this application, the PRACH configuration table prestored by the network device and the terminal device is determined based on the time domain resource for the common signal block and/or the time domain information of the control channel resource set. Therefore, the following first describes, with reference to FIG. 4 (a schematic diagram of possible time domain distribution of an SSB and an RMSI CORESET below 6 GHz), a principle of determining the configuration information corresponding to Table 2 and Table 3, and describes, with reference to FIG. 5 (a schematic diagram of possible time domain distribution of an SSB and an RMSI CORESET above 6 GHz), a principle of determining the configuration information corresponding to Table 4 and Table 5.

Figure 4:
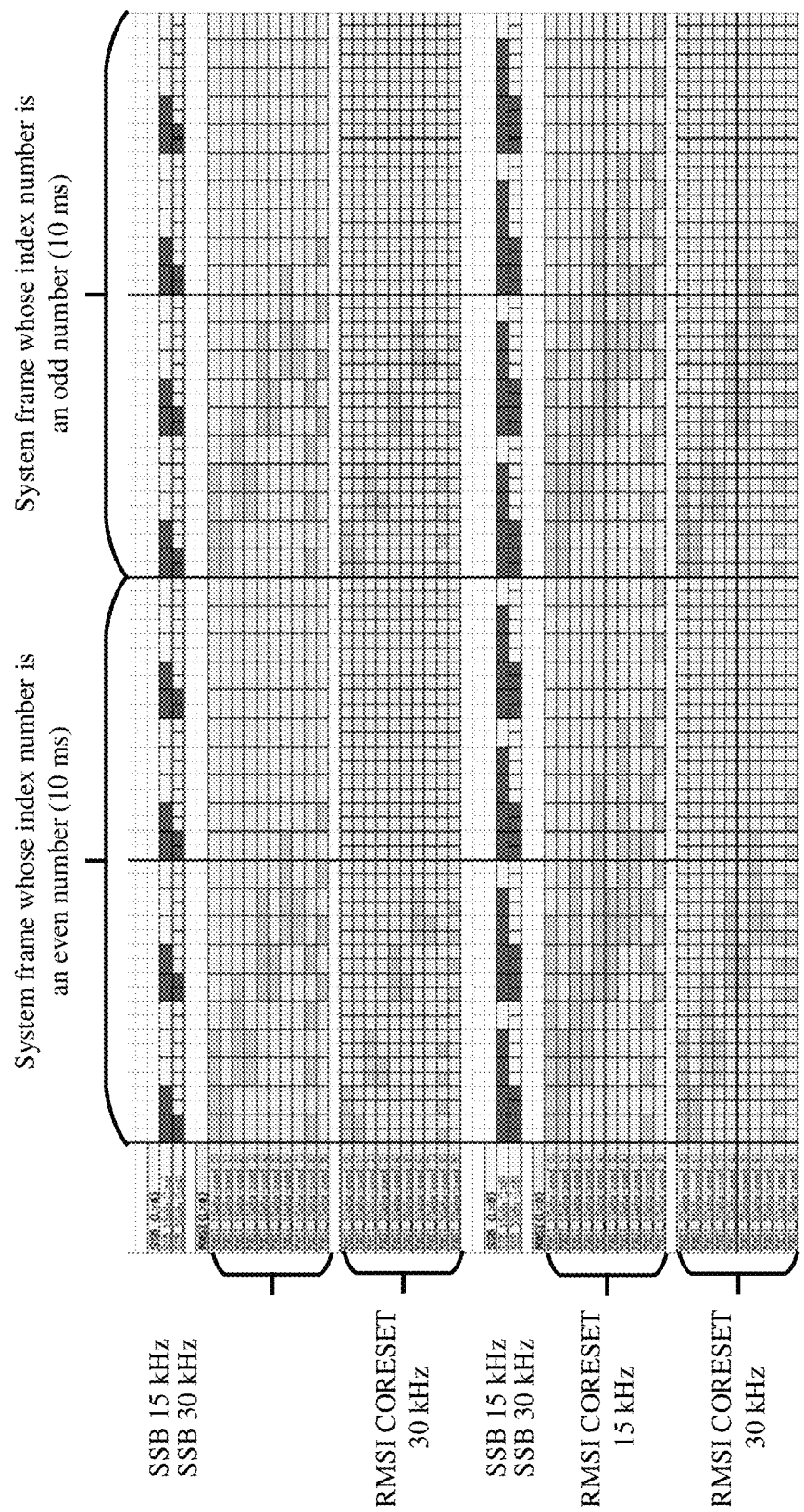
FIG. 4 is a schematic distribution diagram of SSB and RMSI CORESET resources according to an embodiment of this application.

FIG. 4 is a schematic diagram of possible time domain distribution of SSBs and RMSI CORESETs below 6 GHz in two system frames. As shown in FIG. 4, an SSB period of 5 ms (L=4 or 8) is used as an example in FIG. 4, and optional time domain position distribution of SSBs with subcarrier spacings of 15 kHz and 30 kHz and RMSI CORESETs with subcarrier spacings of 15 kHz and 30 kHz in two system frames (20 ms) are shown. It can be learned from FIG. 4 that, in a system frame whose system frame index is an odd number, a relatively small quantity of SSBs and RMSI CORESETs are distributed. Therefore, in this embodiment of this application, a resource for an RO that avoids the SSB and the RMSI CORESET may be configured in the system frame whose system frame index is an odd number.

Figure 5:
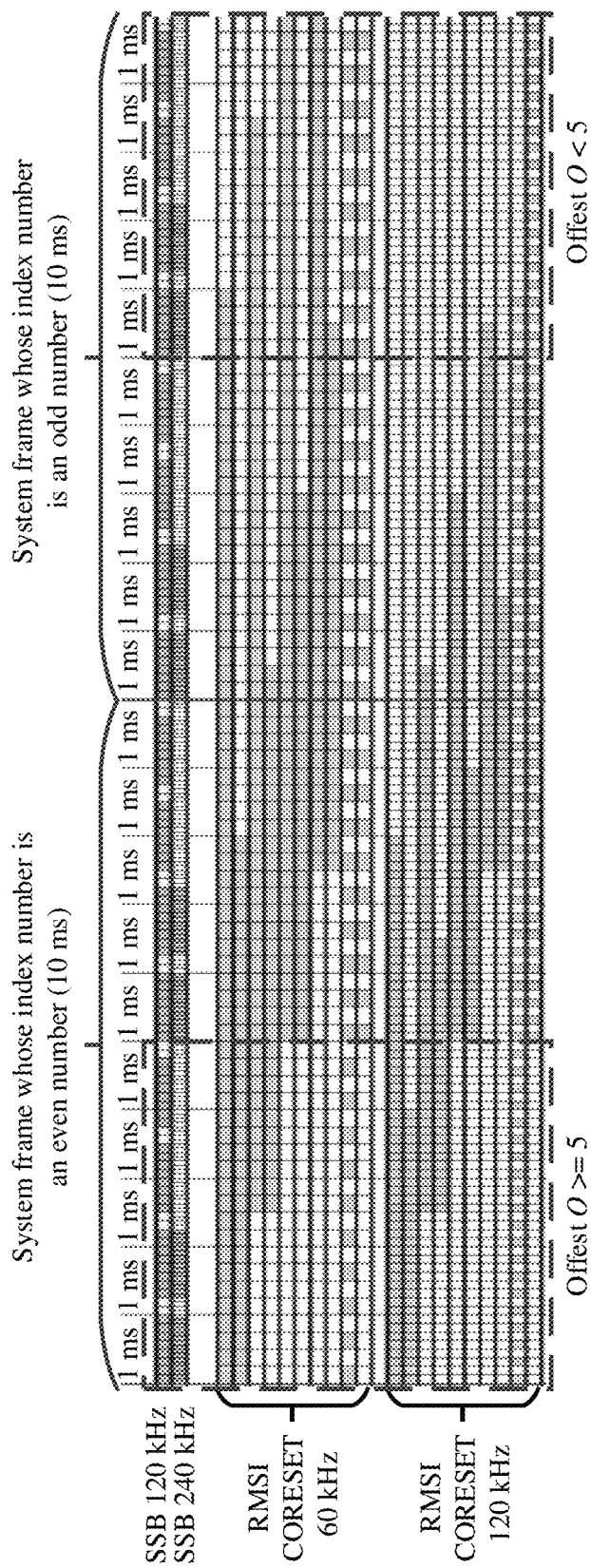
FIG. 5 is a schematic distribution diagram of SSB and RMSI CORESET resources according to an embodiment of this application.

FIG. 5 is a schematic diagram of possible time domain distribution of SSBs and RMSI CORESETs above 6 GHz in two system frames. As shown in FIG. 5, an SSB period of 5 ms (L=64) is used as an example in the figure, and optional time domain position distribution of SSBs with subcarrier spacings of 120 kHz and 240 kHz and RMSI CORESETs with subcarrier spacings of 60 kHz and 120 kHz in two system frames (20 ms) are shown. It can be learned that, if a time domain offset of the RMSI CORESET is relatively small, there are a relatively small quantity of optional time domain positions for distribution of an RMSI CORESET in the second half of an odd-numbered system frame. If a time domain offset of the RMSI CORESET is relatively large, there are a relatively small quantity of optional time domain positions for distribution of an RMSI CORESET in the first half of an even-numbered system frame. Therefore, to avoid a conflict between a time domain position of the RO and time domain positions of the SSB and the RMSI CORESET as much as possible, during design of the PRACH configuration table, a random access system frame may be selected based on the time domain offset of the RMSI CORESET. For example, if the time domain offset of the RMSI CORESET is relatively small, for example, less than 5 ms, a system frame whose system frame index is an odd number is selected, or if the time domain offset of the RMSI CORESET is relatively large, for example, greater than 5 ms, a system frame whose system frame index is an even number is selected, and a resource for an RO that avoids the SSB and the RMSI CORESET is configured in these system frames.

Based on the foregoing analysis on FIG. 4 and FIG. 5, a principle of determining each piece of indication information in the PRACH configuration table is described in detail below with reference to a specific example.

It should be understood that, Table 2 to Table 5 in this embodiment of this application may be determined according to the principle described below. Optionally, Table 2 to Table 5 may alternatively be determined according to another principle. This embodiment of this application is not limited thereto.

Optionally, Table 2 to Table 5 may not be determined according to the principle described below. To be specific, Table 2 to Table 5 may exist independently. This embodiment of this application is not limited thereto.

It should be further understood that, in this embodiment of this application, Table 2 to Table 5 are merely examples, and Table 2 to Table 5 are merely examples of the one-to-one correspondence between a plurality of configuration indexes and a plurality of pieces of configuration information that is prestored by the terminal device and the network device in this embodiment of this application. Examples of Table 2 to Table 5 are merely intended to help a person skilled in the art understand this embodiment of the present disclosure, but are not intended to limit this embodiment of the present disclosure to a specific value or a specific scenario in the examples. Apparently, a person skilled in the art can make various equivalent modifications or changes based on Table 2 to Table 5 that are provided, and such modifications or changes also fall within the scope of this embodiment of the present disclosure.

It should be understood that, in this embodiment of this application, Table 2 to Table 5 each include a plurality of configuration indexes and configuration information corresponding to the plurality of configuration indexes. Optionally, each configuration index and configuration information corresponding to the configuration index in Table 2 to Table 5 may be separately used. To be specific, Table 2 to Table 5 each may be split into a plurality of small tables. This embodiment of this application is not limited thereto.

It should be further understood that, in this embodiment of this application, an order of the configuration indexes and the configuration information corresponding to the configuration indexes in Table 2 to Table 5 is not limited. Positions of groups of the configuration indexes and the configuration information corresponding to the configuration indexes in Table 2 to Table 5 may be adjusted or randomly disordered. This embodiment of this application is not limited thereto.

It should be further understood that, numbers of the configuration indexes in Table 2 to Table 5 may start from any number, for example, may start from 0 (as shown in Table 4 and Table 5), or may not start from 0, for example, may start from 71 (as shown in Table 2 and Table 3), and the numbers of the configuration indexes may be sorted in ascending order, or may be sorted in any manner, provided that the network device and the terminal device have a consistent understanding of the correspondence between the configuration index and the configuration information indicated by the configuration index. This embodiment of this application is not limited thereto.

It should be understood that, when a value of a random access preamble format in the second column in Table 2 to Table 5 is in a form of a combination of two letters, namely, a form of "x/y", "x/y" represents a value of a specific format. In other words, "x/y" herein does not indicate that the format is x or the format is y, but "x/y" indicates that the format is "x/y". For example, when a configuration index in Table 5 is 248, a random access preamble format corresponding to the configuration index is A3/B3.

It should be understood that, in this embodiment of this application, a proportion of a format corresponding to the configuration index in Table 2 to Table 5 that is a form (for example, A1, A2, A3, B1, or B4) represented by a single letter is higher than a proportion of a format corresponding to a configuration index that is a form of a combination of two letters, namely, a form of "x/y" (for example, A1/B1, A2/B2, or A3/B3). For different formats, configured time domain resources for the RO may be the same.

It should be further understood that, a time domain resource for the RO that is configured for one of the formats in Table 2 to Table 5 may also be used to configure a time domain resource for the RO for another format. To be specific, for different sequence formats, configured time domain resources for the RO may be the same. This embodiment of this application is not limited thereto.

It should be further understood that, in the foregoing table, O≥5 may be replaced with O>5, and O<5 may be replaced with O≤5. This embodiment of this application is not limited thereto. "≥" indicates being greater than or equal to, and "≤" indicates being less than or equal to.

A principle of determining the first indication information is first described below.

Optionally, in an embodiment, the random access configuration period is greater than a preset duration threshold, the time domain information of the control channel resource set includes a time domain offset of the control channel resource set, and the time domain offset of the control channel resource set indicates duration between a starting time domain position of a control channel resource set associated with the first common signal block in the common signal block detection window and a starting position of a system frame in which the control channel resource set is located, and the first indication information used to indicate the first time unit is determined based on the time domain offset of the control channel resource set.

Further, in another embodiment, when the time domain offset of the control channel resource set is greater than or equal to a preset offset threshold, a sequence number corresponding to a position of the first time unit indicated by the first indication information in the random access configuration period is an even number, or when the time domain offset of the control channel resource set is less than a preset offset threshold, a sequence number corresponding to a position of the first time unit indicated by the first indication information in the random access configuration period is an odd number.

Alternatively, when the offset is equal to a preset offset threshold, a sequence number corresponding to a position of the first time unit indicated by the first indication information in the random access configuration period is an odd number. This embodiment of this application is not limited thereto. Correspondingly, the foregoing embodiment may be changed into the following form:

When the time domain offset of the control channel resource set is greater than a preset offset threshold, a sequence number corresponding to a position of the first time unit indicated by the first indication information in the random access configuration period is an even number, or when the time domain offset of the control channel resource set is less than or equal to the preset offset threshold, a sequence number corresponding to a position of the first time unit indicated by the first indication information in the random access configuration period is an odd number.

It should be understood that, the offset in this specification may be a specific time value, or may be a parameter indicating the time value, and a corresponding offset threshold may be a specific offset value, or may be a parameter indicating the offset value. This embodiment of this application is not limited thereto.

Therefore, in this embodiment of this application, a position of the first time unit (namely, a system frame) to which the time domain resource for the RO belongs is determined based on a value of the time domain offset of the control channel resource set, thereby avoiding a conflict with a control channel resource to the greatest extent, increasing a quantity of valid ROs, and improving random access efficiency.

For example, for FIG. 5, when the PRACH configuration period is greater than 10 ms, to be specific, when a PRACH configuration period parameter P>1 (namely, 10 ms), a system frame number SFN of the RO depends on a time domain offset O of the RMSI CORESET. If the time domain offset O of the RMSI CORESET is greater than or equal to a preset threshold, the system frame number of the RO satisfies that the SFN mod P=0. If the time domain offset O of the RMSI CORESET is less than a preset threshold, the system frame number of the RO satisfies that the SNF mod P=1. Optionally, the preset threshold may be one of 2, 2.5, 5, 7, and 7.5, and a unit of the preset threshold may be ms.

Specifically, the terminal device may obtain, based on the first configuration index, two system frame numbers in the configuration period that are indicated by the first indication information, and the terminal device may determine, based on the time domain offset O of the RMSI CORESET, that the resource for the RO belongs to a system frame corresponding to one of the two system frame numbers.

For example, as shown in Table 4 and Table 5, when a configuration index is 16, a corresponding configuration period is 2 (namely, 20 ms), and when the time domain offset O of the RMSI CORESET 5 (ms), a system frame number indicated by the first indication information satisfies that the SNF mod P=0 (to be specific, the SFN is an even number), or when the time domain offset O of the RMSI CORESET<5, the system frame number indicated by the first indication information satisfies that the SFN mod P=1 (to be specific, the SFN is an odd number). For another example, as shown in Table 4 and Table 5, when a configuration index is 56, a corresponding configuration period is 8 (namely, 80 ms), and when the time domain offset O of the RMSI CORESET 5 (ms), a sequence number of a system frame in the configuration period that is indicated by the first indication information may be 0 (to be specific, the SFN is an even number), and corresponds to the zeroth system frame in the configuration period. When the time domain offset O of the RMSI CORESET<5, a system frame number indicated by the first indication information may be 1 (to be specific, the SFN is an even number), and corresponds to the first system frame in the configuration period.

It should be understood that, as shown in Table 4 and Table 5, when a configuration period is 1 (namely, 10 ms), because the configuration period includes only one system frame, the first time unit indicated by the first indication information is the system frame.

Optionally, in another embodiment, the first indication information used to indicate the first time unit is determined based on the time domain position of the control channel resource set.

For example, as shown in Table 2 and Table 3, based on the foregoing analysis on FIG. 4, it can be learned that the system frame indicated by the first indication information may be a system frame that avoids the control channel resource set.

Therefore, in this embodiment of this application, the position of the first time unit to which the time domain resource for the RO belongs is determined based on the time domain position of the control channel resource set, thereby avoiding a conflict with the time domain resource for the control channel resource set as much as possible, increasing a quantity of valid ROs, and improving random access efficiency.

A principle of determining the second indication information is described below.

Optionally, in another embodiment, the second indication information used to indicate the at least one second time unit is determined based on a time domain position of the common signal block.

Further, in another embodiment, the at least one second time unit indicated by the second indication information is located at a time domain position other than an optional time domain position of the common signal block in the first time unit.

It should be understood that, the indication information of the second time unit may be a subframe number in the fourth last column in Table 2 and Table 3, or may be a sequence number of a slot (0.25 ms) corresponding to a subcarrier spacing of 60 kHz in a system frame in the fourth last column in Table 4 and Table 5.

For example, for a frequency band below 3 GHz, when a subcarrier spacing for an SSB is 15 kHz, sequence numbers of subframes that are not located at an optional time domain position of the SSB in the system frame in which the RO is located include {2, 3, 4, 7, 8, 9}. When a subcarrier spacing for an SSB is 30 kHz, sequence numbers of subframes that are not located at an optional time domain position of the SSB in the system frame in which the RO is located include {1, 2, 3, 4, 6, 7, 8, 9}. For a frequency band from 3 GHz to 6 GHz, when a subcarrier spacing for an SSB is 15 kHz, sequence numbers of subframes that are not located at an optional time domain position of the SSB in the system frame in which the RO is located include {4, 9}. When a subcarrier spacing for an SSB is 30 kHz, sequence numbers of subframes that are not located at an optional time domain position of the SSB in the system frame in which the RO is located include {2, 3, 4, 7, 8, 9}.

For example, as shown in Table 2, when a configuration index is 71, a corresponding subframe number is 9. When a configuration index is 79, corresponding subframe numbers are 3, 4, 8, and 9.

As shown in FIG. 5, for a frequency band above 6 GHz, when a subcarrier spacing for an SSB is 120 kHz, sequence numbers of slots (slots corresponding to a subcarrier spacing of 60 kHz, namely, 0.25 ms) that are not located at an optional time domain position of the SSB in the system frame in which the RO is located include {4, 9, 14, 19, 24, 29, 34, 39}. When a subcarrier spacing for an SSB is 240 kHz, sequence numbers of slots (slots corresponding to a subcarrier spacing of 60 kHz, namely, 0.25 ms) that are not located at an optional time domain position of the SSB in the system frame in which the RO is located include {4, 9 to 19, 24, 29 to 39}.

For example, as shown in Table 4 or Table 5, when a configuration index is 13, slots corresponding to the subcarrier spacing of 60 kHz in the system frame are 4, 9, 11, 13, 15, 17, 19, 24, 29, 31, 33, 35, 37, and 39.

Optionally, in another embodiment, the second indication information used to indicate the at least one second time unit is determined based on an optional time domain position of the common signal block and/or an index (for example, an SFN) of the first time unit.

Further, in another embodiment, the at least one second time unit includes a first group of second time units and a second group of second time units, the first group of second time units is located at a time domain position other than an optional time domain position of the common signal block in the first half time domain part of the first time unit, the second group of second time units is located at a time domain position other than an optional time domain position of the common signal block in the second half time domain part of the first time unit, and when an index number of the first time unit is an even number, the time domain resource for the at least one random access preamble occasion (RO) belongs to the first group of second time units indicated by the second indication information, or when an index number of the first time unit is an odd number, the time domain resource for the at least one random access preamble occasion (RO) belongs to the second group of second time units indicated by the second indication information.

Specifically, the terminal device may determine, based on the first configuration index, the two groups of second time units indicated by the first indication information, and the terminal device may determine, based on parity of the index of the first time unit, that the resource for the RO belongs to one of the two groups of second time units.

Specifically, a sequence number of a slot (a slot corresponding to a subcarrier spacing of 60 kHz, namely, 0.25 ms) in which the RO is located depends on the time domain offset O of the RMSI CORESET, and is a sequence number of a slot that is not located at an optional time domain position of the SSB.

If the time domain offset O of the RMSI CORESET is greater than or equal to the preset threshold, the sequence number of the slot in which the RO is located may include a sequence number of a slot that is not located at an optional time domain position of the SSB in a first half frame of a system frame (an even-numbered system frame).

If the time domain offset O of the RMSI CORESET is less than the preset threshold, the sequence number of the slot in which the RO is located may include a sequence number of a slot that is not located at an optional time domain position of the SSB in a second half frame of a system frame (odd-numbered).

Optionally, the preset threshold may be any one of 2, 2.5, 5, 7, and 7.5. This embodiment of this application is not limited thereto.

The preset threshold of 5 is used as an example. When the time domain offset O of the RMSI CORESET 5, for a subcarrier spacing of 120 kHz for an SSB, sequence numbers of slots that are not located at an optional time domain position of the SSB in the system frame in which the RO is located (namely, sequence numbers of slots corresponding to a subcarrier spacing of 60 kHz) include {4, 9, 14, 19}. For a subcarrier spacing of 240 kHz for an SSB, sequence numbers of slots that are not located at an optional time domain position of the SSB in the system frame in which the RO is located (namely, sequence numbers of slots corresponding to a subcarrier spacing of 60 kHz) include {4, 9 to 19}. When the time domain offset O of the RMSI CORESET<5, for a subcarrier spacing of 120 kHz for an SSB, sequence numbers of slots that are not located at an optional time domain position of the SSB in the system frame in which the RO is located (namely, sequence numbers of slots corresponding to a subcarrier spacing of 60 kHz) include {24, 29, 34, 39}. For a subcarrier spacing of 240 kHz for an SSB, sequence numbers of slots that are not located at an optional time domain position of the SSB in the system frame in which the RO is located (namely, sequence numbers of slots corresponding to a subcarrier spacing of 60 kHz) include {24, 29 to 39}.

For example, as shown in Table 4 and Table 5, when a configuration index is 0, a corresponding system frame number is 0, and a sequence number of a slot corresponding to a subcarrier spacing of 60 kHz in the system frame corresponding to the time domain resource for the RO is Case A (namely, a system frame whose index number is an even number): 9, or Case B (namely, a system frame whose index number is an odd number): 39. When a system frame number is 0, to be specific, the index number of the system frame is an even number, Case A is satisfied. Therefore, when the configuration index is 0, the resource for the RO is located in a slot with a slot sequence number of 9 corresponding to the subcarrier spacing of 60 kHz in the system frame.

For another example, when a configuration index is 16, sequence numbers of slots corresponding to a subcarrier spacing of 60 kHz in the system frame corresponding to the time domain resource for the RO are Case A (namely, a system frame whose index number is an even number): 4 and 9, or Case B (namely, a system frame whose index number is an odd number): 29 and 39. When a system frame number is 0, to be specific, the index number of the system frame is an even number, Case A is satisfied. Therefore, when the configuration index is 16, and when it is determined that the system frame number is 0, the resource for the RO is located in slots 4 and 9 corresponding to the subcarrier spacing of 60 kHz in the system frame. When the system frame number is 1, to be specific, the index number of the system frame is an odd number, Case B is satisfied. Therefore, when the configuration index is 16, and when it is determined that the system frame number is 1, the resource for the RO is located in slots with slot sequence numbers of 29 and 39 corresponding to the subcarrier spacing of 60 kHz in the system frame.

It can be learned from the foregoing description that, if the time domain offset O of the RMSI CORESET is greater than or equal to the preset threshold, it corresponds to a system frame whose index number is an even number, or if the time domain offset O of the RMSI CORESET is less than the preset threshold, it corresponds to a system frame whose index number is an odd number.

Therefore, optionally, in another embodiment, when the configuration period is greater than 1, the determining the second time unit based on parity of the index of the first time unit may be expressed as determining the second time unit based on the time domain offset of the control channel resource set.

Specifically, in another embodiment, when the configuration period is greater than 1, the second indication information used to indicate the at least one second time unit is determined based on the optional time domain position of the SSB and the time domain offset of the control channel resource set.

Further, in another embodiment, the at least one second time unit includes a first group of second time units and a second group of second time units, the first group of second time units includes a time unit that is not located at the time domain position of the SSB and that is in a first half time domain part of the first time unit with an even-numbered index, the second group of second time units includes a time unit that is not located at the time domain position of the SSB and that is in a second half time domain part of the first time unit with an odd-numbered index, and when the time domain offset of the control channel resource set is greater than or equal to the preset offset threshold, the time domain resource for the at least one random access preamble occasion (RO) belongs to the first group of second time units indicated by the second indication information, or when the time domain offset of the control channel resource set is less than a preset offset threshold, the time domain resource for the at least one random access preamble occasion (RO) belongs to the second group of second time units indicated by the second indication information.

Specifically, when the configuration period is greater than 1, the foregoing Case A may be modified as a case in which the offset of the control channel resource set is greater than or equal to the preset threshold. The foregoing Case B may be modified as a case in which the offset of the control channel resource set is less than the preset threshold.

Specifically, the terminal device may determine and obtain, based on the first configuration index, the two groups of second time units indicated by the first indication information, and the terminal device may determine, based on a value of the offset of the control channel resource set, that the resource for the RO belongs to one of the two groups of second time units.

For example, as shown in Table 4 and Table 5, when a configuration index is 16, sequence numbers of slots corresponding to a subcarrier spacing of 60 kHz in the system frame corresponding to the time domain resource for the RO are Case A (the offset of the control channel resource set is greater than or equal to the preset threshold): 4 and 9, or Case B (the offset of the control channel resource set is less than the preset threshold): 29 and 39. Therefore, when the configuration index is 16, and when the offset of the control channel resource set is greater than or equal to the preset threshold, it is determined that the system frame number in the configuration period is O. In this case, Case A is satisfied, and the resource for the RO is located in slots with slot sequence numbers of 4 and 9 corresponding to the subcarrier spacing of 60 kHz in the system frame. Therefore, when the configuration index is 16, and when the offset of the control channel resource set is less than the preset threshold, it is determined that the system frame number in the configuration period is 1. In this case, Case B is satisfied, and the resource for the RO is located in slots with slot sequence numbers of 29 and 39 corresponding to the subcarrier spacing of 60 kHz in the system frame.

A principle of determining the fifth indication information is described below.

Optionally, in an embodiment, the time domain information of the control channel resource set includes a time domain position of the control channel resource set in the third time unit, and the fifth indication information used to indicate the starting time domain position of the RO in the third time unit is determined based on a time domain position of the control channel resource set in the third time unit, and the starting time domain position of the RO in the third time unit is after a time domain position of a preset control channel resource set in the third time unit.

It should be understood that, the preset control channel resource set may be the last control channel resource set, the first control channel resource set, or an $i^{th}$ control channel resource set in the third time unit, where i is an integer less than or equal to z, and z indicates a quantity of control channel resource sets in the third time unit. This embodiment of this application is not limited thereto.

Alternatively, optionally, in an embodiment, the starting time domain position that is of the RO in the third time unit and that is indicated by the fifth indication information is a starting time domain position of the third time unit or a preset time domain position in the third time unit.

Further, in another embodiment, the starting time domain position of the RO indicates a position, in the third time unit, of the first fourth time unit in at least one fourth time unit that is in the third time unit and that is occupied by the RO. In other words, the fifth indication information is a sequence number corresponding to the position. It should be understood that, the fourth time unit may be an OFDM symbol.

When the starting time domain position of the RO in the third time unit is after a time domain position of the last control channel resource set in the third time unit, a value of a sequence number of the fourth time unit corresponding to the starting time domain position of the RO in the third time unit is one of the following three: one time a time domain length of the control channel resource set in the third time unit, twice the time domain length of the control channel resource set in the third time unit, and a sum of a sequence number of a starting fourth time unit in the control channel resource set in the third time unit and one time the time domain length of the control channel resource set.

For example, it is assumed that one time the time domain length of the control channel resource set is 1, and a sequence number (which may also be referred to as a symbol offset of the control channel resource set) of the starting fourth time unit in the control channel resource set in the third time unit is k.

As shown in Table 3 or Table 5, the position, in the third time unit, of the first fourth time unit in the at least one fourth time unit that is in the third time unit and that is occupied by the RO may be 1, 2l, or k+1.

In other words, a time domain length between the first fourth time unit in the at least one fourth time unit that is in the third time unit and that is occupied by the RO and the starting fourth time unit in the third time unit is 1, 2l, or k+1.

Specifically, when the second time unit is determined above, if a principle of determining the second time unit is based on the offset of the control channel resource set and the time domain position of the SSB, the selected second time unit can basically avoid a conflict with the SSB and the control channel resource set. Therefore, in this case, the starting time domain position that is of the RO in the third time unit and that is indicated by the fifth indication information may be a starting time domain position of the third time unit or a preset time domain position in the third time unit.

For example, as shown in Table 2 and Table 4, a starting symbol position that is of the RO in the third time unit and that is indicated by the fifth indication information is O. It should be understood that, the starting symbol position indicated by the fifth indication information in Table 2 and Table 4 is 0, but this embodiment of this application is not limited thereto. For example, the starting symbol position indicated by the fifth indication information in Table 2 and Table 4 may be replaced with 1, 2, 3, 4, 5, 6, 7, or the like, and preferably, may be replaced with 6 or 7. This embodiment of this application is not limited thereto.

When the second time unit is determined above, if the principle of determining the second time unit is based on the time domain position of the SSB, the selected second time unit can avoid a conflict with the SSB, but it is difficult to exclude a conflict with the control channel resource set. Therefore, the starting symbol position of the RO needs to be determined based on a symbol position of the control channel resource set. Therefore, in this case, the starting time domain position that is of the RO in the third time unit and that is indicated by the fifth indication information is after the time domain position of the last control channel resource set in the third time unit.

Specifically, in the slot in which the RO is located, a starting symbol sequence number of the RO depends on duration l of the RMSI CORESET and a symbol offset k of the RMSI CORESET in the third time unit, and the starting symbol sequence number of the RO may include {l, 2l, k+1}. The duration l of the RMSI CORESET ma be {1, 2, 3} OFDM symbols, and the starting symbol sequence number (namely, k) of the RMSI CORESET may be 7. This embodiment of this application is not limited thereto.

A principle of determining the fourth indication information is described below.

Optionally, in an embodiment, the fourth indication information used to indicate the quantity of ROs in the third time unit is determined based on the starting time domain position of the RO in the third time unit and a length of a time domain resource occupied by the preamble sequence.

Further, in an embodiment, the quantity that is of ROs in the third time unit and that is indicated by the fourth indication information is less than or equal to a ratio of a length of a time domain resource between the starting time domain position of the RO and an ending time domain position of the third time unit to the length of the time domain resource occupied by the preamble sequence. In other words, the quantity that is of ROs in the third time unit and that is indicated by the fourth indication information is less than or equal to a maximum quantity of preamble sequences that can be carried on the time domain resource between the starting time domain position of the RO and the ending time domain position of the third time unit.

The following separately describes the fourth indication information in this embodiment of this application in two cases for the foregoing two different starting time domain positions of the RO.

First Case:

When the starting time domain position of the RO is l, 2l, or k+1, in this embodiment of this application, Ns may be used to indicate the starting time domain position of the RO. In this case, as shown in Table 3 or Table 5, the quantity that is of ROs in the third time unit and that is indicated by the fourth indication information may be shown in the last column in Table 2 or Table 4.

For example, as shown in Table 3, when a configuration index is 93, the length of the time domain resource between the starting time domain position of the RO and the ending time domain position of the third time unit is 14−Ns, where 14 indicates a total quantity of symbols in a slot, and a symbol length of a preamble sequence is 2. Therefore, as shown in Table 3, a maximum value of the quantity that is of ROs in the third time unit and that is indicated by the fourth indication information is floor $[(14-Ns)/2]$, where floor[ ] indicates rounding down.

It should be understood that, when a preamble sequence format is A1, A2, or A3, there is a guard interval of one symbol. Therefore, as shown in Table 3, the length of the time domain resource between the starting time domain position of the RO and the ending time domain position of the third time unit is 13−Ns.

For example, as shown in Table 3, when a configuration index is 71, the length of the time domain resource between the starting time domain position of the RO and the ending time domain position of the third time unit is 13−Ns, and a symbol length of a preamble sequence is 2. Therefore, as shown in Table 3, a maximum value of the quantity that is of ROs in the third time unit and that is indicated by the fourth indication information is floor$[(13-Ns)/2]$.

For another example, as shown in Table 5, when a configuration index is 119, the length of the time domain resource between the starting time domain position of the RO and the ending time domain position of the third time unit is 14−Ns, where 14 indicates a total quantity of symbols in a slot, and a symbol length of a preamble sequence is 2. Therefore, as shown in Table 5, a maximum value of the quantity that is of ROs in the third time unit and that is indicated by the fourth indication information is floor$[(14-Ns)/2]$.

It should be understood that, when a preamble sequence format is A1, A2, or A3, there is a guard interval of one symbol. Therefore, as shown in Table 5, the length of the time domain resource between the starting time domain position of the RO and the ending time domain position of the third time unit is 13−Ns.

For example, as shown in Table 5, when a configuration index is 0, the length of the time domain resource between the starting time domain position of the RO and the ending time domain position of the third time unit is 13−Ns, and a symbol length of a preamble sequence is 2. Therefore, as shown in Table 5, a maximum value of the quantity that is of ROs in the third time unit and that is indicated by the fourth indication information is floor[(13·Ns)/2].

Second Case:

When the starting symbol position that is of the RO in the third time unit and that is indicated by the fifth indication information is 0 or a preset position, as shown in Table 2 or Table 4, the quantity that is of ROs in the third time unit and that is indicated by the fourth indication information may be shown in the last column in Table 2 or Table 4.

As shown in Table 2, when a configuration index is 93, the length of the time domain resource between the starting time domain position of the RO and the ending time domain position of the third time unit is 14 (14−0), where 14 indicates a total quantity of symbols in a slot, and a symbol length of a preamble sequence is 2. Therefore, as shown in Table 2, a maximum value of the quantity that is of ROs in the third time unit and that is indicated by the fourth indication information is 7 (namely, 14/2).

It should be understood that, when a preamble sequence format is A1, A2, or A3, there is a guard interval of one symbol. Therefore, as shown in Table 3, the length of the time domain resource between the starting time domain position of the RO and the ending time domain position of the third time unit may be 13.

For example, as shown in Table 2, when a configuration index is 71, the length of the time domain resource between the starting time domain position of the RO and the ending time domain position of the third time unit is 13, and a symbol length of a preamble sequence is 2. Therefore, as shown in Table 2, a maximum value of the quantity that is of ROs in the third time unit and that is indicated by the fourth indication information is 6 (namely, floor[(13−0)/2]).

For another example, as shown in Table 4, when a configuration index is 119, the length of the time domain resource between the starting time domain position of the RO and the ending time domain position of the third time unit is 14, where 14 indicates a total quantity of symbols in a slot, and a symbol length of a preamble sequence is 2. Therefore, as shown in Table 4, a maximum value of the quantity that is of ROs in the third time unit and that is indicated by the fourth indication information is 7.

It should be understood that, when a preamble sequence format is A1, A2, or A3, there is a guard interval of one symbol. Therefore, as shown in Table 4, the length of the time domain resource between the starting time domain position of the RO and the ending time domain position of the third time unit is 13.

For example, as shown in Table 4, when a configuration index is 0, the length of the time domain resource between the starting time domain position of the RO and the ending time domain position of the third time unit is 13, and a symbol length of a preamble sequence is 2. Therefore, as shown in Table 4, a maximum value of the quantity that is of ROs in the third time unit and that is indicated by the fourth indication information is 6.

It should be understood that, in this embodiment of this application, Table 2 and Table 3 correspond to each other and are both short preamble sequence PRACH configuration tables below 6 GHz in TDD. A difference between Table 2 and Table 3 lies in that the fifth indication information in Table 2 is one of {1, 2l, k+l}, and the fifth indication information in Table 3 is 0. Correspondingly, forms of the fourth indication information in Table 2 and Table 3 are also different.

It should be understood that, in this embodiment of this application, Table 4 and Table 5 correspond to each other and are both short preamble sequence PRACH configuration tables above 6 GHz in TDD. A difference between Table 4 and Table 5 lies in that the fifth indication information in Table 4 is one of {1, 2l, k+l}, and the fifth indication information in Table 5 is 0. Correspondingly, forms of the fourth indication information in Table 4 and Table 5 are also different.

Optionally, in an embodiment, the method shown in FIG. 3 may further include: sending, by the terminal device, a preamble sequence on the time domain resource for the at least one RO that is configured by using the first configuration information.

Specifically, after the terminal device obtains the index indication information, the terminal device may determine, in the prestored one-to-one correspondence between a plurality of configuration indexes and a plurality of sets of configuration information based on the first configuration index, the first configuration information corresponding to the first configuration index, and then the terminal device may determine the time domain resource for the at least one RO based on the first configuration information. Then the terminal device may send the preamble sequence on the time domain resource for the at least one RO.

Specifically, the terminal device may send a preamble sequence on a time domain resource for some or all ROs in the time domain resource for the at least one RO. This embodiment of this application is not limited thereto.

Therefore, in this embodiment of this application, the time domain resource for the RO is determined based on the time domain resource for the common signal block and/or the time domain information of the control channel resource set, thereby reducing a probability that the resource for the RO collides with a downlink resource (for example, an SSB and/or an RMSI CORESET), increasing a quantity of valid ROs in a PRACH configuration period, and improving random access efficiency of the terminal device.

Alternatively, in another embodiment, when time domain resources for one or more ROs in the time domain resource for the at least one RO conflict with a time domain resource for the common signal block or a time domain resource for the control channel resource set, the method further includes: skipping, by the terminal device, sending a preamble sequence on the time domain resources for the one or more ROs that conflict with the time domain resource for the common signal block or the time domain resource for the control channel resource set.

It should be understood that, a "conflict" in this embodiment of this application may indicate that, in a TDD system, an uplink resource for the RO that is determined by the terminal device overlaps the time domain resource for the common signal block or a time domain position of a downlink resource for the control channel resource set.

Specifically, the time domain resource configured for the RO above in this specification can avoid a conflict with the SSB or the control channel resource set as much as possible, but there is still a possibility of a conflict. In this embodiment of this application, once the terminal device determines that the time domain resources for the one or more ROs in the time domain resource for the at least one RO conflict with the time domain resource for the common signal block or the time domain resource for the control channel resource set, the terminal device may not send a preamble sequence on a conflicting time domain resource for the RO.

Therefore, in this embodiment of this application, when a resource conflict exists, a preamble sequence is not sent on a conflicting resource, thereby avoiding unnecessary and useless work, and avoiding a random access failure.

Alternatively, in another embodiment, when time domain resources for one or more ROs in the time domain resource for the at least one RO are located on a non-uplink resource in a semi-static uplink/downlink configuration, the method further includes: sending, by the terminal device, a preamble sequence on the time domain resource for the at least one RO that is configured by using the first configuration information.

Specifically, the terminal device determines that the time domain resources for the one or more ROs in the time domain resource for the at least one RO do not match the semi-static uplink/downlink configuration. In this case, the terminal device may still send the preamble sequence on the time domain resources for the one or more ROs.

Therefore, in this embodiment of this application, the preamble sequence is still sent when a selected time domain resource for one group of ROs does not match the semi-static uplink/downlink configuration, thereby improving a success rate of random access.

Alternatively, in another embodiment, the starting time domain position that is of the RO in the third time unit and that is indicated by the fifth indication information is a non-uplink resource in the semi-static uplink/downlink configuration of the third time unit, and the method shown in FIG. 3 may further include: updating, by the terminal device, the time domain position of the RO based on the semi-static uplink/downlink configuration of the third time unit, and sending, by the terminal device, a preamble sequence based on an updated time domain position of the RO.

Further, in another embodiment, the updating, by the terminal device, the time domain position of the RO based on the semi-static uplink/downlink configuration of the third time unit includes: updating, by the terminal device, a starting position of an uplink symbol in the semi-static uplink/downlink configuration of the third time unit to the starting time domain position of the RO in the third time unit, and updating, by the terminal device to the quantity of ROs in the third time unit, a smaller one of a quantity of ROs that can be carried on the uplink symbol in the semi-static uplink/downlink configuration of the third time unit and the quantity that is of ROs in the third time unit and that is indicated by the fourth indication information.

Figure 6:
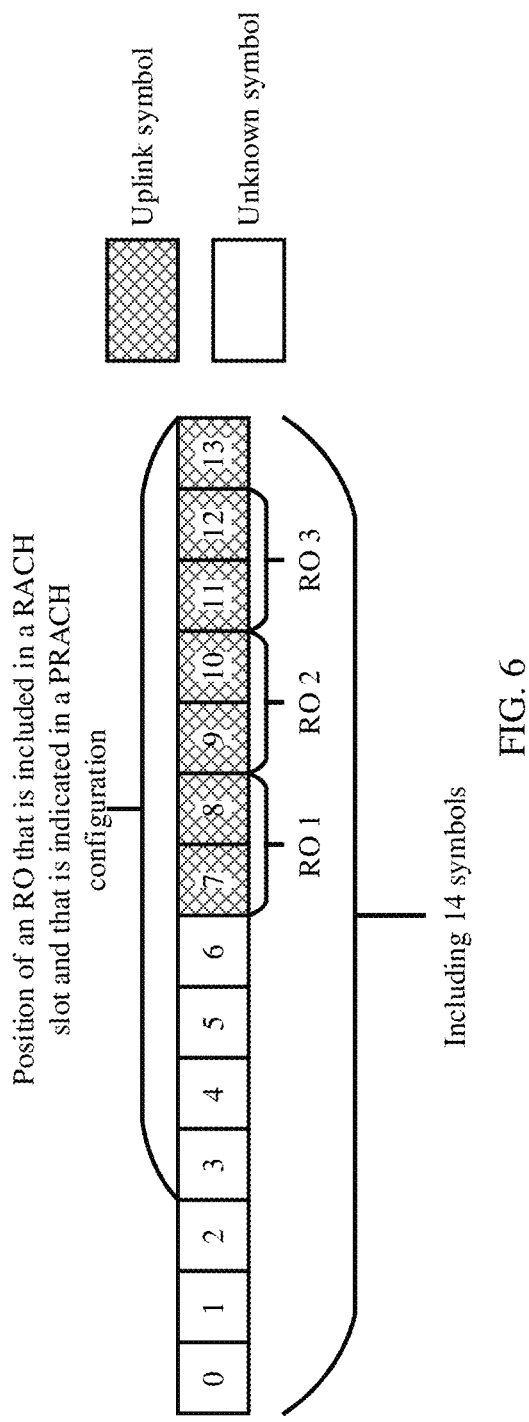
FIG. 6 is a schematic diagram of a resource configuration in a slot according to an embodiment of this application.

Specifically, in this embodiment of this application, UE sends a random access preamble only on a PRACH occasion (RO) in an uplink part in the semi-static uplink/downlink configuration. The uplink part in the uplink/downlink configuration includes semi-static uplink-only slots and a special slot that includes an uplink symbol. When a random access occasion (RO) indicated in a PRACH configuration is located in the special slot, and a difference between a total quantity $N_{symbol}^{slot}=14$, of symbols in one slot and a length y2 of the uplink symbol in the special slot is greater than a starting symbol sequence number of the RO indicated in the PRACH configuration, a starting symbol sequence number of a random access preamble sent by the UE in the special slot is a difference $N_{symbol}^{slot}-y2$ between a total quantity of symbols in one slot and the length of the uplink symbol in the special slot. Correspondingly, a maximum quantity of ROs that can be supported in the special slot is $\min\{\lfloor y2/L \rfloor, N_{RO}\}$, where L is duration of the random access preamble, and $N_{RO}$ is a quantity of ROs that are included in a RACH slot and that are indicated in the PRACH configuration. If a random access preamble format B1 is used, the duration L of the random access preamble=2 OFDM symbols, the length y2 of the uplink symbol in the special slot=7, and the quantity of ROs that are included in the RACH slot and that are indicated in the PRACH configuration is $N_{RO}=7$. As shown in FIG. 6, the starting symbol sequence number $N_{symbol}^{slot}-y2$ of the random access preamble sent by the UE in the special slot=7, and the maximum quantity $\min\{\lfloor y2/L \rfloor, N_{RO}\}$ of ROs that can be supported in the special slot=3.

The communication method in the foregoing embodiment of this application is described in FIG. 3. Another communication method 700 in an embodiment of this application is described below with reference to FIG. 7.

Figure 7:
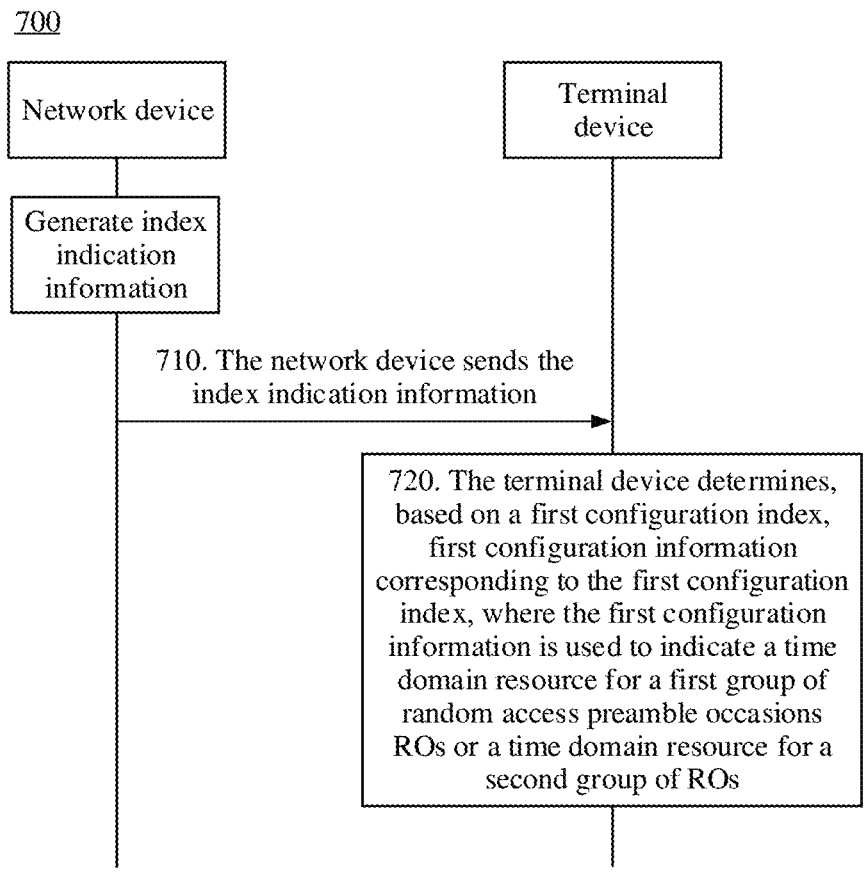
FIG. 7 is a schematic flowchart of a communication method according to another embodiment of this application.

The method 700 shown in FIG. 7 includes the following steps.

710. A network device sends index indication information, where the index indication information is used to indicate a first configuration index.

Correspondingly, a terminal device receives the index indication information.

Specifically, 710 corresponds to 310. To avoid repetition, details are not described herein again.

720. The terminal device determines, based on the first configuration index, first configuration information corresponding to the first configuration index, where the first configuration information is used to indicate a time domain resource for a first group of random access preamble occasions (ROs) or a time domain resource for a second group of ROs, the time domain resource for the first group of ROs and the time domain resource for the second group of ROs are located in a first time unit in a random access configuration period, and the time domain resource for the first group of ROs or the time domain resource for the second group of ROs is determined based on a time domain offset of the control channel resource set and/or an index of the first time unit.

For example, the terminal device may determine the time domain resources for the two groups of ROs based on the first configuration index.

Specifically, the terminal device may determine, based on a one-to-one correspondence between a plurality of configuration indexes and a plurality of sets of configuration information, the first configuration information corresponding to the first configuration index, where the first configuration index is one of the plurality of configuration indexes, and after determining the first configuration information, the terminal device may determine the time domain resources for the two groups of ROs based on the configuration information.

It should be understood that, in this embodiment of this application, both the terminal device and the network device learn of the one-to-one correspondence between a plurality of configuration indexes and a plurality of sets of configuration information in advance. In other words, both the terminal device and the network device prestore the one-to-one correspondence between a plurality of configuration indexes and a plurality of sets of configuration information.

It should be understood that, in this embodiment of this application, the one-to-one correspondence between a plurality of configuration indexes and a plurality of sets of configuration information may be a PRACH configuration table.

For example, the PRACH configuration table may be a short preamble sequence configuration table above 6 GHz in TDD, for example, Table 4 or Table 5 above.

It should be understood that, step 720 corresponds to step 320, and a difference between 720 and 320 lies in that the configuration information in 320 may indicate only a time domain resource for one group of ROs (for example, corresponding to Table 2 or Table 3 above), while, in 720, time domain resources for two groups of ROs may be indicated (for example, corresponding to Table 4 or Table 5 above). For a specific process of step 720, refer to the foregoing descriptions. To avoid repetition, detailed descriptions are appropriately omitted herein.

Optionally, in an embodiment, the first configuration information includes at least one of the following information: first indication information used to indicate the first time unit in the random access configuration period, second indication information used to indicate at least one second time unit in the first time unit, where the at least one second time unit includes a first group of second time units and a second group of second time units, the time domain resource for the first group of ROs belongs to the first group of second time units, and the time domain resource for the second group of ROs belongs to the second group of second time units, third indication information used to indicate a quantity of third time units included in each second time unit in the first group of second time units and the second group of second time units, fourth indication information used to indicate a quantity of ROs in the third time unit, and fifth indication information used to indicate a starting time domain position of an RO in the third time unit.

Optionally, in an embodiment, the random access configuration period is greater than a preset duration threshold, and the time domain offset of the control channel resource set indicates duration between a starting time domain position of a control channel resource set associated with the first common signal block in the common signal block detection window and a starting position of a system frame in which the control channel resource set is located, and the first indication information used to indicate the first time unit is determined based on the time domain offset of the control channel resource set.

Optionally, in an embodiment, when the time domain offset of the control channel resource set is greater than or equal to a preset offset threshold, a sequence number corresponding to a position of the first time unit indicated by the first indication information in the random access configuration period is an even number, or when the time domain offset of the control channel resource set is less than a preset offset threshold, a sequence number corresponding to a position of the first time unit indicated by the first indication information in the random access configuration period is an odd number.

Optionally, in an embodiment, the second indication information used to indicate the at least one second time unit is determined based on a time domain position of the common signal block.

Optionally, in an embodiment, the at least one second time unit indicated by the second indication information is located at a time domain position other than an optional time domain position of the common signal block in the first time unit.

Optionally, in an embodiment, the second indication information used to indicate the at least one second time unit is determined based on an optional time domain position of the common signal block and/or the index of the first time unit.

Optionally, in an embodiment, the first group of second time units is located at a time domain position other than an optional time domain position of the common signal block in the first half time domain part of the first time unit, the second group of second time units is located at a time domain position other than an optional time domain position of the common signal block in the second half time domain part of the first time unit, and the determining, by the terminal device, a time domain resource for one group of ROs includes: determining, by the terminal device, the time domain resource for the group of ROs based on the index of the first time unit, where when the index of the first time unit is an even number, the time domain resource for the group of ROs that is determined by the terminal device is the time domain resource for the first group of ROs, or when the index of the first time unit is an odd number, the time domain resource for the group of ROs that is determined by the terminal device is the time domain resource for the second group of ROs.

Optionally, in an embodiment, the preset offset threshold is one of 2, 2.5, 5, 7, and 7.5.

Optionally, in an embodiment, the fifth indication information used to indicate the starting time domain position of the RO in the third time unit is determined based on a time domain position of the control channel resource set in the third time unit, and the starting time domain position of the RO in the third time unit is after a time domain position of a preset control channel resource set in the third time unit, or the starting time domain position that is of the RO in the third time unit and that is indicated by the fifth indication information is a starting time domain position of the third time unit or a preset time domain position in the third time unit.

Optionally, in an embodiment, the starting time domain position of the RO indicates a position, in the third time unit, of the first fourth time unit in at least one fourth time unit that is in the third time unit and that is occupied by the RO, and when the starting time domain position of the RO in the third time unit is after a time domain position of the last control channel resource set in the third time unit, a value of a sequence number of the fourth time unit corresponding to the starting time domain position of the RO in the third time unit is one of the following three: one time a time domain length of the control channel resource set in the third time unit, twice the time domain length of the control channel resource set in the third time unit, and a sum of a sequence number of a starting fourth time unit in the control channel resource set in the third time unit and one time the time domain length of the control channel resource set.

Optionally, in an embodiment, the fourth indication information used to indicate the quantity of ROs in the third time unit is determined based on the starting time domain position of the RO in the third time unit and a length of a time domain resource occupied by the preamble sequence.

Optionally, in an embodiment, the quantity that is of ROs in the third time unit and that is indicated by the fourth indication information is less than or equal to a ratio of a length of a time domain resource between the starting time domain position of the RO and an ending time domain position of the third time unit to the length of the time domain resource occupied by the preamble sequence.

730. The terminal device determines a time domain resource for one group of ROs, where the time domain resource for the group of ROs is the time domain resource for the first group of ROs or the time domain resource for the second group of ROs.

Specifically, the network device may first determine a time domain resource for the common signal block and/or time domain information of the control channel resource set, and then the network device may determine the time domain resource for the RO (that is, determine configuration information corresponding to the time domain resource for the RO) based on the time domain resource for the common signal block and/or the time domain information of the control channel resource set. Subsequently, the network device may determine, based on a prestored one-to-one correspondence between a plurality of configuration indexes and a plurality of sets of configuration information, a configuration index corresponding to the time domain resource for the RO. Finally, the network device configures the first configuration index for the terminal device by using the index indication information. Further, the terminal device may determine, in the prestored one-to-one correspondence between a plurality of configuration indexes and a plurality of sets of configuration information based on the first configuration index, the first configuration information corresponding to the first configuration index, and then the terminal device may determine the time domain resources for the two groups of ROs based on the first configuration information, and select a time domain resource for one group of ROs from the time domain resources for the two groups of ROs.

Therefore, in this embodiment of this application, the time domain resource for the RO is determined based on the time domain offset of the control channel resource set and/or the index of the first time unit, thereby reducing a probability that the resource for the RO collides with a downlink resource (for example, an SSB and/or an RMSI CORESET), increasing a quantity of valid ROs in a PRACH configuration period, and improving random access efficiency of the terminal device.

It should be understood that, the resource for the group of ROs that is determined in step 730 may correspond to the time domain resource for the at least one RO in step 320. An action of determining the resource for the group of ROs in FIG. 7 is similar to an action of determining the time domain resource for the at least one RO in FIG. 3. To avoid repetition, detailed descriptions are appropriately omitted herein.

Optionally, in an embodiment, the method shown in FIG. 7 may further include: sending, by the terminal device, a preamble sequence on the determined time domain resource for the group of ROs.

Optionally, in an embodiment, when time domain resources for one or more ROs in the time domain resource for the group of ROs that is determined by the terminal device conflict with a time domain resource for the common signal block or a time domain resource for the control channel resource set, the method further includes: skipping, by the terminal device, sending a preamble sequence on the time domain resources for the one or more ROs that conflict with the time domain resource for the common signal block or the time domain resource for the control channel resource set.

Optionally, in an embodiment, when time domain resources for one or more ROs in the time domain resource for the group of ROs that is determined by the terminal device are located on a non-uplink resource in a semi-static uplink/downlink configuration, the method further includes: sending, by the terminal device, a preamble sequence on the determined time domain resource for the group of ROs.

It should be understood that, in this embodiment of this application, after the resource for the RO is determined, a processing manner used if there is a conflict between the resource for the RO and the time domain resource for the common signal block or the time domain resource for the control channel resource set, or a processing manner used when the resource for the RO does not match the semi-static uplink/downlink configuration may alternatively be an independent solution. To be specific, this processing manner may not be used in the configuration method for determining the resource for the RO in FIG. 3 or FIG. 7. This embodiment of this application is not limited thereto.

Figure 8:
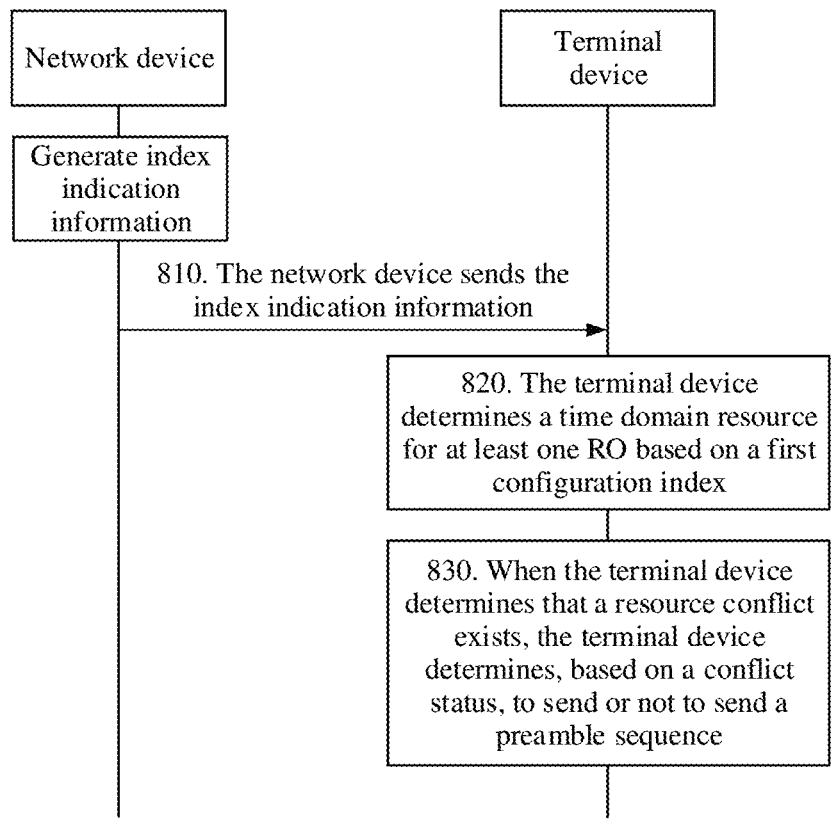
FIG. 8 is a schematic flowchart of a communication method according to another embodiment of this application.

Specifically, in another embodiment, a method 800 shown in FIG. 8 includes the following steps.

810. A network device sends index indication information, where the index indication information is used to indicate a first configuration index.

820. A terminal device determines a time domain resource for at least one RO based on the first configuration index.

Specifically, in step 820, the time domain resource for the RO may be determined by using the foregoing method shown in FIG. 3 or FIG. 7, or in another manner, for example, a configuration in an existing standard is used to determine the time domain resource for the RO. This embodiment of this application is not limited thereto.

830. When the terminal device determines that a resource conflict exists, the terminal device determines, based on a conflict status, to send or not send a preamble sequence.

It should be understood that, a "conflict" in this embodiment of this application may indicate that, in a TDD system, an uplink resource for the RO that is determined by the terminal device overlaps a time domain resource for a common signal block or a time domain position of a downlink resource for a control channel resource set, or indicates that time domain resources for one or more ROs in the time domain resource for the at least one RO does not match a semi-static uplink/downlink configuration.

Specifically, for description in 830, refer to the foregoing conflict processing manner in FIG. 3 or FIG. 7. To avoid repetition, details are not described herein again.

Therefore, in this embodiment of this application, when a resource conflict exists, a preamble sequence is not sent on a conflicting resource, thereby avoiding unnecessary and useless work, and avoiding a random access failure. In addition, in this embodiment of this application, the preamble sequence is still sent when a selected time domain resource for one group of ROs does not match the semi-static uplink/downlink configuration, thereby improving a success rate of random access.

It should be understood that, the examples in FIG. 1 to FIG. 8 above are merely intended to help a person skilled in the art understand the embodiments of the present disclosure, but are not intended to limit the embodiments of the present disclosure to a specific value or a specific scenario in the examples. A person skilled in the art apparently can make various equivalent modifications or changes according to the examples shown in FIG. 1 to FIG. 8, and such modifications or changes also fall within the scope of the embodiments of the present disclosure.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the communication method in the embodiments of the present disclosure with reference to FIG. 1 to FIG. 8. The following describes communications devices in embodiments of this application with reference to FIG. 9 to FIG. 12. Specifically, a terminal device in an embodiment of this application is described with reference to FIG. 9 and FIG. 11, and a network device in an embodiment of the present disclosure is described with reference to FIG. 10 to FIG. 12.

Figure 9:
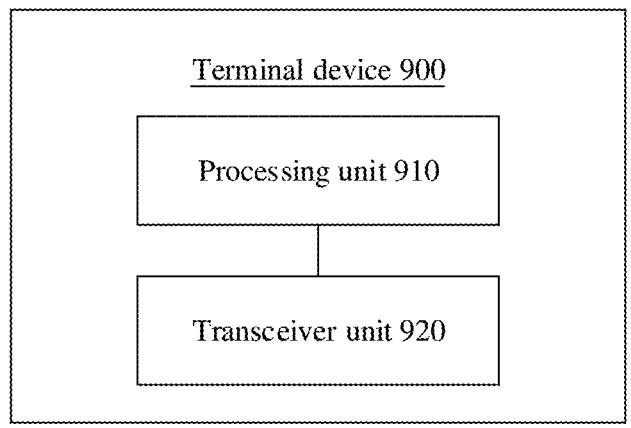
FIG. 9 is a schematic block diagram of a terminal device according to an embodiment of this application.

FIG. 9 is a schematic block diagram of a terminal device 900 according to an embodiment of this application. Specifically, the terminal device shown in FIG. 9 may be applied to the system shown in FIG. 1, and perform functions of the terminal device in the foregoing method embodiments.

The terminal device 900 shown in FIG. 9 includes a processing unit 910 and a transceiver unit 920.

In an implementation, the transceiver unit is configured to receive index indication information, where the index indication information is used to indicate a first configuration index, and the processing unit is configured to determine, based on the first configuration index, first configuration information corresponding to the first configuration index, where the first configuration information is used to indicate a time domain resource for at least one random access preamble occasion (RO), and the first configuration information is determined based on a time domain resource for a common signal block and/or time domain information of a control channel resource set.

Therefore, in this embodiment of this application, the time domain resource for the RO is determined based on the time domain resource for the common signal block and/or the time domain information of the control channel resource set, thereby reducing a probability that the resource for the RO collides with a downlink resource (for example, an SSB and/or an RMSI CORESET), increasing a quantity of valid ROs in a PRACH configuration period, and improving random access efficiency of the terminal device.

Optionally, in another embodiment, the first configuration information includes at least one of the following information: first indication information used to indicate a first time unit in a random access configuration period, second indication information used to indicate at least one second time unit in the first time unit, third indication information used to indicate a quantity of third time units included in each of the at least one second time unit, fourth indication information used to indicate a quantity of ROs in the third time unit, and fifth indication information used to indicate a starting time domain position of an RO in the third time unit.

Optionally, in another embodiment, the random access configuration period is greater than a preset duration threshold, the time domain information of the control channel resource set includes a time domain offset of the control channel resource set, and the time domain offset of the control channel resource set indicates duration between a starting time domain position of a control channel resource set associated with the first common signal block in the common signal block detection window and a starting position of a system frame in which the control channel resource set is located, and the first indication information used to indicate the first time unit is determined based on the time domain offset of the control channel resource set.

Optionally, in another embodiment, when the time domain offset of the control channel resource set is greater than or equal to a preset offset threshold, a sequence number corresponding to a position of the first time unit indicated by the first indication information in the random access configuration period is an even number, or when the time domain offset of the control channel resource set is less than a preset offset threshold, a sequence number corresponding to a position of the first time unit indicated by the first indication information in the random access configuration period is an odd number.

Optionally, in another embodiment, the second indication information used to indicate the at least one second time unit is determined based on a time domain position of the common signal block.

Optionally, in another embodiment, the at least one second time unit indicated by the second indication information is located at a time domain position other than an optional time domain position of the common signal block in the first time unit.

Optionally, in another embodiment, the second indication information used to indicate the at least one second time unit is determined based on an optional time domain position of the common signal block and/or an index of the first time unit.

Optionally, in another embodiment, the at least one second time unit includes a first group of second time units and a second group of second time units, the first group of second time units is located at a time domain position other than an optional time domain position of the common signal block in the first half time domain part of the first time unit, the second group of second time units is located at a time domain position other than an optional time domain position of the common signal block in the second half time domain part of the first time unit, and when the index of the first time unit is an even number, the time domain resource for the at least one random access preamble occasion (RO) belongs to the first group of second time units indicated by the second indication information, or when the index of the first time unit is an odd number, the time domain resource for the at least one random access preamble occasion (RO) belongs to the second group of second time units indicated by the second indication information.

Optionally, in another embodiment, the preset offset threshold is one of 2, 2.5, 5, 7, and 7.5.

Optionally, in another embodiment, the time domain information of the control channel resource set includes a time domain position of the control channel resource set in the third time unit, and the fifth indication information used to indicate the starting time domain position of the RO in the third time unit is determined based on a time domain position of the control channel resource set in the third time unit, and the starting time domain position of the RO in the third time unit is after a time domain position of a preset control channel resource set in the third time unit, or the starting time domain position that is of the RO in the third time unit and that is indicated by the fifth indication information is a starting time domain position of the third time unit or a preset time domain position in the third time unit.

Optionally, in another embodiment, the starting time domain position of the RO indicates a position, in the third time unit, of the first fourth time unit in at least one fourth time unit that is in the third time unit and that is occupied by the RO, and when the starting time domain position of the RO in the third time unit is after a time domain position of the last control channel resource set in the third time unit, a value of a sequence number of the fourth time unit corresponding to the starting time domain position of the RO in the third time unit is one of the following three: one time a time domain length of the control channel resource set in the third time unit, twice the time domain length of the control channel resource set in the third time unit, and a sum of a sequence number of a starting fourth time unit in the control channel resource set in the third time unit and one time the time domain length of the control channel resource set.

Optionally, in another embodiment, the fourth indication information used to indicate the quantity of ROs in the third time unit is determined based on the starting time domain position of the RO in the third time unit and a length of a time domain resource occupied by the preamble sequence.

Optionally, in another embodiment, the quantity that is of ROs in the third time unit and that is indicated by the fourth indication information is less than or equal to a ratio of a length of a time domain resource between the starting time domain position of the RO and an ending time domain position of the third time unit to the length of the time domain resource occupied by the preamble sequence.

Optionally, in another embodiment, the first time unit is a system frame, the second time unit is a subframe or is of 0.25 ms, and the third time unit is a slot.

Optionally, in another embodiment, the transceiver unit is further configured to send a preamble sequence on the time domain resource for the at least one RO that is configured by using the first configuration information.

Optionally, in another embodiment, when time domain resources for one or more ROs in the time domain resource for the at least one RO conflict with a time domain resource for the common signal block or a time domain resource for the control channel resource set, the transceiver unit is further configured to skip sending a preamble sequence on the time domain resources for the one or more ROs that conflict with the time domain resource for the common signal block or the time domain resource for the control channel resource set.

Optionally, in another embodiment, when time domain resources for one or more ROs in the time domain resource for the at least one RO are located on a non-uplink resource in a semi-static uplink/downlink configuration, the transceiver unit is further configured to send a preamble sequence on the time domain resource for the at least one RO that is configured by using the first configuration information.

Alternatively, in another implementation, the transceiver unit is configured to receive index indication information, where the index indication information is used to indicate a first configuration index, and the processing unit is configured to: determine, based on the first configuration index, first configuration information corresponding to the first configuration index, where the first configuration information is used to indicate a time domain resource for a first group of random access preamble occasions (ROs) or a time domain resource for a second group of ROs, the time domain resource for the first group of ROs and the time domain resource for the second group of ROs are located in a first time unit in a random access configuration period, and the time domain resource for the first group of ROs or the time domain resource for the second group of ROs is determined based on a time domain offset of the control channel resource set and/or an index of the first time unit, and determine a time domain resource for one group of ROs, where the time domain resource for the group of ROs is the time domain resource for the first group of ROs or the time domain resource for the second group of ROs.

Therefore, in this embodiment of this application, the time domain resource for the RO is determined based on the time domain offset of the control channel resource set and/or the index of the first time unit, thereby reducing a probability that the resource for the RO collides with a downlink resource (for example, an SSB and/or an RMSI CORESET), increasing a quantity of valid ROs in a PRACH configuration period, and improving random access efficiency of the terminal device.

Optionally, in another embodiment, the first configuration information includes at least one of the following information: first indication information used to indicate the first time unit in the random access configuration period, second indication information used to indicate at least one second time unit in the first time unit, where the at least one second time unit includes a first group of second time units and a second group of second time units, the time domain resource for the first group of ROs belongs to the first group of second time units, and the time domain resource for the second group of ROs belongs to the second group of second time units, third indication information used to indicate a quantity of third time units included in each second time unit in the first group of second time units and the second group of second time units, fourth indication information used to indicate a quantity of ROs in the third time unit, and fifth indication information used to indicate a starting time domain position of an RO in the third time unit.

Optionally, in another embodiment, the random access configuration period is greater than a preset duration threshold, and the time domain offset of the control channel resource set indicates duration between a starting time domain position of a control channel resource set associated with the first common signal block in the common signal block detection window and a starting position of a system frame in which the control channel resource set is located, and the first indication information used to indicate the first time unit is determined based on the time domain offset of the control channel resource set.

Optionally, in another embodiment, when the time domain offset of the control channel resource set is greater than or equal to a preset offset threshold, a sequence number corresponding to a position of the first time unit indicated by the first indication information in the random access configuration period is an even number, or when the time domain offset of the control channel resource set is less than a preset offset threshold, a sequence number corresponding to a position of the first time unit indicated by the first indication information in the random access configuration period is an odd number.

Optionally, in another embodiment, the second indication information used to indicate the at least one second time unit is determined based on a time domain position of the common signal block.

Optionally, in another embodiment, the at least one second time unit indicated by the second indication information is located at a time domain position other than an optional time domain position of the common signal block in the first time unit.

Optionally, in another embodiment, the second indication information used to indicate the at least one second time unit is determined based on an optional time domain position of the common signal block and/or the index of the first time unit.

Optionally, in another embodiment, the first group of second time units is located at a time domain position other than an optional time domain position of the common signal block in the first half time domain part of the first time unit, the second group of second time units is located at a time domain position other than an optional time domain position of the common signal block in the second half time domain part of the first time unit, and the processing unit is specifically configured to determine the time domain resource for the group of ROs based on the index of the first time unit, where when the index of the first time unit is an even number, the time domain resource for the group of ROs that is determined by the processing unit is the time domain resource for the first group of ROs, or when the index of the first time unit is an odd number, the time domain resource for the group of ROs that is determined by the processing unit is the time domain resource for the second group of ROs.

Optionally, in another embodiment, the preset offset threshold is one of 2, 2.5, 5, 7, and 7.5.

Optionally, in another embodiment, the fifth indication information used to indicate the starting time domain position of the RO in the third time unit is determined based on a time domain position of the control channel resource set in the third time unit, and the starting time domain position of the RO in the third time unit is after a time domain position of a preset control channel resource set in the third time unit, or the starting time domain position that is of the RO in the third time unit and that is indicated by the fifth indication information is a starting time domain position of the third time unit or a preset time domain position in the third time unit.

Optionally, in another embodiment, the starting time domain position of the RO indicates a position, in the third time unit, of the first fourth time unit in at least one fourth time unit that is in the third time unit and that is occupied by the RO, and when the starting time domain position of the RO in the third time unit is after a time domain position of the last control channel resource set in the third time unit, a value of a sequence number of the fourth time unit corresponding to the starting time domain position of the RO in the third time unit is one of the following three: one time a time domain length of the control channel resource set in the third time unit, twice the time domain length of the control channel resource set in the third time unit, and a sum of a sequence number of a starting fourth time unit in the control channel resource set in the third time unit and one time the time domain length of the control channel resource set.

Optionally, in another embodiment, the fourth indication information used to indicate the quantity of ROs in the third time unit is determined based on the starting time domain position of the RO in the third time unit and a length of a time domain resource occupied by the preamble sequence.

Optionally, in another embodiment, the quantity that is of ROs in the third time unit and that is indicated by the fourth indication information is less than or equal to a ratio of a length of a time domain resource between the starting time domain position of the RO and an ending time domain position of the third time unit to the length of the time domain resource occupied by the preamble sequence.

Optionally, in another embodiment, the first time unit is a system frame, the second time unit is a subframe or is of 0.25 ms, and the third time unit is a slot.

Optionally, in another embodiment, the transceiver unit is further configured to send a preamble sequence on the determined time domain resource for the group of ROs.

Optionally, in another embodiment, when time domain resources for one or more ROs in the time domain resource for the group of ROs conflict with a time domain resource for the common signal block or a time domain resource for the control channel resource set, the transceiver unit is further configured to skip sending a preamble sequence on the time domain resources for the one or more ROs that conflict with the time domain resource for the common signal block or the time domain resource for the control channel resource set.

Optionally, in another embodiment, when time domain resources for one or more ROs in the time domain resource for the group of ROs are located on a non-uplink resource in a semi-static uplink/downlink configuration, the transceiver unit is further configured to send a preamble sequence on the determined time domain resource for the group of ROs.

Alternatively, in another implementation, the transceiver unit is configured to receive index indication information, where the index indication information is used to indicate a first configuration index, the processing unit is configured to determine, based on the first configuration index, a time domain resource for at least one random access preamble occasion (RO) corresponding to the first configuration index, and when it is determined that time domain resources for one or more ROs in the time domain resource for the at least one RO conflict with a time domain resource for a common signal block or a time domain resource for a control channel resource set, the transceiver unit is further configured to skip sending a preamble sequence on the time domain resources for the one or more ROs that conflict with the time domain resource for the common signal block or the time domain resource for the control channel resource set, or when it is determined that time domain resources for one or more ROs in the time domain resource for the at least one RO are located on a non-uplink resource in a semi-static uplink/downlink configuration, the transceiver unit is further configured to send a preamble sequence on the time domain resource for the at least one RO.

Therefore, in this embodiment of this application, when a resource conflict exists, a preamble sequence is not sent on a conflicting resource, thereby avoiding unnecessary and useless work, and avoiding a random access failure. In addition, in this embodiment of this application, the preamble sequence is still sent when a selected time domain resource for one group of ROs does not match the semi-static uplink/downlink configuration, thereby improving a success rate of random access.

It should be understood that, the terminal device 900 shown in FIG. 9 can implement various processes of the terminal device in the method embodiments in FIG. 1 to FIG. 8. Operations and/or functions of the modules in the terminal device 900 are respectively for implementing corresponding procedures in the foregoing method embodiments. For details, refer to the descriptions in the foregoing method embodiments. To avoid repetition, detailed descriptions are appropriately omitted herein.

Figure 10:
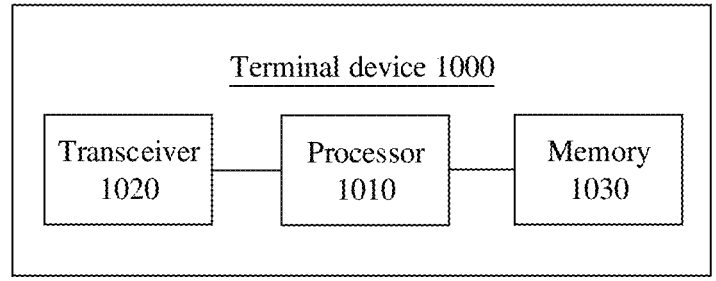
FIG. 10 is a schematic block diagram of a network device according to an embodiment of this application.

FIG. 10 is a schematic block diagram of a network device 1000 according to an embodiment of this application. Specifically, the network device shown in FIG. 10 may be applied to the system shown in FIG. 1, and perform functions of the network device in the foregoing method embodiments.

The network device 1000 shown in FIG. 10 includes a processing unit 1010 and a transceiver unit 1020.

In an implementation, the processing unit is configured to generate index indication information, where the index indication information is used to indicate a first configuration index, and the transceiver unit is configured to send the index indication information to a terminal device, where the index indication information is used by the terminal device to determine, based on the first configuration index, first configuration information corresponding to the first configuration index, the first configuration information is used to indicate a time domain resource for at least one random access preamble occasion (RO), and the first configuration information is determined based on a time domain resource for a common signal block and/or time domain information of a control channel resource set.

Therefore, in this embodiment of this application, the time domain resource for the RO is determined based on the time domain resource for the common signal block and/or the time domain information of the control channel resource set, thereby reducing a probability that the resource for the RO collides with a downlink resource (for example, an SSB and/or an RMSI CORESET), increasing a quantity of valid ROs in a PRACH configuration period, and improving random access efficiency of the terminal device.

Optionally, in another embodiment, the first configuration information includes at least one of the following information: first indication information used to indicate a first time unit in a random access configuration period, second indication information used to indicate at least one second time unit in the first time unit, third indication information used to indicate a quantity of third time units included in each of the at least one second time unit, fourth indication information used to indicate a quantity of ROs in the third time unit, and fifth indication information used to indicate a starting time domain position of an RO in the third time unit.

Optionally, in another embodiment, the random access configuration period is greater than a preset duration threshold, the time domain information of the control channel resource set includes a time domain offset of the control channel resource set, and the time domain offset of the control channel resource set indicates duration between a starting time domain position of a control channel resource set associated with the first common signal block in the common signal block detection window and a starting position of a system frame in which the control channel resource set is located, and the first indication information used to indicate the first time unit is determined based on the time domain offset of the control channel resource set.

Optionally, in another embodiment, when the time domain offset of the control channel resource set is greater than or equal to a preset offset threshold, a sequence number corresponding to a position of the first time unit indicated by the first indication information in the random access configuration period is an even number, or when the time domain offset of the control channel resource set is less than a preset offset threshold, a sequence number corresponding to a position of the first time unit indicated by the first indication information in the random access configuration period is an odd number.

Optionally, in another embodiment, the second indication information used to indicate the at least one second time unit is determined based on a time domain position of the common signal block.

Optionally, in another embodiment, the at least one second time unit indicated by the second indication information is located at a time domain position other than an optional time domain position of the common signal block in the first time unit.

Optionally, in another embodiment, the second indication information used to indicate the at least one second time unit is determined based on an optional time domain position of the common signal block and/or an index of the first time unit.

Optionally, in another embodiment, the at least one second time unit includes a first group of second time units and a second group of second time units, the first group of second time units is located at a time domain position other than an optional time domain position of the common signal block in the first half time domain part of the first time unit, the second group of second time units is located at a time domain position other than an optional time domain position of the common signal block in the second half time domain part of the first time unit, and when the index of the first time unit is an even number, the time domain resource for the at least one random access preamble occasion (RO) belongs to the first group of second time units indicated by the second indication information, or when the index of the first time unit is an odd number, the time domain resource for the at least one random access preamble occasion (RO) belongs to the second group of second time units indicated by the second indication information.

Optionally, in another embodiment, the preset offset threshold is one of 2, 2.5, 5, 7, and 7.5.

Optionally, in another embodiment, the time domain information of the control channel resource set includes a time domain position of the control channel resource set in the third time unit, and the fifth indication information used to indicate the starting time domain position of the RO in the third time unit is determined based on a time domain position of the control channel resource set in the third time unit, and the starting time domain position of the RO in the third time unit is after a time domain position of a preset control channel resource set in the third time unit, or the starting time domain position that is of the RO in the third time unit and that is indicated by the fifth indication information is a starting time domain position of the third time unit or a preset time domain position in the third time unit.

Optionally, in another embodiment, the starting time domain position of the RO indicates a position, in the third time unit, of the first fourth time unit in at least one fourth time unit that is in the third time unit and that is occupied by the RO, and when the starting time domain position of the RO in the third time unit is after a time domain position of the last control channel resource set in the third time unit, a value of a sequence number of the fourth time unit corresponding to the starting time domain position of the RO in the third time unit is one of the following three: one time a time domain length of the control channel resource set in the third time unit, twice the time domain length of the control channel resource set in the third time unit, and a sum of a sequence number of a starting fourth time unit in the control channel resource set in the third time unit and one time the time domain length of the control channel resource set.

Optionally, in another embodiment, the fourth indication information used to indicate the quantity of ROs in the third time unit is determined based on the starting time domain position of the RO in the third time unit and a length of a time domain resource occupied by the preamble sequence.

Optionally, in another embodiment, the quantity that is of ROs in the third time unit and that is indicated by the fourth indication information is less than or equal to a ratio of a length of a time domain resource between the starting time domain position of the RO and an ending time domain position of the third time unit to the length of the time domain resource occupied by the preamble sequence.

Optionally, in another embodiment, the first time unit is a system frame, the second time unit is a subframe or is of 0.25 ms, and the third time unit is a slot.

Optionally, in another embodiment, the transceiver unit is further configured to receive, on the time domain resource for the at least one RO that is configured by using the first configuration information, a preamble sequence sent by the terminal device.

Optionally, in another embodiment, when time domain resources for one or more ROs in the time domain resource for the at least one RO conflict with a time domain resource for the common signal block or a time domain resource for the control channel resource set, the transceiver unit is further configured to skip receiving a preamble sequence on the time domain resources for the one or more ROs that conflict with the time domain resource for the common signal block or the time domain resource for the control channel resource set.

Optionally, in another embodiment, when time domain resources for one or more ROs in the time domain resource for the at least one RO are located on a non-uplink resource in a semi-static uplink/downlink configuration, the transceiver unit is further configured to receive, on the time domain resource for the at least one RO that is configured by using the first configuration information, a preamble sequence sent by the terminal device.

Alternatively, in another implementation, the processing unit is configured to generate index indication information, where the index indication information is used to indicate a first configuration index, and the transceiver unit is configured to send index indication information to a terminal device, where the index indication information is used by the terminal device to determine, based on the first configuration index, first configuration information corresponding to the first configuration index, the first configuration information is used to indicate a time domain resource for a first group of random access preamble occasions (ROs) or a time domain resource for a second group of ROs, so that the terminal device determines a time domain resource for one group of ROs, the time domain resource for the group of ROs is the time domain resource for the first group of ROs or the time domain resource for the second group of ROs, the time domain resource for the first group of ROs and the time domain resource for the second group of ROs are located in a first time unit in a random access configuration period, and the time domain resource for the first group of ROs or the time domain resource for the second group of ROs is determined based on a time domain offset of the control channel resource set and/or an index of the first time unit.

Therefore, in this embodiment of this application, the time domain resource for the RO is determined based on the time domain offset of the control channel resource set and/or the index of the first time unit, thereby reducing a probability that the resource for the RO collides with a downlink resource (for example, an SSB and/or an RMSI CORESET), increasing a quantity of valid ROs in a PRACH configuration period, and improving random access efficiency of the terminal device.

Optionally, in another embodiment, the first configuration information includes at least one of the following information: first indication information used to indicate the first time unit in the random access configuration period, second indication information used to indicate at least one second time unit in the first time unit, where the at least one second time unit includes a first group of second time units and a second group of second time units, the time domain resource for the first group of ROs belongs to the first group of second time units, and the time domain resource for the second group of ROs belongs to the second group of second time units, third indication information used to indicate a quantity of third time units included in each second time unit in the first group of second time units and the second group of second time units, fourth indication information used to indicate a quantity of ROs in the third time unit, and fifth indication information used to indicate a starting time domain position of an RO in the third time unit.

Optionally, in another embodiment, the random access configuration period is greater than a preset duration threshold, and the time domain offset of the control channel resource set indicates duration between a starting time domain position of a control channel resource set associated with the first common signal block in the common signal block detection window and a starting position of a system frame in which the control channel resource set is located, and the first indication information used to indicate the first time unit is determined based on the time domain offset of the control channel resource set.

Optionally, in another embodiment, when the time domain offset of the control channel resource set is greater than or equal to a preset offset threshold, a sequence number corresponding to a position of the first time unit indicated by the first indication information in the random access configuration period is an even number, or when the time domain offset of the control channel resource set is less than a preset offset threshold, a sequence number corresponding to a position of the first time unit indicated by the first indication information in the random access configuration period is an odd number.

Optionally, in another embodiment, the second indication information used to indicate the at least one second time unit is determined based on a time domain position of the common signal block.

Optionally, in another embodiment, the at least one second time unit indicated by the second indication information is located at a time domain position other than an optional time domain position of the common signal block in the first time unit.

Optionally, in another embodiment, the second indication information used to indicate the at least one second time unit is determined based on an optional time domain position of the common signal block and/or the index of the first time unit.

Optionally, in another embodiment, the first group of second time units is located at a time domain position other than an optional time domain position of the common signal block in the first half time domain part of the first time unit, and the second group of second time units is located at a time domain position other than an optional time domain position of the common signal block in the second half time domain part of the first time unit.

Optionally, in another embodiment, the preset offset threshold is one of 2, 2.5, 5, 7, and 7.5.

Optionally, in another embodiment, the fifth indication information used to indicate the starting time domain position of the RO in the third time unit is determined based on a time domain position of the control channel resource set in the third time unit, and the starting time domain position of the RO in the third time unit is after a time domain position of a preset control channel resource set in the third time unit, or the starting time domain position that is of the RO in the third time unit and that is indicated by the fifth indication information is a starting time domain position of the third time unit or a preset time domain position in the third time unit.

Optionally, in another embodiment, the starting time domain position of the RO indicates a position, in the third time unit, of the first fourth time unit in at least one fourth time unit that is in the third time unit and that is occupied by the RO, and when the starting time domain position of the RO in the third time unit is after a time domain position of the last control channel resource set in the third time unit, a value of a sequence number of the fourth time unit corresponding to the starting time domain position of the RO in the third time unit is one of the following three: one time a time domain length of the control channel resource set in the third time unit, twice the time domain length of the control channel resource set in the third time unit, and a sum of a sequence number of a starting fourth time unit in the control channel resource set in the third time unit and one time the time domain length of the control channel resource set.

Optionally, in another embodiment, the fourth indication information used to indicate the quantity of ROs in the third time unit is determined based on the starting time domain position of the RO in the third time unit and a length of a time domain resource occupied by the preamble sequence.

Optionally, in another embodiment, the quantity that is of ROs in the third time unit and that is indicated by the fourth indication information is less than or equal to a ratio of a length of a time domain resource between the starting time domain position of the RO and an ending time domain position of the third time unit to the length of the time domain resource occupied by the preamble sequence.

Optionally, in another embodiment, the first time unit is a system frame, the second time unit is a subframe or is of 0.25 ms, and the third time unit is a slot.

Optionally, in another embodiment, the transceiver unit is further configured to receive a preamble sequence that is sent by the terminal device on the determined time domain resource for the group of ROs.

Optionally, in another embodiment, when time domain resources for one or more ROs in the time domain resource for the group of ROs that is determined by the terminal device conflict with a time domain resource for the common signal block or a time domain resource for the control channel resource set, the transceiver unit is further configured to skip receiving a preamble sequence on the time domain resources for the one or more ROs that conflict with the time domain resource for the common signal block or the time domain resource for the control channel resource set.

Optionally, in another embodiment, when time domain resources for one or more ROs in the time domain resource for the group of ROs that is determined by the terminal device are located on a non-uplink resource in a semi-static uplink/downlink configuration, the transceiver unit is further configured to receive a preamble sequence that is sent by the terminal device on the determined time domain resource for the group of ROs.

Alternatively, in another implementation, the processing unit is configured to generate index indication information, where the index indication information is used to indicate a first configuration index, the transceiver unit sends the index indication information to a terminal device, where the index indication information is used by the terminal device to determine, based on the first configuration index, a time domain resource for at least one random access preamble occasion (RO) corresponding to the first configuration index, and when it is determined that time domain resources for one or more ROs in the time domain resource for the at least one RO conflict with a time domain resource for a common signal block or a time domain resource for a control channel resource set, the transceiver unit is further configured to skip receiving a preamble sequence on the time domain resources for the one or more ROs that conflict with the time domain resource for the common signal block or the time domain resource for the control channel resource set, or when it is determined that time domain resources for one or more ROs in the time domain resource for the at least one RO are located on a non-uplink resource in a semi-static uplink/downlink configuration, the transceiver unit is further configured to receive, on the time domain resource for the at least one RO that is configured by using the first configuration information, a preamble sequence sent by the terminal device.

Therefore, in this embodiment of this application, when a resource conflict exists, a preamble sequence is not sent on a conflicting resource, thereby avoiding unnecessary and useless work, and avoiding a random access failure. In addition, in this embodiment of this application, the preamble sequence is still sent when a selected time domain resource for one group of ROs does not match the semi-static uplink/downlink configuration, thereby improving a success rate of random access.

It should be understood that, the network device 1000 shown in FIG. 10 can implement various processes of the network device in the method embodiments in FIG. 1 to FIG. 8. Operations and/or functions of the modules in the network device 1000 are respectively for implementing corresponding procedures in the foregoing method embodiments. For details, refer to the descriptions in the foregoing method embodiments. To avoid repetition, detailed descriptions are appropriately omitted herein.

Figure 11:
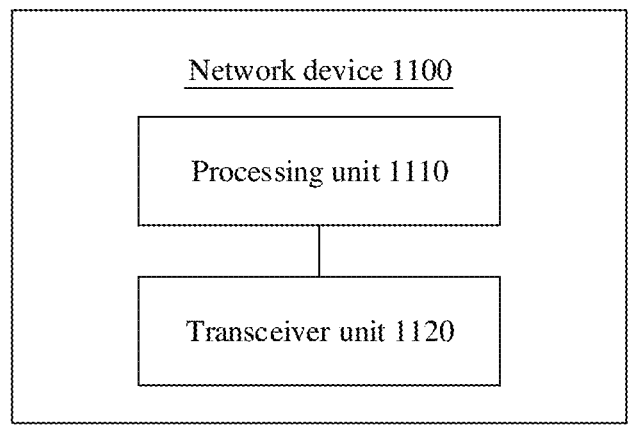
FIG. 11 is a schematic block diagram of a terminal device according to another embodiment of this application.

FIG. 11 is a schematic block diagram of a terminal device 1100 according to another embodiment of this application. Specifically, the terminal device shown in FIG. 11 may be applied to the system shown in FIG. 1, and perform functions of the terminal device in the foregoing method embodiments.

Specifically, as shown in FIG. 11, the terminal device 1100 includes a processor 1110 and a transceiver 1120. The processor 1110 is connected to the transceiver 1120. Optionally, the terminal device may further include a memory 1130. The processor 1110 is connected to the memory 1130. The processor 1110, the transceiver 1120, and the memory 1130 communicate with each other through an internal connection path, to transfer a control and/or data signal.

The transceiver 1120 may be an antenna or a control circuit that has receiving and sending functions. The transceiver may include a receiver configured to receive data and a transmitter configured to send data. The memory 1130 may be configured to store an instruction. The processor 1110 is configured to: execute the instruction stored in the memory 1130 and control the transceiver 1120 to receive and send information or a signal. The controller 1110 executes the instruction in the memory 1130, so that the processes of the terminal device in the foregoing method embodiments in FIG. 1 to FIG. 8 can be completed. To avoid repetition, details are not described herein again.

It should be understood that, the terminal device 1100 may correspond to the terminal device 900 in FIG. 9, the function of the processing unit 910 in the terminal device 900 may be implemented by the processor 1110, and the function of the transceiver unit 920 may be implemented by the transceiver 1120. To avoid repetition, detailed descriptions are appropriately omitted herein.

Figure 12:
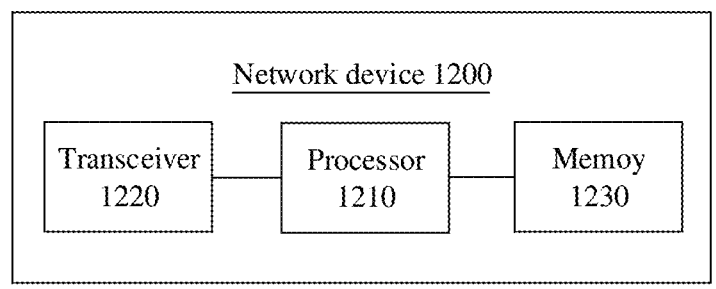
FIG. 12 is a schematic block diagram of a network device according to another embodiment of this application.

FIG. 12 is a schematic block diagram of a network device 1200 according to another embodiment of this application. Specifically, the network device shown in FIG. 12 may be applied to the system shown in FIG. 1, and perform functions of the network device in the foregoing method embodiments.

Specifically, as shown in FIG. 12, the network device 1200 includes a processor 1210 and a transceiver 1220. The processor 1210 is connected to the transceiver 1220. Optionally, the network device may further include a memory 1230. The processor 1210 is connected to the memory 1230. The processor 1210, the transceiver 1220, and the memory 1230 communicate with each other through an internal connection path, to transfer a control and/or data signal.

The transceiver 1220 may be an antenna or a control circuit that has receiving and sending functions. The transceiver may include a receiver configured to receive data and a transmitter configured to send data. The memory 1230 may be configured to store an instruction. The processor 1210 is configured to: execute the instruction stored in the memory 1230 and control the transceiver 1220 to receive and send information or a signal. The controller 1210 executes the instruction in the memory 1230, so that the processes of the network device in the foregoing method embodiments in FIG. 1 to FIG. 8 can be completed. To avoid repetition, details are not described herein again.

It should be understood that, the network device 1200 may correspond to the network device 1000 in FIG. 10, the function of the processing unit 1010 in the network device 1000 may be implemented by the processor 1210, and the function of the transceiver unit 1020 may be implemented by the transceiver 1220. To avoid repetition, detailed descriptions are appropriately omitted herein.

It should be noted that the processor (for example, the processors in FIG. 11 and FIG. 12) in the embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory (for example, the memories in FIG. 11 to FIG. 12) in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

An embodiment of this application further provides a processing apparatus, including a processor and an interface. The processor is configured to perform the communication method in any one of the foregoing method embodiments.

It should be understood that the foregoing processing apparatus may be a chip. For example, the processing apparatus may be a field programmable gate array (FPGA), or an application-specific integrated chip (ASIC), or may be a system on chip (SoC), a central processing unit (CPU), a network processor (NP), a digital signal processor (DSP), or a micro controller (MCU), or may be a programmable logic device (PLD), or another integrated chip.

An embodiment of this application further provides a computer-readable medium. The computer-readable medium stores a computer program. When the computer program is executed by a computer, the method in any one of the foregoing method embodiments is implemented.

An embodiment of this application further provides a computer program product. When the computer program product is executed by a computer, the method in any one of the foregoing method embodiments is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedures or functions according to the embodiments of this application are all or partially generated. The computer may be a general-purpose computer, a special purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid-state drive (SSD)), or the like.

It should be understood that first, second, third, fourth, and various serial numbers in this specification are merely for purpose of distinction for ease of description, but are not intended to limit the scope of the embodiments of this application.

Terms such as "component", "module", and "system" used in this specification are used to indicate computer-related entities, hardware, firmware, combinations of hardware and software, software, or software being executed. For example, a component may be, but is not limited to, a process that is run on a processor, a processor, an object, an executable file, a thread of execution, a program, and/or a computer. As shown in the figures, both a computing device and an application that is run on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that "one embodiment" or "an embodiment" mentioned in the whole specification does not mean that particular features, structures, or characteristics related to the embodiment are included in at least one embodiment of this application. Therefore, "in one embodiment" or "in an embodiment" appearing throughout the specification does not refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should be further understood that determining A according to B does not mean that B is determined according to A only, that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio, and microwave, the coaxial cable, optical fiber/cable, twisted pair, DSL or wireless technologies such as infrared ray, radio and microwave are included in fixation of a medium to which they belong. A disk (Disk) and disc (disc) used by this application includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In conclusion, what is described above is merely preferred embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A method, comprising:
   receiving, by a terminal device, index indication information; and
   determining, by the terminal device, first configuration information based on the index indication information,
   wherein the first configuration information indicates a time domain resource for at least one random access preamble occasion (RO),
   wherein the time domain resource comprises a first orthogonal frequency division multiplexing (OFDM) symbol occupied by the at least one RO in a slot or a subframe, and
   wherein a first sequence number of the first OFDM symbol in the slot or the subframe is twice a time domain length of a control channel resource set in the slot or the subframe, or is a sum of a second sequence number of a starting OFDM symbol in the control channel resource set in the slot or the subframe and the time domain length of the control channel resource set, or is after a time domain position of a preset control channel resource set in the slot or the subframe.

2. The method according to claim 1, wherein the first sequence number of the first OFDM symbol in the slot is 2, 6, 8, or 9.

3. The method according to claim 1, wherein the first configuration information is determined based on time domain information of the control channel resource set.

4. The method according to claim 1, wherein the method further comprises:
   skipping, by the terminal device, sending a preamble sequence on time domain resources for one or more ROs that conflict with a time domain resource for a common signal block.

5. The method according to claim 1, wherein the index indication information is a physical random access channel (PRACH) configuration index.

6. The method according to claim 1, wherein the slot is a PRACH slot.

7. The method according to claim 1, wherein the first configuration information further indicates a preamble sequence format, or a value of a system frame number mod a random access configuration period.

8. The method according to claim 1, wherein the time domain resource further comprises a sequence number of the slot or the subframe, or a quantity of ROs in one slot.

9. The method of claim 1, further comprising:
   updating, by the terminal device when the first OFDM symbol occupied by the at least one RO is located on a non-uplink resource in a semi-static uplink/downlink configuration of the slot or the subframe, a starting position of an uplink symbol in the semi-static uplink/downlink configuration of the slot or the subframe to the first sequence number of the first OFDM symbol in the slot or the subframe;
   updating, by the terminal device to a quantity of the at least one RO in the slot or the subframe, a smaller one of a quantity of ROs that can be carried on the uplink symbol in the semi-static uplink/downlink configuration of the slot or the subframe and a quantity that is of ROs in the slot or the subframe that is indicated by a fourth indication information in the first configuration information; and
   sending, by the terminal device, a preamble sequence based on an updated sequence number of the first OFDM symbol and the updated quantity of the at least one RO in the slot or the subframe.

10. An apparatus, comprising:
    a memory, configured to store computer programming; and
    at least one processor, configured to execute the computer programming stored in the memory, to enable the apparatus to perform:
    receiving index indication information; and
    determining first configuration information based on the index indication information,
    wherein the first configuration information indicates a time domain resource for at least one random access preamble occasion (RO),
    wherein the time domain resource comprises a first orthogonal frequency division multiplexing (OFDM) symbol occupied by the at least one RO in a slot or a subframe, and
    wherein a first sequence number of the first OFDM symbol in the slot or the subframe is twice a time domain length of a control channel resource set in the slot or the subframe, or is a sum of a second sequence number of a starting OFDM symbol in the control channel resource set in the slot or the subframe and the time domain length of the control channel resource set, or is after a time domain position of a preset control channel resource set in the slot or the subframe.

11. The apparatus according to claim 10, wherein the first sequence number of the first OFDM symbol in the slot is 2, 6, 8, or 9.

12. The apparatus according to claim 11, wherein the first configuration information is determined based on time domain information of the control channel resource set.

13. The apparatus according to claim 11, wherein the apparatus further skips sending a preamble sequence on time domain resources for one or more ROs that conflict with a time domain resource for a common signal block.

14. The apparatus according to claim 11, wherein the index indication information is a physical random access channel (PRACH) configuration index.

15. The apparatus according to claim 11, wherein the slot is a PRACH slot.

16. The apparatus according to claim 11, wherein the first configuration information further indicates a preamble sequence format, or a value of a system frame number mod a random access configuration period.

17. The apparatus according to claim 11, wherein the time domain resource further comprises a sequence number of the slot or the subframe, or a quantity of ROs in one slot.

18. The apparatus according to claim 11, wherein the time domain resource comprises the first OFDM symbol occupied by the at least one RO in the slot or the subframe.

19. An apparatus, comprising:
    a memory, configured to store computer programming; and
    at least one processor, configured to execute the computer programming stored in the memory, to enable the apparatus to perform:
    generating index indication information; and
    sending the index indication information to a terminal device, wherein the index indication information is used by the terminal device to determine first configuration information based on the index indication information, wherein the first configuration information indicates a time domain resource for at least one random access preamble occasion (RO), wherein the time domain resource comprises a first orthogonal frequency division multiplexing (OFDM) symbol occupied by the at least one RO in a slot or a subframe; and wherein a first sequence number of the first OFDM symbol in the slot or the subframe is twice a time domain length of a control channel resource set in the slot or the subframe, or is a sum of a second sequence number of a starting OFDM symbol OFDM symbol in the control channel resource set in the slot or the subframe and the time domain length of the control channel resource set, or is after a time domain position of a preset control channel resource set in the slot or the subframe.

20. The apparatus of claim 19, the at least one processor configured to execute the computer programming to enable the apparatus to further perform:

sending semi-static uplink/downlink configuration of the slot or the subframe to the terminal device, wherein the first OFDM symbol occupied by the at least one RO is located on a non-uplink resource in the semi-static uplink/downlink configuration of the slot or the subframe; and receiving, based on an updated sequence number of the first OFDM symbol and an updated quantity of the at least one RO in the slot or the subframe updated by the terminal device, a preamble sequence from the terminal device.

* * * * *